US007881587B2

(12) United States Patent
Shinkai et al.

(10) Patent No.: US 7,881,587 B2
(45) Date of Patent: Feb. 1, 2011

(54) PLAYBACK APPARATUS, PLAYBACK METHOD, AND PROGRAM FOR THE SAME

(75) Inventors: Mitsutoshi Shinkai, Kanagawa (JP); Takayoshi Kawamura, Kanagawa (JP); Nobuhiro Kotaka, Kanagawa (JP); Yoshiaki Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1395 days.

(21) Appl. No.: 10/567,549

(22) PCT Filed: Aug. 19, 2004

(86) PCT No.: PCT/JP2004/011904

§ 371 (c)(1),
(2), (4) Date: Feb. 8, 2006

(87) PCT Pub. No.: WO2005/020572

PCT Pub. Date: Mar. 3, 2005

(65) Prior Publication Data

US 2007/0009231 A1 Jan. 11, 2007

(30) Foreign Application Priority Data

Aug. 22, 2003 (JP) ............................. 2003-298565

(51) Int. Cl.
*H04N 9/80* (2006.01)
*H04N 9/82* (2006.01)
*H04N 5/935* (2006.01)
*H04N 5/932* (2006.01)
*H04N 5/765* (2006.01)

(52) U.S. Cl. ...................... 386/248; 386/246; 386/214; 386/217; 386/239

(58) Field of Classification Search .................. 386/52, 386/55, 95, 108, 4, 65, 246, 248, 214, 217, 386/239; 345/328; 360/13; 369/83
See application file for complete search history.

(56) References Cited

U.S. PATENT DOCUMENTS 6,134,378 A * 10/2000 Abe et al. ...................... 386/52

FOREIGN PATENT DOCUMENTS

| JP | 10-285534 A | 10/1998 |
|---|---|---|
| JP | 10-285534 A | 10/1998 |
| JP | 2000-173245 A | 6/2000 |
| JP | 2000-173245 A | 6/2000 |
| JP | 2001-292421 | 10/2001 |
| WO | WO-98/46019 A1 | 10/1998 |

OTHER PUBLICATIONS

PCT International Search Report for PCT/JP2004/011904 mailed on Nov. 30, 2004.
Japanese Office Action for application No. 2005-513293 dated Jan. 20, 2009.

* cited by examiner

*Primary Examiner*—Thai Tran
*Assistant Examiner*—Daquan Zhao
(74) *Attorney, Agent, or Firm*—Rader, Fishman & Grauer PLLC

(57) ABSTRACT

The present invention relates to a playback apparatus, a playback method, and a program for the same that increase the level of convenience of a recording medium and thereby, for example, enable a user to perform playback control processing and the like more easily. An information acquisition unit 353 in a playback control unit 334 allows a holding unit 354 to hold an acquired an Linear Time Code (LTC) change point table 361. An input acceptance processing unit 352 supplies an accepted cue-up instruction to a cue-up processing unit 355. The cue-up processing unit 355 identifies the File Time Code (FTC) of a frame to be cued up, referring to the LTC change point table 361 held in the holding unit 354, and supplies this information to a control unit 351. Based on the information, the control unit 351 creates cue-up command information and supplies it through a command processing unit 356 to a disk recording/playback apparatus which displays a frame image of a frame to be cued up onto a monitor. The invention can be applied to an editing system.

9 Claims, 42 Drawing Sheets

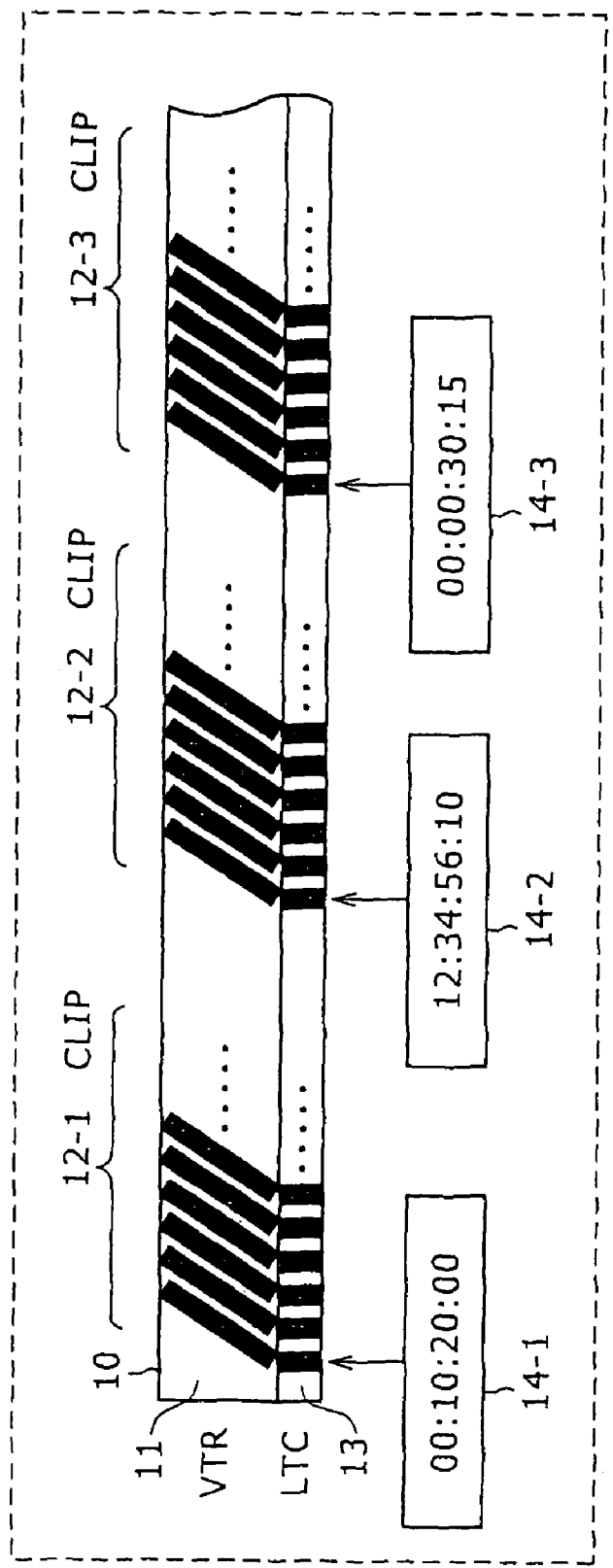

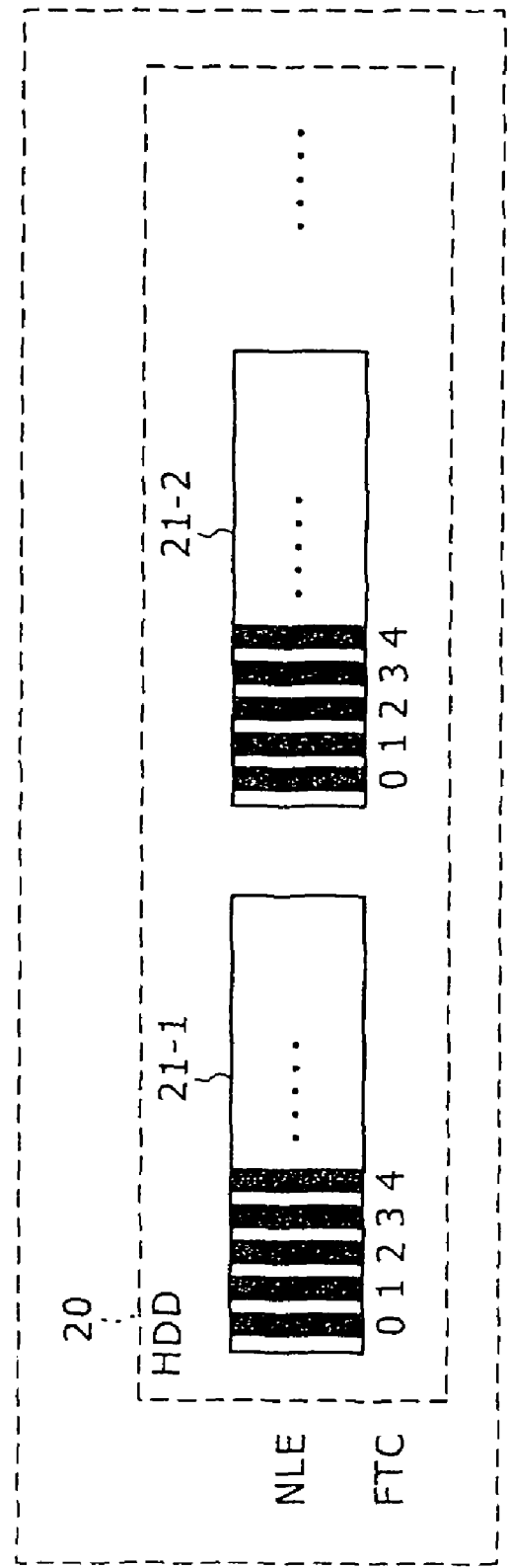

| FRAME NUMBER | LTC | STATUS |
|---|---|---|
| N | M | INCREMENT |

124 (header), 141 (row)

| FRAME NUMBER | LTC | STATUS |
|---|---|---|
| N | M | INCREASE |

| FRAME NUMBER | LTC | STATUS |
|---|---|---|
| N | M | STILL |

| FRAME NUMBER | LTC | STATUS |
|---|---|---|
| N | M | INCREMENT |
| N+2 | M+2 | END |

| FRAME NUMBER | LTC | STATUS |
|---|---|---|
| N | M | INCREMENT |
| N+2 | M+2 | OVER |

```
1  <LtcChangeTable tcFps="30">
2     <LtcChange frameCount="0" value="55300201" status="increment"/>
3     <LtcChange frameCount="3" value="48252001" status="still"/>
4     <LtcChange frameCount="5" value="48252001" status="increase"/>
5     <LtcChange frameCount="6" value="53001500" status="still"/>
6     <LtcChange frameCount="8" value="42254315" status="decrease"/>
7     <LtcChange frameCount="11" value="43254315" status="increment"/>
8     <LtcChange frameCount="14" value="42254515" status="increase"/>
9     <LtcChange frameCount="15" value="42254515" status="increment"/>
10    <LtcChange frameCount="17" value="42254515" status="decrease"/>
11    <LtcChange frameCount="18" value="42254515" status="increment"/>
12    <LtcChange frameCount="20" value="42254515" status="end"/>
13 <LtcChangeTable>
```

291

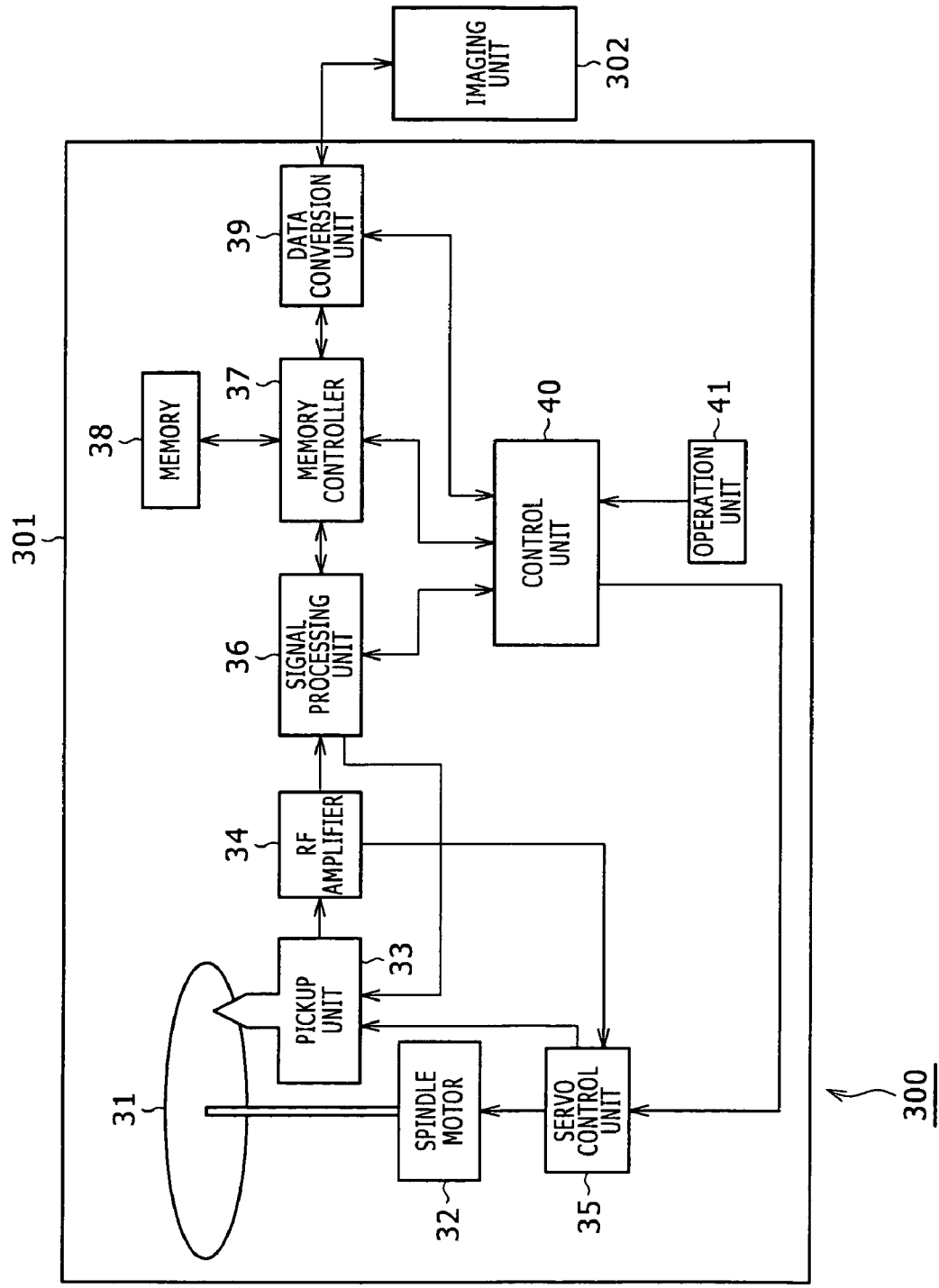

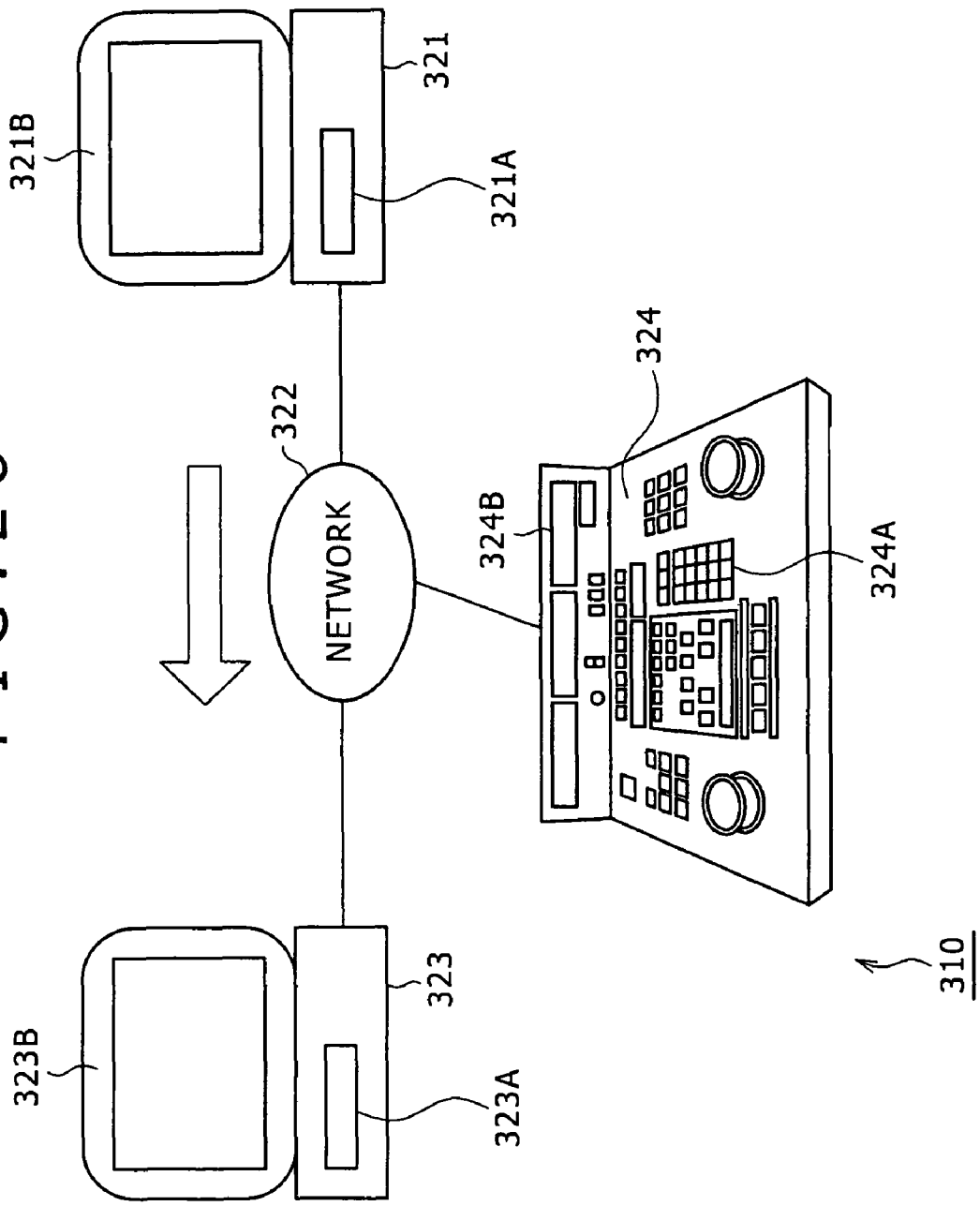

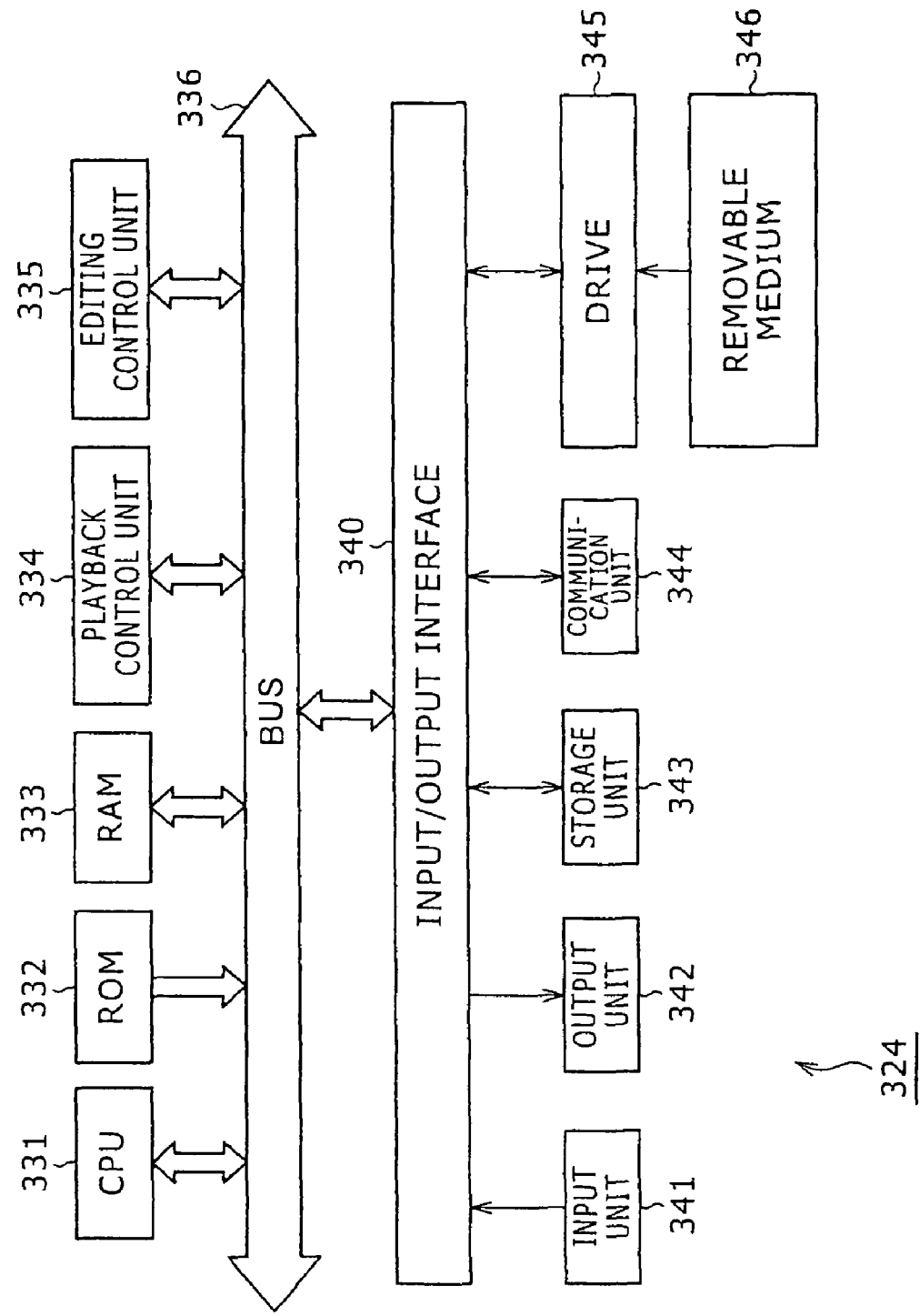

PLAYBACK APPARATUS, PLAYBACK METHOD, AND PROGRAM FOR THE SAME

TECHNICAL FIELD

The present invention relates to a playback apparatus, a playback method, and a program for the same, and in particular, to a playback apparatus, a playback method, and a program for the same that increase the level of convenience of a recording medium and thereby, for example, enable a user to perform playback control processing and the like more easily.

BACKGROUND ART

In recent years, there has become widespread a method by which, when video data and audio data, acquired by shooting or the like, are recorded onto a recording medium, additional information, such as editing information, is added to the video data and the audio data (e.g., see patent document 1).

For example, in the case where video data and audio data are recorded onto videotape by a VCR or the like, as shown in FIG. 1A, the audio data and the video data (skewed black rectangular portions in FIG. 1A) are in turn recorded in an essence data recording area 11 which is a predetermined recording area on videotape 10 and also LTC (Linear Time Code), associated with the video data, which is a time code of each frame of the video data, is recorded in an additional-information recording area 13 which is a predetermined recording area.

In the case of FIG. 1A, three clips (clips 12-1 to 12-3), including the video data and the audio data, are recorded in the essence data recording area 11 on the videotape 10, and LTC, associated with the clips, is recorded in the additional-information recording area 13. The values of the first LTCs 14-1 to 14-3 of LTCs associated with the clips 12-1 to 12-3 are "00:10:20:00", "12:34:56:10", and "00:00:30:15", respectively.

LTCs are continuous in each clip. However, there are cases where LTCs are discontinuous over clips, or there are cases where LTCs having the same value exist in a plurality of clips.

In recent years, a method of non-linear editing (NLE), to perform editing with a personal computer or the like, has been employed as a method for editing video data and audio data. In the non-linear editing, as shown in FIG. 1B, video data and audio data are recorded as files in units of clips, for example, on a hard disk (HDD) 20 or the like in a personal computer used as a data editing apparatus.

In the case of FIG. 1B, essence data, which is data to be edited including video data and audio data is recorded on the hard disk 20, as files 21-1 and 21-2. In this case, it is possible to specify essence data in units of frames, for example, and each frame has a frame number assigned thereto in each file. This frame number is managed as FTC (File Time Code), and a user who edits essence data can directly specify a necessary part in a necessary file using the FTC.

The FTC (frame number) is relative position information in which, the number of the first frame of each file being "0", FTC is assigned to each frame in order from the first frame. Therefore, there are cases where FTC (frame number) of the same value exists in a plurality of files.

[Patent document 1] Japanese Patent Application Laid-Open No. 2001-29241 (pages 14 and 15, FIG. 8)

DISCLOSURE OF THE INVENTION

However, for example, in the case of FIG. 1A, LTC, which is a time code associated with a frame, represents a time when video data is created by shooting or the like but is not for the purpose of managing recording positions of the corresponding essence data on the videotape. Therefore, since LTCs are not always continuous over clips as described above, there is a problem that a user cannot directly retrieve essence data of a desired frame using LTC.

In the case of FIG. 1A, when the user retrieves a desired frame, it is necessary to output essence data in order from the first to use a displayed LTC.

Further, for example, in the case of FIG. 1B, the user can directly retrieve essence data of a desired frame using FTC indicating a frame number. However, since, as described above, FTC is a value indicating a relative position from the first frame of each file and is independent data for each file, there is a problem that the user cannot easily grasp the correlation between times of video data creation by shooting or the like in a plurality of files.

Further, for example, in the case of performing an edit in which a plurality of clips are combined and thereby having a plurality of clips in one file, the user cannot easily grasp the correlation between times of video data creation by shooting or the like in clips included in the file. Therefore, for example, in the case of performing cue-up processing for directly specifying a frame to be displayed using FTC at the time of playing back such a file, it is difficult for the user to grasp which clip includes a frame displayed after cued up and judge whether the frame is before or after a frame cued up before.

The present invention has been made in view of the above circumstances, and an object of the invention is to increase the level of convenience of a recording medium, such as enabling a user to perform playback control processing more easily.

A playback apparatus according to the present invention includes an identifying device for identifying second position information, which is relative position information, relative to a starting frame of video data of a playback frame, which is a frame corresponding to a frame playback instruction using first position information, which is absolute position information as to each frame of the video data, and a playback device for playing back the playback frame corresponding to the second position information identified by the identifying device.

The first position information can be a time code indicating an absolute position of the frame using a real time.

The first position information can be a time code indicating an absolute position of the frame using time information relative to a predetermined time.

The second position information can be a time code indicating a relative position of the frame using a frame number indicating the number of frames counted from the starting frame of the video data.

The identifying device can identify the second position information as to the playback frame based on table information that associates the first position information with the second position information and has an element of a correlation between the first position information and the second position information at a change point, which is a frame where a type of change pattern of a value of the first position information changes.

Each element of the table information can include status information indicating a type of change pattern of a value of the first position information as to a frame after the change point.

In each status section which is grouped by the change point in the table information and composed of a plurality of consecutive frames having the same status information, the identifying device can perform a determination whether the first position information of the playback instruction exists, and identify the second position information as to the playback frame, based on a result of the determination.

The identifying device can perform the determination in turn for consecutive status sections in a direction that increases the second position information if a value of the first position information of the playback instruction is larger than a value of the first position information as to a frame that is currently played back. And, the identifying device can perform the determination in turn for consecutive status sections in a direction that decreases the second position information if a value of the first position information of the playback instruction is smaller than a value of the first position information as to a frame that is currently played back.

A playback method according to the invention includes accepting a playback instruction to play back a frame, using first position information which is absolute position information as to each frame of the video data; identifying second position information, which is relative position information, relative to a starting frame of the video data of a playback frame; and playing back a frame corresponding to the second position information identified.

A program according to the invention includes accepting a playback instruction to playback a frame, using first position information, which is absolute position information as to each frame of the video data; identifying second position information, which is relative position information, relative to a starting frame of the video data, of a playback frame; and playing back a frame corresponding to the second position information identified.

The playback apparatus, playback method, and the program for the same according to the invention, identify second position information, which is relative position information, relative to a starting frame of video data, of a playback frame, which is a frame corresponding to a frame playback instruction using first position information, which is absolute position information as to each frame of the video data, and play back the playback frame corresponding to the second position information identified.

According to the present invention, it is possible to process a signal. In particular, it is possible to increase the level of convenience of a recording medium and thereby enable a user to perform playback control processing and the like more easily.

BRIEF DESCRIPTION OF THE DRAWINGS

FIG. 1A is an illustration of assistance in explaining conventional LTC.

FIG. 1B is an illustration of assistance in explaining conventional FTC.

FIG. 26 is an illustration showing an example of an XML (eXtensible Markup Language) description of a non-real-time metadata file.

FIG. 27 is a block diagram showing an example of the structure of a camcorder according to an embodiment of the invention.

FIG. 28 is an illustration showing an example of the structure of an editing system according to an embodiment of the invention.

FIG. 29 is a block diagram showing an example of the internal structure of an editing control apparatus in FIG. 28.

Figure 2:
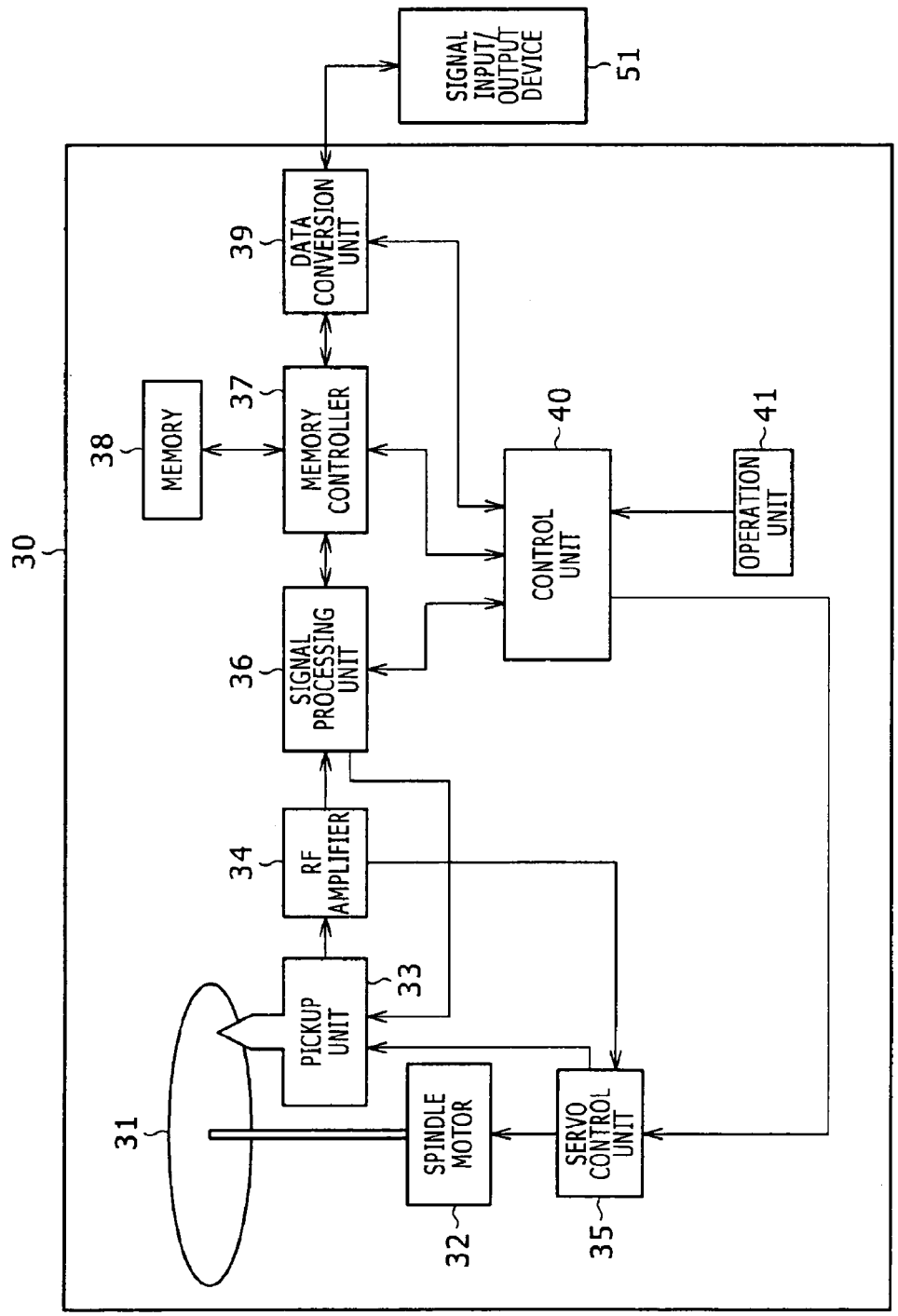
FIG. 2 is a block diagram showing an example of the structure of a disk recording/playback apparatus (disk drive) according to an embodiment of the invention.

DESCRIPTION OF REFERENCE NUMERALS 0 1 2 3 4: Frame Numbers
10: Videotape
11: Essence data recording area
12-1: Clip
12-2: Clip
12_3: Clip
13: Additional-information recording area
14-1: Value of the first LTC associated with 12-1
14-2: Value of the first LTC associated with 12-2
14-3: Value of the first LTC associated with 12-3
20: Hard disk (HDD)
21-1: File
21-2: File
30: Disk recording/playback apparatus (disk drive)
31: Optical disk
32: Spindle motor
33: Pickup unit
34: RF amplifier
35: Servo control unit
36: Signal processing unit
37: Memory controller
38: Memory
39: Data conversion unit
40: Control unit
41: Operation unit
51: Signal input/output device
61: Demultiplexer
62: Data amount detection unit
63: Video signal conversion unit
64: Audio signal conversion unit
65: Low-resolution data generation unit
66: Real-time metadata processing unit
67: Non-real-time metadata processing unit
71: LTC data processing unit
72: LTC data processing unit
81: Video data conversion unit
82: Audio data conversion unit
83: Low-resolution data processing unit
84: Real-time metadata processing unit
85: Non-real-time metadata processing unit
86: Multiplexer
101: Control unit
102: LTC generation unit
103: Initial-value setting unit
104: Counter
105: Real-time clock
110: KLV (Key length value) data
111: Acquisition control unit
112: Determination processing unit
113: Data management unit
114: Data holding unit
115: Section setting management unit
116: Section setting holding unit
117: Registration processing unit
121: LTC data
122: FTC data
123: Section name
124: LTC change point table
131: Key data
132: Length data
133: Value data
141: An element of the LTC change point table 124
142: An element of the LTC change point table 124 whose FTC value is N
144: An element of the LTC change point table 124 whose FTC value is N
148: An element of the LTC change point table 124 whose FTC value is N
149: An element of the LTC change point table 124 whose FTC value is N+2
150: An element of the LTC change point table 124 whose FTC value is N
151: An element of the LTC change point table 124 whose FTC value is N+2
161: Audio annual-ring data
162: Video annual-ring data
163: Low-resolution annual-ring data
164: Real-time meta annual-ring data
165: Non-real-time metadata
170: Annual-ring data
171: Audio annual-ring data
172: Low resolution annual-ring data
173: Low-resolution annual-ring data
174: Real-time meta annual-ring data
175: LTC data
181: Non-real-time metadata
182: LTC change point table
190-1, 190-2: Annual-ring data
191-1, 191-2: Audio annual-ring data
192-1, 192-2: Video annual-ring data
193-1, 193-2: Low-resolution annual-ring data
194-1, 194-2: Real-time meta annual-ring data
195-1, 195-2: LTC data
201-1, 201-2, 201-3: Non-real-time metadata
202-1, 202-2, 202-3: LTC change point table
251: Root directory (ROOT)
252: PROAV directory
253: Disk metadata file (DISCMETA.XML)
254: Index file (INDEX.XML)
255: Index file (INDEX.BUP)
256: Disk information file (DISCINFO.XML)
257: Disk information file (DISCINFO.BUP)
258: Clip root directory (CLRP)
259: Edit list root directory (EDTR)
261: Clip directory (C0001)
262: Clip directory (C0002)
263: Clip directory (C0003)
264: Edit list directory (E0001)
265: Edit list directory (E0002)
266: Edit list directory (E0003)
267: Edit list directory (E0004)
271: Clip information file (C0001C01.SMI)
272: Video data file (C0001V01.MXF)

273: Audio data file (C0001A01.MXF)
274: Audio data file (C0001A02.MXF)
275: Audio data file (C0001A03.MXF)
276: Audio data file (C0001A04.MXF)
277: Audio data file (C0001A05.MXF)
278: Audio data file (C0001A06.MXF)
279: Audio data file (C0001A07.MXF)
280: Audio data file (C0001A08.MXF)
281: Low-resolution data file (C0001S01.MXF)
282: Non-real-time metadata file (C0001M01.XML)
283: Real-time metadata file (C0001R01.BIM)
284: Picture pointer file (C0001T01.PPF)
291: LTC change point table in a non-real-time metadata file described in XML
300: Camcorder
301: Disk recording/playback unit
302: Imaging unit
310: Editing system
321: Disk recording/playback apparatus
321A: Drive
321B: Monitor
322: Network
323: Disk recording/playback apparatus
323A: Drive
323B: Monitor
324: Editing control apparatus
324A: LTC inputting key
324B: Display unit
331: CPU (central processing unit)
332: ROM (read only memory)
333: RAM (random access memory)
334: Playback control unit
335: Editing control unit
336: Bus
340: Input/output interface
341: Input unit
342: Output unit
343: Storage unit
344: Communication unit
345: Drive
346: Removable medium
351: Control unit
352: Input acceptance processing unit
353: Information acquisition unit
354: Holding unit
355: Cue-up processing unit
356: Command processing unit
361: LTC change point table
371: Frame image

BEST MODE FOR CARRYING OUT THE INVENTION

Embodiments of the present invention will be described below with reference to the accompanying drawings.

FIG. 2 is a block diagram showing an example of the structure of a disk recording/playback apparatus (disk drive) 30 according to an embodiment of the invention.

A spindle motor 32 rotationally drives an optical disk 31 at CLV (Constant Linear Velocity) or CAV (Constant Angular Velocity) based on a spindle motor drive signal from a servo control unit 35.

A pickup unit 33 controls the output of laser light based on a record signal supplied from a signal processing unit 36 to record the record signal onto the optical disk 31. Further, the pickup unit 33 irradiates the optical disk 31 with laser light converged, and also generates a current signal by performing photoelectric conversion of reflected light from the optical disk 31 to supply the current signal to a radio frequency (RF) amplifier 34. An irradiation position of laser light is controlled so as to be a specified position by a servo signal supplied from the servo control unit 35 to the pickup unit 33.

The RF amplifier 34 generates a focus error signal, a tracking error signal, and a playback signal, based on the current signal from the pickup unit 33. The RF amplifier 34 supplies the tracking error signal and the focus error signal to the servo control unit 35 and supplies the playback signal to the signal processing unit 36.

The servo control unit 35 controls a focus servo operation and a tracking servo operation. More specifically, based on the focus error signal and the tracking error signal from the RF amplifier 34, the servo control unit 35 generates a focus servo signal and a tracking servo signal, respectively, and supplies them to an actuator (not shown) of the pickup unit 33. Further, the servo control unit 35 generates a spindle motor drive signal for driving the spindle motor 32 and controls a spindle servo operation for rotating the optical disk 31 at a predetermined rotational velocity.

Furthermore, the servo control unit 35 performs thread control for changing an irradiation position of laser light by moving the pickup unit 33 radially. Further, a signal reading position on the optical disk 31 is set by a control unit 40. The pickup unit 33 is controlled in position so that a signal can be read from the set reading position.

The signal processing unit 36 generates a record signal by modulating record data inputted from a memory controller 37 and supplies it to the pickup unit 33. The signal processing unit 36 also generates playback data by demodulating a playback signal from the RF amplifier 34 and supplies it to the memory controller 37.

The memory controller 37 stores record data from a data conversion unit 39 in a memory 38 if necessary, as described later, and also reads it out and supplies it to the signal processing unit 36. Further, the memory controller 37 stores playback data from the signal processing unit 36 in the memory 38 if necessary, and also reads it out and supplies it to the data conversion unit 39.

The data conversion unit 39 generates record data by compressing video and audio signals shot with a video camera (not shown) or a signal played back from a recording medium (not shown) that is supplied from a signal input/output device 51 based on a scheme such as MPEG (Moving Picture Experts Group) or JPEG (Joint Photographic Experts Group) as necessary, and supplies the record data to the memory controller 37.

The data conversion unit 39 also decompresses playback data supplied from the memory controller 37, as necessary, converts the data into a predetermined format for output, and supplies it to the signal input/output device 51.

The control unit 40 controls the servo control unit 35, the signal processing unit 36, the memory controller 37, and the data conversion unit 39 based on an operation signal or the like from an operation unit 41 so that these units perform recording/playback processing.

The operation unit 41 is operated by a user, for example, and supplies an operation signal corresponding to the operation to the control unit 40.

In the disk recording/playback apparatus 30 thus configured, when the user instructs the disk recording/playback apparatus 30 to record data by operating the operation unit 41, data from the signal input/output device 51 is supplied through the data conversion unit 39, the memory controller 37, the signal processing unit 36, and the pickup unit 33 to the optical disk 31 and is recorded.

Further, when the user instructs the disk recording/playback apparatus 30 to play back data by operating the operation unit 41, data is read and played back from the optical disk 31 through the pickup unit 33, the RF amplifier 34, the signal processing unit 36, the memory controller 37, and the data conversion unit 39 and is supplied to the signal input/output device 51.

Figure 3:
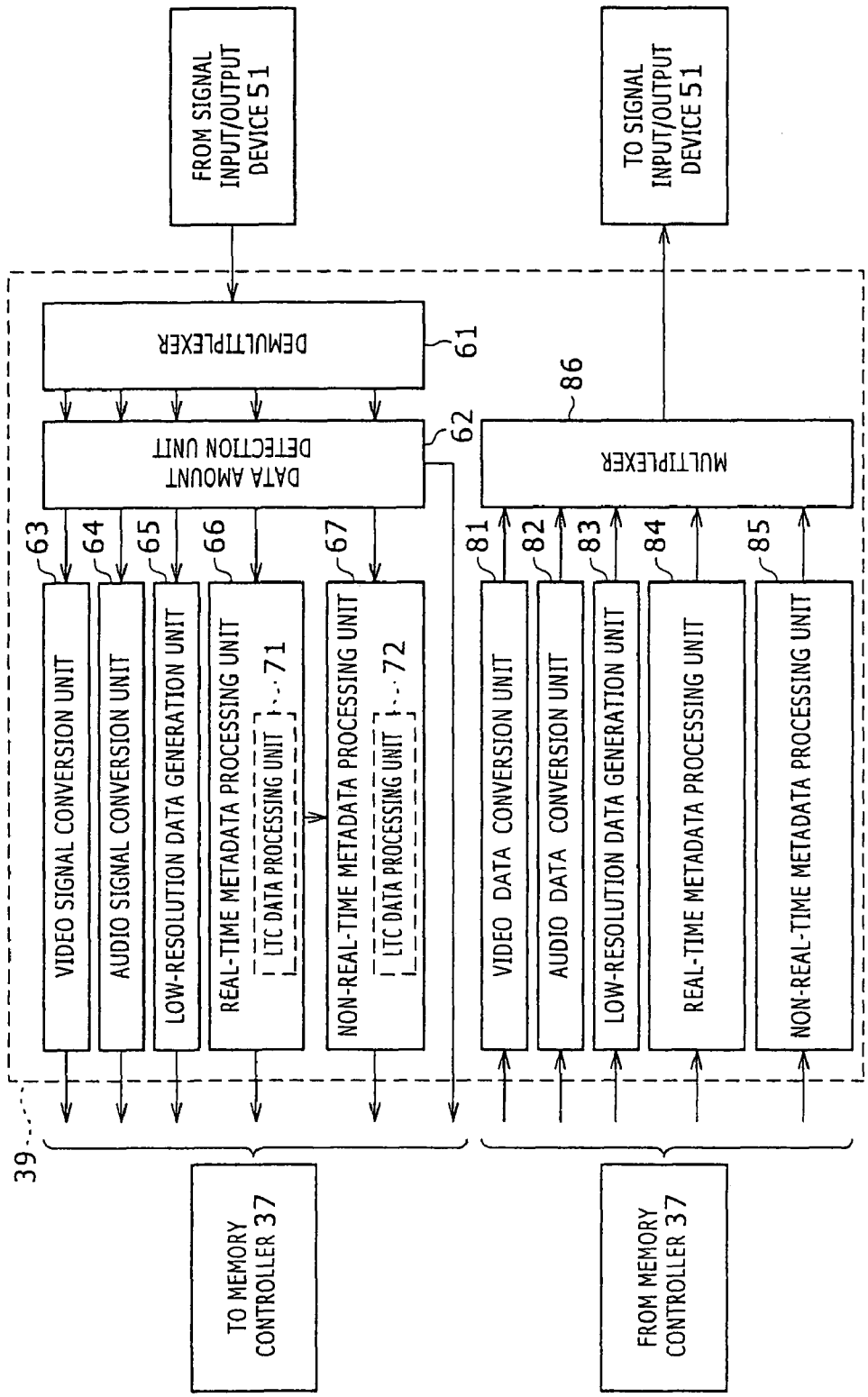
FIG. 3 is a block diagram showing an example of the detailed structure of a data conversion unit in FIG. 2.

FIG. 3 shows an example of the structure of the data conversion unit 39 in FIG. 2.

In the case of recording data onto the optical disk 31, a signal to be recorded is supplied from the signal input/output device 51 to a demultiplexer 61. The demultiplexer 61 demultiplexes the signal supplied from the signal input/output device 51 into, for example, a moving video signal (e.g., baseband video signal), an audio signal (e.g., baseband audio signal) accompanying the video signal and metadata, as a plurality of associated data series, and supplies them to a data amount detection unit 62.

In short, at the time of recording data onto the optical disk 31, the signal input/output device 51 outputs, for example, a signal obtained by the video camera (not shown), as described above. The signal obtained by the video camera contains a video signal and its accompanying audio signal, which are obtained by shooting a subject, and also metadata about the video signal. The demultiplexer 61 demultiplexes such a signal into the video signal, the audio signal, and the metadata as well.

The metadata includes real-time metadata (RT) containing data of which real-time performance is required in its reading processing and non-real-time metadata (NRT) containing data of which real-time performance is not required in its reading processing.

The real-time metadata (RT) includes, for example, a linear time code (LTC) which identifies the position of the frame of a video signal using predetermined time information such as a date and time (year, month, day, hour, minute, and second) and is absolute position information (time code) of each frame, a file time code (FTC) which is each frame number and relative position information from the first frame of a file, a user bit (UB) which indicates signal characteristics of the video signal of the frame, a unique material identifier (UMID) which is an ID for identifying a frame, global positioning system (GPS) information which represents a position where shooting has been performed with a video camera, an essence mark which is information about the contents of essence data such as a video signal and an audio signal, ARIB (Association of Radio Industries and Businesses) metadata, and setting/control information of a video camera with which shooting has been performed. The ARIB metadata refers to metadata for a communication interface such as a serial digital interface (SDI) standardized by ARIB which is a standardizing body. Further, the setting/control information of a video camera refers to information such as an iris control value, a white balance/black balance mode, and lens information about a lens zoom and focus.

The non-real-time metadata (NRT) includes, for example, a conversion table which relates LTC corresponding to each frame with a frame number (FTC), information about UMID and GPS, etc.

The frame refers to the unit of video signals, namely to video data corresponding to video for one screen (or various kinds of data corresponding to the video data). Further, a clip refers to a unit that indicates one shooting process which is performed from the start of shooting until the end of shooting. That is, a one-clip video signal is typically composed of video signals of multiple frames. Further, the clip does not only indicate one shooting process but also indicates the time of the shooting process from the start of shooting until the end of shooting. Furthermore, the clip also indicates the length of video data and the amount of video data obtained by one shooting process, the video data itself, the length of various kinds of data and the amount of various kinds of data obtained by one shooting process, and a set of various kinds of data itself.

Further, real-time metadata and non-real-time metadata may be added to video data expressed in any unit. In the description below, real-time metadata is added to video data for each frame, and non-real-time metadata is added to video data for each clip. That is, in the description below, the real-time metadata is frame metadata which is added to a video signal for each frame and includes data corresponding to the frame. The non-real-time metadata is clip metadata which is added to a video signal for each clip and includes data corresponding to the whole clip.

In most cases, video data is filed for each clip and managed by a file system. In such a case, the non-real-time metadata may be metadata for each file including video data.

Further, the real-time metadata and the non-real-time metadata may include data besides the foregoing. The real-time metadata and the non-real-time metadata may include the same content data. The non-real-time metadata may include the above-mentioned real-time metadata, and the real-time metadata may include the above-mentioned non-real-time metadata. For example, the non-real-time metadata and/or the real-time metadata may include an essence mark, ARIB metadata, and setting/control information of a video camera. The real-time metadata and/or the non-real-time metadata may include information about UMID and GPS.

The data amount detection unit 62 supplies a video signal, an audio signal, real-time metadata, and non-real-time metadata supplied from the demultiplexer 61 to a video signal conversion unit 63, an audio signal conversion unit 64, a real-time metadata processing unit 66, and a non-real-time metadata processing unit 67, respectively, without being processed. Further, the data amount detection unit 62 detects the amount of each data (a video signal, an audio signal, real-time metadata, and non-real-time metadata) and supplies them to the memory controller 37. That is, the data amount detection unit 62 detects the amount of each data (a video signal, an audio signal, real-time metadata, and non-real-time metadata supplied from the demultiplexer 61) for a predetermined playback time period, for example, and supplies them to the memory controller 37.

Further, the data amount detection unit 62 supplies a video signal supplied from the demultiplexer 61 and an audio signal if necessary, to a low-resolution data generation unit 65.

The video signal conversion unit 63 encodes a video signal supplied from the data amount detection unit 62 into MPEG format, for example, with all frames being I (Intra) pictures and supplies the thereby obtained data series of video data to the memory controller 37. Further, the audio signal conversion unit 64 encodes an audio signal supplied from the data amount detection unit 62 into MPEG format, for example, and supplies the thereby obtained data series of audio data to the memory controller 37.

The real-time metadata processing unit 66 rearranges the components of real-time metadata through the data amount detection unit 62, if necessary, and supplies the thereby obtained data series of real-time metadata to the memory controller 37. Further, the real-time metadata processing unit 66 includes an LTC data processing unit 71 which generates LTC data corresponding to each frame in such a case where LTC data is not added to a signal supplied from the signal input/output device 51. Furthermore, the real-time metadata processing unit 66 supplies a data series of LTC data after being processed to the non-real-time metadata processing unit 67 if necessary.

The non-real-time metadata processing unit 67 rearranges the components of non-real-time metadata through the data amount detection unit 62 if necessary, and supplies the thereby obtained data series of non-real-time metadata to the memory controller 37. Further, the non-real-time metadata processing unit 66 includes an LTC data processing unit 72. The LTC data processing unit 72 generates a conversion table which relates LTC data with a frame number (FTC data) using the data series of LTC data supplied from the real-time metadata processing unit 66.

The low-resolution data generation unit 65 generates a data series of low-resolution data, obtained by reducing the amount of data supplied thereto, and supplies it to the memory controller 37.

That is, the low-resolution data generation unit 65 generates a fewer-pixel video signal, which is a video signal composed of frames having a small number of pixels, by thinning out the pixels of each frame of a video signal supplied through the data amount detection unit 62. Further, the low-resolution data generation unit 65 encodes the fewer-pixel video signal with the MPEG4 standard, for example, and outputs the encoded data as low-resolution data.

Further, the low-resolution data generation unit 65 can output low-resolution data including an audio signal whose data amount is reduced by thinning out an audio signal supplied through the data amount detection unit 62 or a sample of the audio signal (e.g., in the form of multiplexing the audio signal into the fewer-pixel video signal in units of frames). In the description below, the low-resolution data includes an audio signal.

While the data series of video data outputted from the video signal conversion unit 63 and the data series of audio data outputted from the audio signal conversion unit 64 have the same contents as the data series of low-resolution data outputted from the low-resolution data generation unit 65, video data outputted from the video signal conversion unit 63 and audio data outputted from the audio signal conversion unit 64 are originally supplied from a user; therefore, video data outputted from the video signal conversion unit 63 and audio data outputted from the audio signal conversion unit 64 are hereinafter referred to as main-line data where appropriate.

The low-resolution data is video and audio data of the same content as that of the main-line data while having a small amount of data. Therefore, in the case of playing back data for a certain playback time period, the low-resolution data can be read from the optical disk 31 within a short time compared to the main-line data.

It is possible to adopt a data rate of, for example, about 25 Mbps (Mega bit per second) for the main-line data. In this case, it is possible to adopt a data rate of, for example, about 3 Mbps for the low-resolution data. Further, in this case, assuming that a data rate of, for example, about 2 Mbps is adopted for metadata (real-time metadata and non-real-time metadata), the data rate of the whole data recorded onto the optical disk 31 amounts to about 30 (=25+3+2) Mbps. Therefore, it is possible to adopt a device that is adequate for practical use having a record rate of 35 Mbps, for example, as the optical disk 31 (the disk recording/playback apparatus 30 which drives the optical disk 31).

As described above, in the data conversion unit 39 of FIG. 3, the data series of real-time metadata, non-real-time metadata, and low-resolution data, as well as the data series of main-line data (video data and audio data), are supplied to the memory controller 37. The main-line data, the real-time metadata, the non-real-time metadata, and the low-resolution data supplied to the memory controller 37 are supplied to the optical disk 31 and recorded.

On the other hand, at the time of playing back data from the optical disk 31, main-line data, real-time metadata, non-real-time metadata, and low-resolution data are read out, as necessary, from the optical disk 31. Video data and audio data constituting the main-line data are supplied to a video data conversion unit 81 and an audio data conversion unit 82, respectively, where the video data and the audio data are decoded into a video signal and an audio signal, which are supplied to a multiplexer 86.

The real-time metadata, the non-real-time metadata, and the low-resolution data are supplied to a real-time metadata processing unit 84, a non-real-time metadata processing unit 85, and a low-resolution data processing unit 83, respectively. The real-time metadata processing unit 84, as necessary, changes the arrangement of components of the real-time metadata supplied thereto and supplies it to the multiplexer 86. The non-real-time metadata processing unit 85, as necessary, changes the arrangement of components of the non-real-time metadata supplied thereto and supplies it to the multiplexer 86. The low-resolution data processing unit 83 decodes the low-resolution data supplied thereto into a video signal and an audio signal each having a small amount of data, and supplies them to the multiplexer 86.

The video data conversion unit 81 performs, for example, MPEG decoding on the data series of the video data supplied from the memory controller 37 and supplies the thereby obtained video signal to the multiplexer 86. Further, the audio data conversion unit 82 performs, for example, MPEG decoding on the data series of the audio data supplied from the memory controller 37 and supplies the thereby obtained audio signal to the multiplexer 86.

The multiplexer 86 supplies the video signal supplied from the video data conversion unit 81, the audio signal supplied from the audio data conversion unit 82, the real-time metadata supplied from the real-time metadata processing unit 84, and the non-real-time metadata supplied from the non-real-time metadata processing unit 85 to the signal input/output device 51. Further, the multiplexer 86 can multiplex and output the video signal supplied from the video data conversion unit 81, the audio signal supplied from the audio data conversion unit 82, the real-time metadata supplied from the real-time metadata processing unit 84, and the non-real-time metadata supplied from the non-real-time metadata processing unit 85, and the video signal and the audio signal each having a small amount of data supplied from the low-resolution data processing unit 83, or can output each signal (data) independently in parallel.

Figure 4:
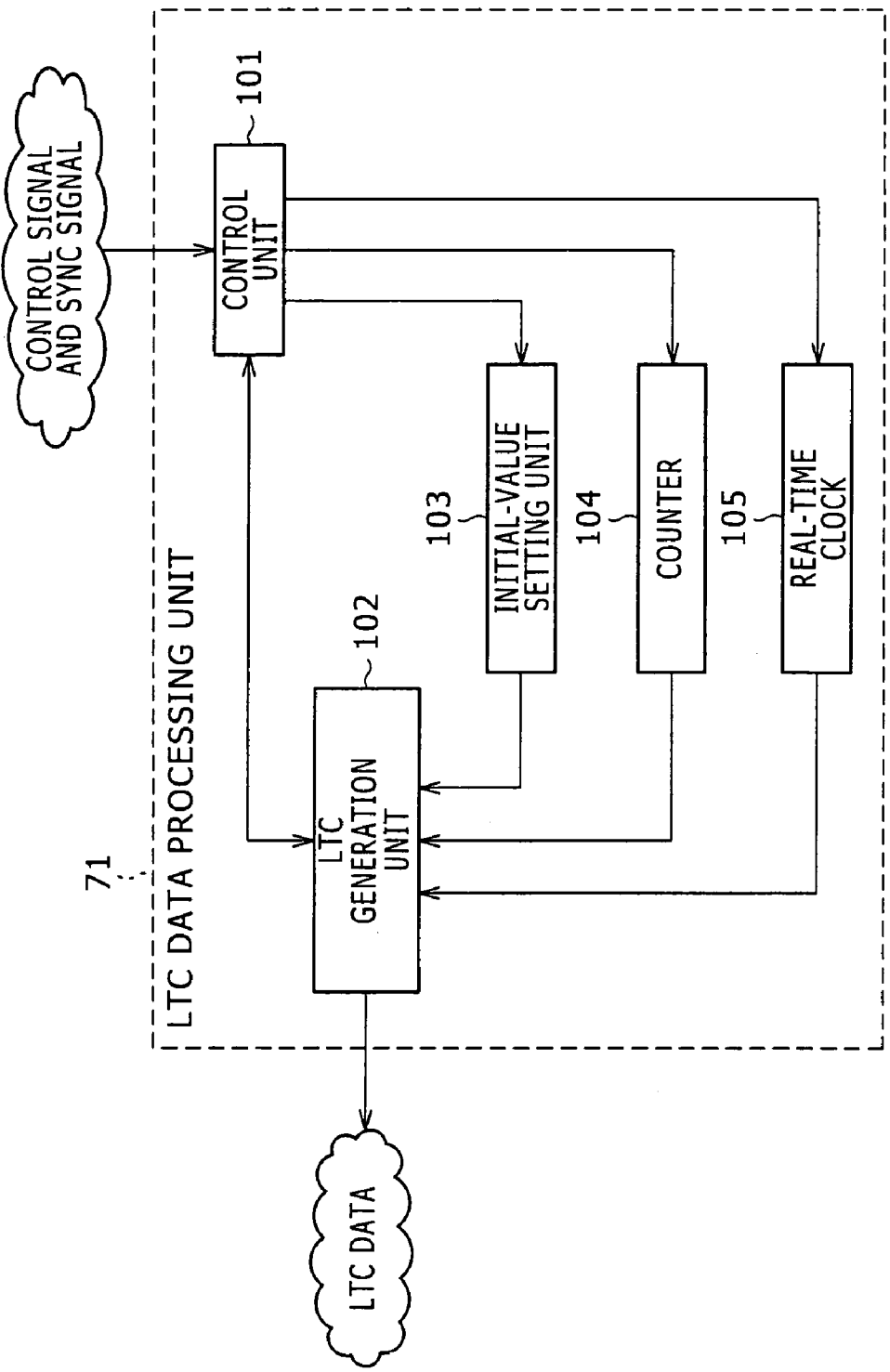
FIG. 4 is a block diagram showing an example of the detailed structure of an LTC data processing unit incorporated in a real-time metadata processing unit of FIG. 3.

FIG. 4 is a block diagram showing an example of the detailed structure of the LTC data processing unit 71 in FIG. 3.

The real-time metadata processing unit 66 of FIG. 3, incorporating the LTC data processing unit 71 shown in FIG. 4, supplies a control signal and a synchronization signal to the LTC data processing unit 71 and requests the LTC data processing unit 71 to generate LTC if the supplied real-time metadata does not include LTC, for example, in such a case where a video signal and an audio signal, shot with an imaging device connected to the signal input/output device 51, are supplied.

Upon acquiring the control signal and the synchronization signal, a control unit 101 in the LTC data processing unit 71 controls each unit of the LTC data processing unit 71 to perform LTC generation processing, based on the control signal and the synchronization signal.

In the case of generating LTC, relative to a predetermined time and independent of a real time, the control unit 101 controls an LTC generation unit 102 which performs LTC generation processing, an initial-value setting unit 103 which performs initial-value setting processing, and a counter 104 which counts frames, to perform various kinds of processing.

The initial-value setting unit 103, controlled by the control unit 101, performs initial-value setting processing. Further, the initial-value setting unit 103 supplies the set initial value to the LTC generation unit 102. The counter 104 counts the number of frames to be processed, based on the synchronization signal supplied to the control unit 101, and supplies the count value to the LTC generation unit 102. Furthermore, a real-time clock 105 holds time information regarding real times and supplies the time information to the LTC generation unit 102, controlled by the control unit 101.

The LTC generation unit 102, controlled by the control unit 101, generates LTC data in synchronization with a frame, using, for example, an initial value supplied from the initial-value setting unit 103 and the count value supplied from the counter 104, and supplies the LTC data to the real-time metadata processing unit 66.

Further, in the case of generating LTC using a real time, the control unit 101 controls the LTC generation unit 102 which performs LTC generation processing, the real-time clock 105 which supplies real time information to perform various kinds of processing. In this case, the LTC generation unit 102, controlled by the control unit 101, generates LTC data in synchronization with a frame, using time information supplied from the real-time clock 105, and supplies the LTC data to the real-time metadata processing unit 66.

Figure 5:
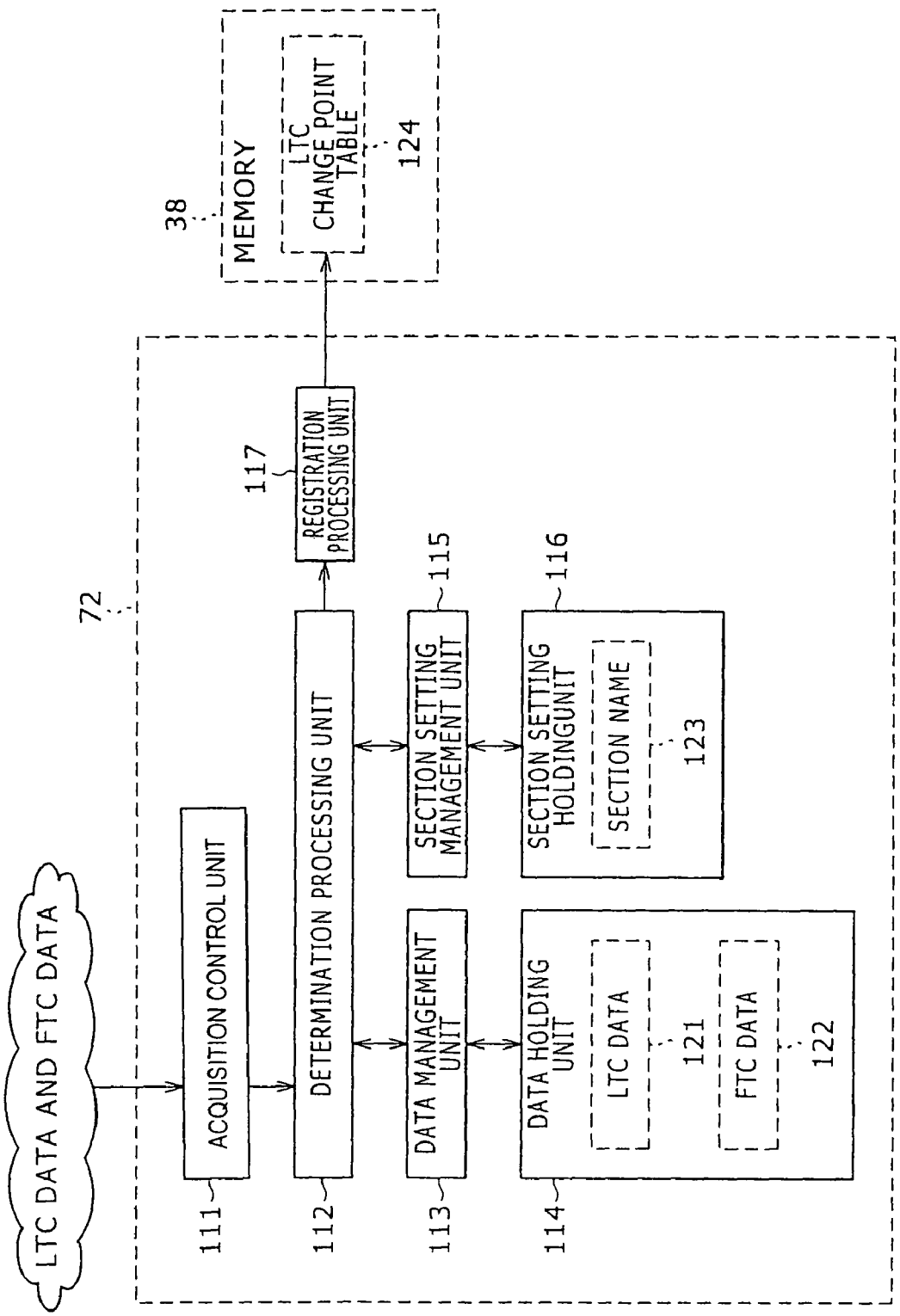
FIG. 5 is a block diagram showing an example of the detailed structure of an LTC data processing unit incorporated in a non-real-time metadata processing unit of FIG. 3.

FIG. 5 is a block diagram showing an example of the detailed structure of the LTC data processing unit 72 in FIG. 3.

In such a case where LTC data is supplied from the real-time metadata processing unit 66, the non-real-time metadata processing unit 67 of FIG. 3, incorporating the LTC data processing unit 72 shown in FIG. 5, supplies the LTC data to the LTC data processing unit 71 and allows it to detect a frame (change point) where the change pattern such as increase or decrease in LTC value changes and to create an LTC change point table which indicates the relationship between LTC and FTC at the change point.

The LTC data processing unit 72 incorporates an acquisition control unit 111 which acquires LTC data and FTC data supplied from the outside, a determination processing unit 112 which performs various kinds of determination processing, a data management unit 113 which manages LTC data and FTC data supplied from the outside, a data holding unit 114 which holds LTC data 121 and FTC data 122, controlled by the data management unit 113, a section setting management unit 115 which manages the setting of a specified section in a clip, supplied from the determination processing unit 112 as described later, a section setting holding unit 116 which holds a set section name 123, controlled by the section setting management unit 115, and a registration processing unit 117 which supplies an LTC change point table supplied from the determination processing unit 112 to the memory 38 which stores the LTC change point table 124.

The acquisition control unit 111 incorporates a cache (not shown) of a predetermined capacity. The acquisition control unit 111 temporarily stores LTC data and FTC data supplied from the real-time metadata processing unit 66 in the incorporated cache and supplies them to the determination processing unit 112 for each predetermined amount of data.

The determination processing unit 112 performs various kinds of determination processing based on various kinds of data from units, allows each unit to store each data based on the determination result, and supplies elements of the generated LTC change point table to the registration processing unit 117.

The data management unit 113 manages the input/output of LTC data 121 and FTC data 122 held in the data holding unit 114. For example, the data management unit 113 supplies LTC data and FTC data supplied from the determination processing unit 112 to the data holding unit 114 which holds the LTC data and the FTC data. Further, the data management unit 113 acquires LTC data 121 and FTC data 122 held in the data holding unit 114 and supplies them to the determination processing unit 112, based on a request from the determination processing unit 112. The data holding unit 114 is composed of a storage medium such as a hard disk. The data holding unit 114 supplies the LTC data 121 and the FTC data 122 held in the storage area to the data management unit 113 and stores the LTC data and the FTC data supplied from the data management unit 113, based on a request from the data management unit 113.

The section setting management unit 115 acquires a section name 123 held in the section setting holding unit 116 and supplies it to the determination processing unit 112, based on a request from the determination processing unit 112. Further, the section setting management unit 115 supplies a section name supplied from the determination processing unit 112 to the section setting holding unit 116 which holds the section name. The section setting holding unit 116 is composed of a storage medium such as a hard disk. The section setting holding unit 116 supplies the section name 123 held in the storage area to the section setting management unit 115 and holds the section name supplied from the section setting management unit 115, based on a request from the section setting management unit 115.

The term "section" refers to a section between adjacent LTC change points dividing a clip. As described above, the LTC change point refers to a frame where a change pattern of increase or decrease in LTC value (LTC change pattern) changes or to a frame whose LTC change pattern differs from an LTC change pattern of the next frame among the frames divided by a plurality of predetermined LTC change patterns, as described later. That is, the LTC change patterns of frames included in one section are all the same. In other words, the section refers to a set of consecutive frames having the same LTC change pattern when all frames included in a clip are divided by the LTC change patterns.

In most cases, video data of a clip is composed of a plurality of frames and provided with a plurality of LTC change points. Since the section refers to a section between adjacent LTC change points, a clip can be divided into a section or a plurality of sections.

As described later, an LTC change pattern is related to the LTC and FTC of the corresponding change point and is registered in the LTC change table, as a section status. LTC change patterns includes "increment" which denotes that the LTC value of the next frame is larger than the LTC value of the current frame by 1, "increase" which denotes that the LTC value of the next frame is larger than the LTC value of the current frame by 2 or more, "still" which denotes that the LTC value of the next frame is the same as the LTC value of the current frame, "decrease" which denotes that the LTC value of the next frame is smaller than the LTC value of the current frame by 1 or more, "end" which denotes that the next frame does not exist (the current frame is the last frame of a clip), and "over" which denotes that there is not enough free space in the memory 38 for creating the LTC change point table in which elements are accumulated.

The section setting holding unit 116 holds the LTC change point table, i.e., the name of a section status, as the section name 123.

The registration processing unit 117 supplies elements of the LTC change point table supplied from the determination processing unit 112 to the memory 38 through the memory controller 37.

Next, referring to the flowchart of FIG. 6, a description will be made as to the recording processing by the control unit 40 in the case where the data conversion unit 39 is configured as shown in FIG. 3.

When the user operates the operation unit 41 and the operation unit 41 supplies an operation signal instructing the control unit 40 to start the recording processing, the control unit 40 starts the recording processing S0.

First, at step S1, the control unit 40 sets an audio annual-ring size Tsa and a video annual-ring size Tsv, and further sets a low-resolution annual-ring size Tsl and a real-time meta annual-ring size Tsm.

The audio annual-ring size Tsa is a variable for determining the amount of audio data to be collectively placed and recorded on the optical disk 31 and is represented, for example, by a playback time period of an audio signal. The video annual-ring size Tsv also is a variable for determining the amount of video data to be collectively placed and recorded on the optical disk 31 and is represented, for example, by a playback time period of a video signal.

Further, the low-resolution annual-ring size Tsl is a variable for determining the amount of low-resolution data to be collectively placed and recorded on the optical disk 31 and is represented, for example, by a playback time period of a video signal (or an audio signal) from which the low-resolution data is generated, in the same way as in the audio annual-ring size Tsa and the video annual-ring size Tsv. The real-time meta annual-ring size Tsm also is a variable for determining the amount of real-time metadata to be collectively placed and recorded on the optical disk 31 and is represented, for example, by a playback time period of a video signal (or an audio signal) of which information (e.g., the date and time when the video was shot) is described by the real-time metadata, in the same way as in the audio annual-ring size Tsa and the video annual-ring size Tsv.

The following is the reason why the audio annual-ring size Tsa, the video annual-ring size Tsv, the low-resolution annual-ring size Tsl, and the real-time meta annual-ring size Tsm are not represented by the amount of data itself such as the number of bits, the number of bytes, but are represented by a playback time period or represented indirectly.

According to the recording processing of FIG. 6, as described later, audio annual-ring data which is a set of audio data for each data amount based on the audio annual-ring size Tsa extracted from a series of audio data A, video annual-ring data which is a set of video data for each data amount based on the video annual-ring size Tsv extracted from a series of video data V, low-resolution annual-ring data which is a set of low-resolution data for each data amount based on the low-resolution annual-ring size Tsl extracted from a data series of low-resolution data, and real-time meta annual-ring data which is a set of real-time metadata for each data amount based on the real-time meta annual-ring size Tsm extracted from a data series of real-time metadata are periodically placed and recorded on the optical disk 31.

In the case where audio annual-ring data, video annual-ring data, low-resolution annual-ring data, and real-time meta annual-ring data are periodically placed and recorded on the optical disk 31 as described, both a video signal and its accompanying audio signal are necessary for playback of video and audio. In viewpoint of the playback, audio annual-ring data at a certain playback time slot and video annual-ring data at the playback time slot should be recorded in positions close to each other such as adjacent positions on the optical disk 31.

Since low-resolution annual-ring data is obtained by reducing the amount of audio annual-ring data and video annual-ring data, audio annual-ring data and video annual-ring data at a certain playback time slot and low-resolution annual-ring data, obtained by reducing the amount of audio annual-ring data and video annual-ring data at the playback time slot, should be recorded in positions close to each other on the optical disk 31. Further, since real-time meta annual-ring data denotes information about audio annual-ring data and video annual-ring data, audio annual-ring data and video annual-ring data at a certain playback time slot and real-time meta annual-ring data denoting information about audio annual-ring data at the playback time slot also should be recorded in positions close to each other on the optical disk 31.

However, when the amounts of data are compared between audio data and video data for the same playback time period, the amounts of data vary greatly between audio data and video data, in general. In other words, the amount of audio data for a certain playback time period is much smaller than that of video data. Further, there are cases where the data rates of audio data and video data are not fixed but variable. In the same way, when the data rates of audio data and video data are compared to the data rates of low-resolution data and real-time metadata for the same playback time period, the data rates of low-resolution data and real-time metadata are smaller than those of audio data and video data.

If the audio annual-ring size Tsa and the video annual-ring size Tsv are represented by the amount of data, and audio annual-ring data and video annual-ring data for each data amount are extracted in sequence from series of audio data and video data, respectively, audio annual-ring data at a playback time slot ahead of that of video annual-ring data is obtained, thereby making it difficult to place audio data and video data, which should be played back at the same playback time slot, in positions close to each other on the optical disk 31.

As in the case of representing the audio annual-ring size Tsa and the video annual-ring size Tsv by the amount of data, if the low-resolution annual-ring size Tsl and the real-time meta annual-ring size Tsm are represented by the amount of data, it becomes difficult to place audio data, video data, low-resolution data, and real-time metadata, which should be played back at similar playback time slots, in positions close to each other on the optical disk 31.

For this reason, the audio annual-ring size Tsa, the video annual-ring size Tsv, the low-resolution annual-ring size Tsl, and the real-time meta annual-ring size Tsm are represented by a playback time period, thereby making it possible to place audio data, video data, low-resolution data, and real-time metadata, which should be played back at similar playback time slots, in positions close to each other on the optical disk 31.

The audio annual-ring size Tsa, the video annual-ring size Tsv, the low-resolution annual-ring size Tsl, and the real-time meta annual-ring size Tsm which are set at step S1 may be predetermined fixed values or variable values. In the case where the audio annual-ring size Tsa, the video annual-ring size Tsv, the low-resolution annual-ring size Tsl, and the real-time meta annual-ring size Tsm are variable values, the variable values can be inputted by operating the operation unit 41, for example.

After step S1, the processing goes to step S2, where the control unit 40 controls the data conversion unit 39 so that the data conversion unit 39 starts audio signal conversion processing and video signal conversion processing for compressing/encoding an audio signal and a video signal supplied from the signal input/output device 51 to the disk recording/playback apparatus 30 into a series of audio data and a series of video data and also controls the memory controller 37 so that the memory controller 37 starts audio data storage processing and video data storage processing for supplying audio data and video data obtained at the data conversion unit 39 to the memory 18 which stores the audio data and the video data.

Further, at step S2, the control unit 40 controls the data conversion unit 39 so that the data conversion unit 39 starts real-time metadata processing for processing a series of real-time metadata supplied from the signal input/output device 51 to the disk recording/playback apparatus 30 and low-resolution data generation processing for generating a series of low-resolution data from an audio signal and a video signal supplied from the signal input/output device 51 to the disk recording/playback apparatus 30 and also controls the memory controller 37 so that the memory controller 37 starts real-time metadata storage processing and low-resolution data storage processing for supplying real-time metadata and low-resolution data obtained at the data conversion unit 39 to the memory 38 which stores the real-time metadata and the low-resolution data.

Furthermore, at step S2, the control unit 40 controls the data conversion unit 39 so that the data conversion unit 39 starts non-real-time metadata processing for processing a series of non-real-time metadata supplied from the signal input/output device 51 to the disk recording/playback apparatus 30 and for performing processing LTC using LTC contained in non-real-time metadata obtained and also controls the memory controller 37 so that the memory controller 37 starts non-real-time metadata storage processing for supplying non-real-time metadata obtained at the data conversion unit 39 to the memory 38 which stores the non-real-time metadata.

At step S3, the control unit 40 starts an audio data recording task which is a control task for recording audio data onto the optical disk 31. At step 4, the control unit 40 starts a video data recording task which is a control task for recording video data onto the optical disk 31, and advances the processing to step S5. At step S5, the control unit 40 starts a low-resolution data recording task which is a control task for recording low-resolution data onto the optical disk 31. At step 6, the control unit 40 starts a real-time metadata recording task which is a control task for recording real-time metadata onto the optical disk 31, and advances the processing to step S7. Detailed description will be made later as to the audio data recording task at step S3, the video data recording task at step S4, the low-resolution data recording task at step S5, and the real-time metadata recording task at step S6.

At step S7, the control unit 40 determines whether an operation signal of an instruction to end data recording is supplied from the operation unit 41. If the control unit 40 determines that an operation signal is not supplied from the operation unit 41, the processing goes to step S8, where the control unit 40 determines whether all recording tasks have ended. At step S8, if the control unit 40 determines that all recording tasks have not ended, the control unit 40 returns the processing to step S7 to repeat steps S7 and S8.

On the other hand, at step S7, if the control unit 40 determines that an operation signal of an instruction to end data recording is supplied from the operation unit 41, that is, for example, if the user operates the operation unit 41 so as to end the data recording, the processing goes to step S9, where the control unit 40 ends the audio signal conversion processing, the video signal conversion processing, the real-time metadata processing, the low-resolution data generation processing, the audio data storage processing, the video data storage processing, the real-time metadata storage processing, and the low-resolution data storage processing, which are initiated at step S2, and the processing goes to step S10.

At step S10, as in the case of step S8, the control unit 40 determines whether all recording tasks have ended, and the processing remains at step 10 until the control unit 40 determines that all recording tasks have ended.

At step S10, if the control unit 40 determines that all recording tasks have ended, that is, if all of the audio data recording task initiated at step S3, the video data recording task initiated at step S4, the low-resolution data recording task initiated at step S5, and the real-time metadata recording task initiated at step S6 end, the control unit 40 advances the processing to step S11.

At step S8, if the control unit 40 determines that all recording tasks have ended, that is, if all of the audio data recording task initiated at step S3, the video data recording task initiated at step S4, the low-resolution data recording task initiated at step S5, and the real-time metadata recording task initiated at step S6 end, the control unit 40 advances the processing to step S11.

At step S11, the control unit 40 controls the memory controller 37 to read non-real-time metadata stored in the memory 38, perform padding so that the amount of non-real-time metadata becomes an integral multiple of the amount of data in one sector, and supply it to the signal processing unit 36, and thereby performs recording control so that the non-real-time metadata whose amount is an integral multiple of the amount of data in one sector is recorded in the corresponding number of sectors.

The control unit 40 advances the processing to step S12, where the control unit 40 ends the non-real-time metadata processing and the non-real-time metadata storage processing to end the recording processing.

Next, referring to the flowchart of FIG. 7, a description will be made of the audio data recording task initiated at step S3 in FIG. 6.

When the audio data recording task starts S30, first, at step S31, the control unit 40 initializes a variable Na which is incremented by 1 at step S37 (performed later) to, for example, 1, and the processing goes to step S32.

At step S32, the control unit 40 determines whether Tsa×Na is equal to or less than Tsv×Nv, and further determines whether Tsa×Na is equal to or less than Tsl×Nl and is equal to or less than Tsm×Nm.

Here, Tsa is an audio annual-ring size and represents a playback time period of an audio signal. The variable Na is incremented by 1 every time audio data (audio annual-ring data) whose amount is based on the audio annual-ring size Tsa is recorded onto the optical disk 31, as described later. In the same manner, Tsv is a video annual-ring size, and the variable Nv is incremented by 1 every time video data (video annual-ring data) whose amount is based on the audio annual-ring size Tsv is recorded onto the optical disk 31, as described later.

Further, Tsl is a low-resolution annual-ring size, and the variable Nl is incremented by 1 every time low-resolution data (low-resolution annual-ring data) whose amount is based on the low-resolution annual-ring size Tse is recorded onto the optical disk 31, as described later. Furthermore, Tsm is a real-time meta annual-ring size, and the variable Nm is incremented by 1 every time real-time metadata (real-time meta annual-ring data) whose amount is based on the real-time meta annual-ring size Tsm is recorded onto the optical disk 31, as described later.

Therefore, Tsa×Na corresponds to the last playback time of audio annual-ring data to be recorded onto the optical disk 31 in the case where audio data is recorded in units of the audio annual-ring size Tsa. Tsv×Nv corresponds to the last playback time of video annual-ring data to be recorded onto the optical disk 31 in the case where video data is recorded in units of the video annual-ring size Tsv. Tsl×Nl corresponds to the last playback time of low-resolution annual-ring data to be recorded onto the optical disk 31 in the case where low-resolution data is recorded in units of the low-resolution annual-ring size Tse. Tsm×Nm corresponds to the last playback time of real-time meta annual-ring data to be recorded onto the optical disk 31 in the case where real-time metadata is recorded in units of the real-time meta annual-ring size Tsm.

Here, assume that audio annual-ring data, video annual-ring data, low-resolution annual-ring data, and real-time meta annual-ring data at similar playback time slots are periodically placed so as to be recorded in positions close to each other on the optical disk 31. Further, assume that audio annual-ring data, video annual-ring data, low-resolution annual-ring data, and real-time meta annual-ring data, in order of earliest playback time, are placed in forwarder positions (positions based on the order they are read/written) on the optical disk 31. Furthermore, assume that audio annual-ring data, video annual-ring data, low-resolution annual-ring data, and real-time meta annual-ring data at similar playback time slots are placed in forwarder positions on the optical disk 31, for example, in the order of the audio annual-ring data, the video annual-ring data, the low-resolution annual-ring data, and the real-time meta annual-ring data.

In this case, audio annual-ring data of interest as audio annual-ring data to be recorded is audio annual-ring data at the latest (closest to the playback time Tsa×Na) playback time slot prior to the playback time Tsa×Na. The audio annual-ring data of interest needs to be recorded just before video annual-ring data, low-resolution annual-ring data, and real-time meta annual-ring data at the latest playback time slot prior to the playback time Tsa×Na are recorded, that is, just after video annual-ring data, low-resolution annual-ring data, and real-time meta annual-ring data at the second latest playback time slot prior to the playback time Tsa×Na are recorded.

Video annual-ring data to be recorded is video annual-ring data at the latest playback time slot prior to Tsv×Nv. Low-resolution annual-ring data to be recorded is low-resolution annual-ring data at the latest playback time slot prior to Tsl×Nl. Real-time meta annual-ring data to be recorded is real-time meta annual-ring data at the latest playback time slot prior to Tsm×Nm. Regarding annual-ring data at similar playback time slots, the audio annual-ring data is placed in a forwarder position, as described above. Therefore, the audio annual-ring data of interest needs to be recorded with timing in which Tsa×Na (playback time of audio annual-ring data) is equal to or less than Tsv×Nv (playback time of video annual-ring data), is equal to or less than Tsl×Nl (playback time of low-resolution annual-ring data), and is equal to or less than Tsm×Nm (playback time of real-time meta annual-ring data).

Accordingly, it is determined at step S32 whether Tsa×Na (playback time of audio annual-ring data) is equal to or less than Tsv×Nv (playback time of video annual-ring data), is equal to or less than Tsl×Nl (playback time of low-resolution annual-ring data), and is equal to or less than Tsm×Nm (playback time of real-time meta annual-ring data), as described above. Thus, it is determined whether the current timing is a timing for recording audio annual-ring data of interest.

At step S32, if the control unit 40 determines that Tsa×Na (playback time of audio annual-ring data) is more than Tsv×Nv (playback time of video annual-ring data), Tsl×Nl (playback time of low-resolution annual-ring data), or Tsm×Nm (playback time of real-time meta annual-ring data), that is, the current timing is not a timing for recording audio annual-ring data of interest, the control unit 40 returns the processing to step S32 for repetition.

Further, at step S32, if the control unit 40 determines that Tsa×Na (playback time of audio annual-ring data) is equal to or less than Tsv×Nv (playback time of video annual-ring data), Tsl×Nl (playback time of low-resolution annual-ring data), and Tsm×Nm (playback time of real-time meta annual-ring data), that is, the current timing is a timing for recording audio annual-ring data of interest, the control unit 40 advances the processing to step S33, where the control unit 40 determines whether audio data is supplied from the data conversion unit 39 through the memory controller 37 to the memory 38. At step S33, if the control unit 40 determines that audio data is supplied to the memory 38, the control unit 40 advances the processing to step S34.

At step S34, the control unit 40 determines whether audio data of an audio signal necessary to playback for the audio annual-ring size Tsa×Na has been accumulatively stored in the memory 38. If the control unit 40 determines that the audio data for Tsa×Na has not been stored in the memory 38, the processing returns to step S32 to repeat the steps thereafter. Further, at step S34, if the control unit 40 determines that the audio data for the playback time period Tsa×Na has been stored in the memory 38, the control unit 40 advances the processing to step S35.

When the data amount detection unit 62 in the data conversion unit 39 detects an accumulative audio signal necessary to playback for the playback time period Tsa×Na, the data amount detection unit 62 sends the detection information to the memory controller 37. Based on the detection information, the memory controller 37 determines whether audio data necessary to playback for the playback time period Tsa×Na has been accumulatively stored in the memory 38, and sends the determination result to the control unit 40. The control unit 40 performs the determination at step S34 based on the determination result from the memory controller 37. In this embodiment, video data obtained by compressing/encoding an audio signal is stored in the memory 38. However, an audio signal, without being compressed/encoded, can be stored in the memory 38 as audio data.

At step S35, the control unit 40 controls the memory controller 37 so that the memory controller 37 reads and extracts, from audio data stored in the memory 38 in a first-in-first-out manner, audio data having the maximum amount of data readable from the memory 38 that is an integral multiple of (n times) the amount Su of data in a physical recording/playback unit (physical unit area) formed on the optical disk 31, for example, one sector. After that, the processing goes to step S36. Further, audio annual-ring data read from the memory 38 as audio data, having the maximum amount of data readable from the memory 38 that is an integral multiple of the amount of data in one sector, is the above-described latest audio annual-ring data prior to the playback time Tsa×Na.

At step S36, the control unit 40 allows the memory controller 37 to supply the audio annual-ring data of interest (obtained at step S35) having the amount of data that is an integral multiple of the amount of data in one sector to the signal processing unit 36, and thereby performs recording control so that the audio annual-ring data of interest having the amount of data that is an integral multiple of the amount of data in one sector is recorded in the corresponding number of sectors.

After performing recording control of the audio annual-ring data of interest at step S36 as described above, the control unit 40 advances the processing to step S37. At step S37, the control unit 40 increments the variable Na by 1 and returns the processing to step S32 to repeat the steps thereafter.

On the other hand, at step S33, if the control unit 40 determines that audio data is not supplied to the memory 38, that is, if the supply of audio data from the data conversion unit 39 to the memory controller 37 is stopped, the control unit 40 advances the processing to step S38. At step S38, the control unit 40 controls the memory controller 37 to read all audio data remaining in the memory 38 and add padding data to the audio data so that its amount becomes the minimum amount of data that is an integral multiple of the amount of data in one sector. Thus, the audio data read from the memory 38 is formed into audio annual-ring data having the amount of data that is an integral multiple of the amount of data in one sector. Further, the control unit 40 allows the memory controller 37 to supply the audio annual-ring data to the signal processing unit 36, and thereby performs recording control so that the audio annual-ring data having the amount of data that is an integral multiple of the amount of data in one sector is recorded in the corresponding number of sectors.

Subsequently, the processing goes to step S39, where the control unit 40 sets the variable Na to a value corresponding to infinity (an extremely large value) and ends the audio data recording task S40.

In the above case, the sector is used as a physical unit area of the optical disk 31. However, it is also possible to use, for example, an ECC (Error Correction Code) block in which unit data subjected to ECC processing is recorded, as a physical unit area of the optical disk 31. Further, it is possible to use, for example, a fixed number of sectors and a fixed number of ECC blocks as physical unit areas of the optical disk 31.

The ECC processing is performed in units of ECC blocks in the signal processing unit 36 for example. A sector can be composed of one or more ECC blocks. Alternatively, at least one ECC block can be used.

In the description below, one sector is used as a physical unit area of the optical disk 31. Assuming that one sector forms one ECC block, the result of recording data on the optical disk 31 is the same, regardless of whether a sector or an ECC block is used as a physical unit area.

Next, referring to the flowchart of FIG. 8, a description will be made of the video data recording task initiated at step S4 in FIG. 6.

When the video data recording task starts S50, first at step S51 the control unit 40 initializes the variable Nv, which is incremented by 1 at step S57 (described later), to, for example, 1, and the processing goes to step S52.

At step S52, the control unit 40 determines whether Tsv×Nv is less than Tsa×Na, and further determines whether Tsv×Nv is equal to or less than Tsl×Nl and is equal to or less than Tsm×Nm.

As described above, assume that audio annual-ring data and video annual-ring data at similar playback time slots are periodically placed so as to be recorded in positions close to each other on the optical disk 31. Further, audio annual-ring data and video annual-ring data at similar playback time slots are recorded so that the audio annual-ring data is firstly placed and the video annual-ring data is subsequently placed. In the case where video annual-ring data to be recorded is referred to as "video annual-ring data of interest", the video annual-ring data of interest is video annual-ring data at the latest (closest to the playback time Tsv×Nv) playback time slot prior to the playback time Tsv×Nv. The video annual-ring data of interest needs to be recorded just after audio annual-ring data at the latest playback time slot prior to the playback time Tsa×Na is recorded, and just before low-resolution annual-ring data, and real-time meta annual-ring data at the latest playback time slot prior to the playback time Tsa×Na are recorded. Therefore, the video annual-ring data of interest needs to be recorded with timing in which Tsv×Nv (playback time of video annual-ring data) is less than Tsa×Na (playback time of audio annual-ring data) and is equal to or less than Tsl×Nl (playback time of low-resolution annual-ring data) and Tsm×Nm (playback time of real-time meta annual-ring data).

Accordingly, it is determined at step S52 whether Tsv×Nv (playback time of video annual-ring data) is less than Tsa×Na (playback time of audio annual-ring data) and is equal to or less than Tsl×Nl (playback time of low-resolution annual-ring data) and Tsm×Nm (playback time of real-time meta annual-ring data), as described above. Thus, it is determined whether the current timing is a timing for recording video annual-ring data of interest.

Therefore, as described above, it is determined at step S52 whether Tsv×Nv (playback time of video annual-ring data) is less than Tsa×Na (playback time of audio annual-ring data). Thus, it is determined whether the current timing is a timing for recording video annual-ring data of interest.

At step S52, if the control unit 40 determines that Tsv×Nv (playback time of video annual-ring data) is equal to or more than Tsa×Na (playback time of audio annual-ring data) or is more than Tsl×Nl (playback time of low-resolution annual-ring data) or Tsm×Nm (playback time of real-time meta annual-ring data), that is, the current timing is not a timing for recording video annual-ring data of interest, the control unit 40 returns the processing to step S52 for repetition.

Further, at step S52, if the control unit 40 determines that Tsv×Nv (playback time of video annual-ring data) is less than Tsa×Na (playback time of audio annual-ring data) and is equal to or less than Tsl×Nl (playback time of low-resolution annual-ring data) and Tsm×Nm (playback time of real-time meta annual-ring data), that is, the current timing is a timing for recording video annual-ring data of interest, the control unit 40 advances the processing to step S53, where the control unit 40 determines whether video data is supplied from the data conversion unit 39 through the memory controller 37 to the memory 38. At step S53, if the control unit 40 determines that video data is supplied to the memory 38, the processing goes to step S54.

At step S54, the control unit 40 determines whether video data of a video signal necessary to playback for the video annual-ring size Tsv×Nv has been accumulatively stored in the memory 38. If the control unit 40 determines that the video data for Tsv×Nv has not been stored in the memory 38, the processing returns to step S52 to repeat the steps thereafter. Further, at step S54, if the control unit 40 determines that the video data for the playback time period Tsv×Nv has been stored in the memory 38, the control unit 40 advances the processing to step S55.

When the data amount detection unit 62 in the data conversion unit 39 detects an accumulative video signal necessary to playback for the playback time period Tsv×Nv, the data amount detection unit 62 sends the detection information to the memory controller 37. Based on the detection information, the memory controller 37 determines whether video data necessary to playback for the playback time period Tsv×Nv has been accumulatively stored in the memory 38 and sends the determination result to the control unit 40. The control unit 40 performs the determination at step S54 based on the determination result from the memory controller 37. In this embodiment, video data obtained by compressing/encoding a video signal is stored in the memory 38. However, a video signal, without being compressed/encoded, can be stored in the memory 38 as video data.

At step S55, the control unit 40 controls the memory controller 37 so that the memory controller 37 reads and extracts, from video data stored in the memory 38 in a first-in-first-out manner, video data having the maximum amount of data readable from the memory 38 that is an integral multiple of (n times) the amount of data in a physical recording/playback unit (physical unit area) formed on the optical disk 31, for example, one sector. After that, the processing goes to step S56. Further, video annual-ring data read from the memory 38 as video data, having the maximum amount of data readable from the memory 38 that is an integral multiple of the amount of data in one sector, is the above-described latest video annual-ring data prior to the playback time Tsv×Nv.

At step S56, the control unit 40 allows the memory controller 37 to supply the video annual-ring data of interest (obtained at step S55) having the amount of data that is an integral multiple of the amount of data in one sector to the signal processing unit 36 and thereby performs recording control so that the video annual-ring data of interest having the amount of data that is an integral multiple of the amount of data in one sector is recorded in the corresponding number of sectors.

After performing recording control of the video annual-ring data of interest at step S56 as described above, the control unit 40 advances the processing to step S57. At step S57, the control unit 40 increments the variable Nv by 1 and returns the processing to step S52 to repeat the steps thereafter.

On the other hand, at step S53, if the control unit 40 determines that video data is not supplied to the memory 38, that is, if the supply of video data from the data conversion unit 39 to the memory controller 37 is stopped, the control unit 40 advances the processing to step S58. At step S58, the control unit 40 controls the memory controller 37 to read all video data remaining in the memory 38 and add padding data to the video data so that its amount becomes the minimum amount of data that is an integral multiple of the amount of data in one sector. Thus, the video data read from the memory 38 is formed into video annual-ring data having the amount of data that is an integral multiple of the amount of data in one sector. Further, the control unit 40 allows the memory controller 37 to supply the video annual-ring data to the signal processing unit 36 and thereby performs recording control so that the video annual-ring data having the amount of data that is an integral multiple of the amount of data in one sector is recorded in the corresponding number of sectors.

After the completion of step S58, the control unit 40 advances the processing to step S59, where the control unit 40 sets the variable Nv to a value corresponding to infinity and ends the video data recording task S60.

Next, referring to the flowchart of FIG. 9, a description will be made of the low-resolution data recording task initiated at step S5 in FIG. 6.

When the low-resolution data recording task starts S70, first at step S71, the control unit 40 initializes the variable Nl which is incremented by 1 at step S77 (described later) to, for example, 1, and the processing goes to step S72.

At step S72, the control unit 40 determines whether Tsl×Nl is less than Tsa×Na and Tsv×Nv and is equal to or less than Tsm×Nm.

Figure 8:
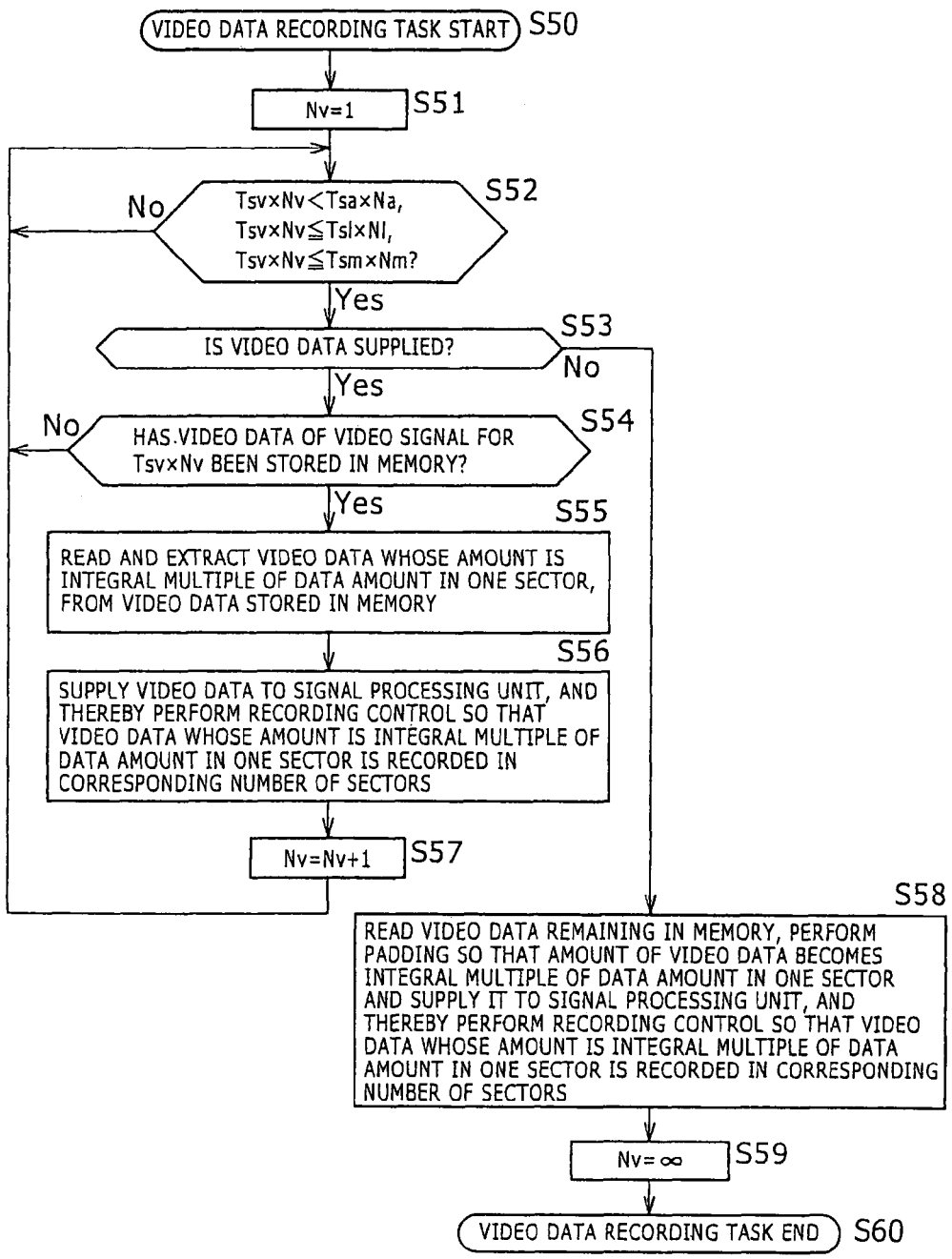
FIG. 8 is a flowchart of assistance in explaining the video data recording task initiated at step S4 in FIG. 6.

As in the case of step S52 in FIG. 8, a state in which Tsl×Nl is less than Tsa×Na is a condition for recording low-resolution annual-ring data of interest as low-resolution annual-ring data to be recorded just after audio annual-ring data at the latest playback time slot prior to the playback time Tsl×Nl is recorded. Further, as in the case of step S52 in FIG. 8, a state in which Tsl×Nl is less than Tsv×Nv is a condition for recording low-resolution annual-ring data of interest as low-resolution annual-ring data to be recorded just after video annual-ring data at the latest playback time slot prior to the playback time Tsl×Nl is recorded.

Figure 7:
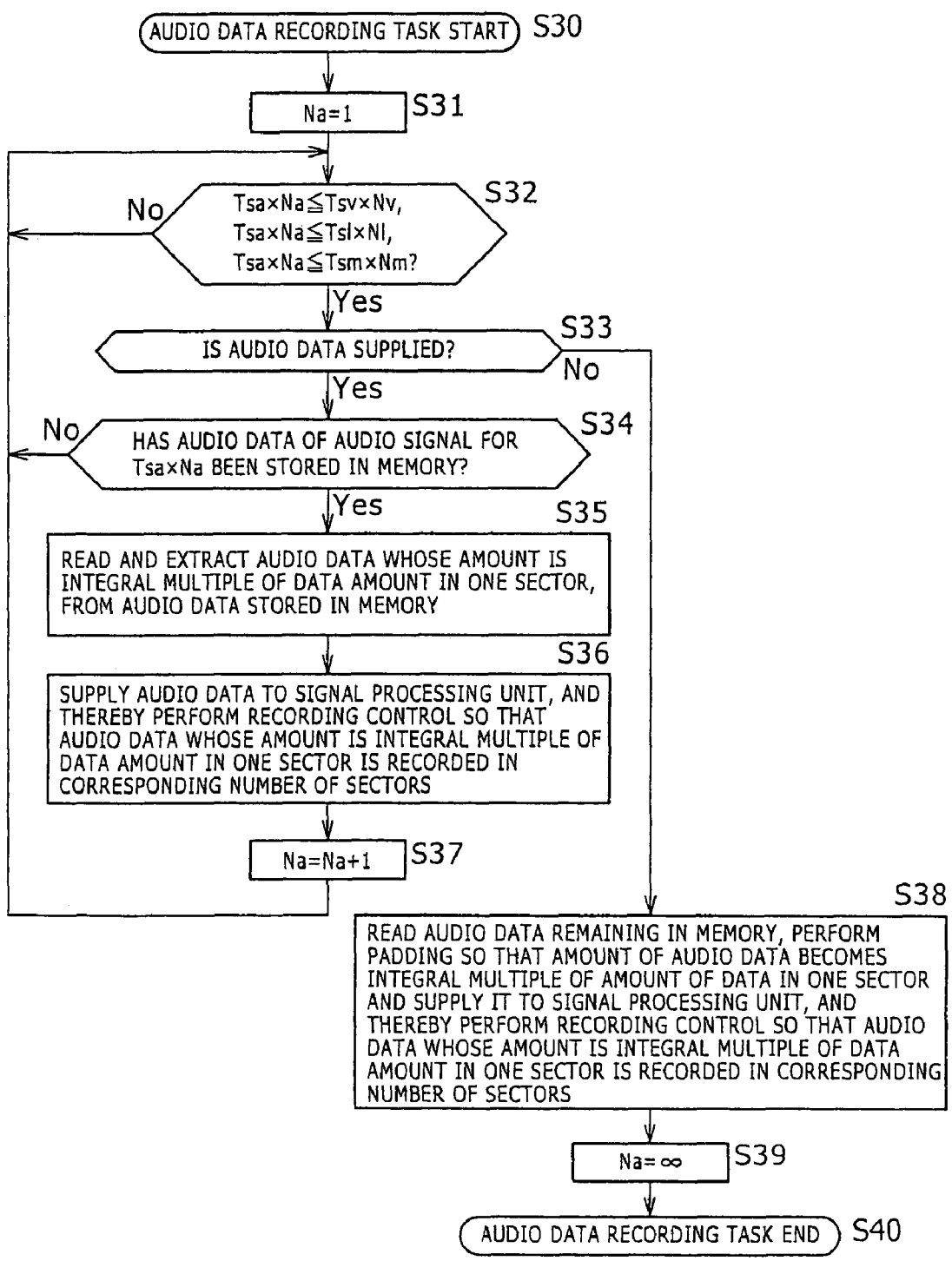
FIG. 7 is a flowchart of assistance in explaining the audio data recording task initiated at step S3 in FIG. 6.

Furthermore, as in the case of step S32 in FIG. 7, a state in which Tsl×Nl is equal to or less than Tsm×Nm is a condition for recording low-resolution annual-ring data of interest as low-resolution annual-ring data to be recorded, that is, low-resolution annual-ring data at the latest (closest to the playback time Tsl×Nl) playback time slot prior to the playback time Tsl×Nl, just before real-time meta annual-ring data at the latest playback time slot prior to the playback time Tsl×Nl is recorded, that is, just after real-time meta annual-ring data at the second latest playback time slot prior to the playback time Tsl×Nl is recorded.

At step S72, if the control unit 40 determines that Tsl×Nl (playback time of low-resolution annual-ring data) is equal to or more than Tsa×Na (playback time of audio annual-ring data) or Tsv×Nv (playback time of video annual-ring data) or is more than Tsm×Nm (playback time of real-time meta annual-ring data), that is, the current timing is not a timing for recording low-resolution annual-ring data of interest, the control unit 40 returns the processing to step S72 for repetition.

Further, at step S72, if the control unit 40 determines that Tsl×Nl (playback time of low-resolution annual-ring data) is less than Tsa×Na (playback time of audio annual-ring data) and Tsv×Nv (playback time of video annual-ring data) and is equal to or less than Tsm×Nm (playback time of real-time meta annual-ring data), that is, the current timing is a timing for recording low-resolution annual-ring data of interest, the processing goes to step S73, where the control unit 40 determines whether low-resolution data is supplied from the data conversion unit 19 through the memory controller 17 to the memory 18. At step S73, if the control unit 40 determines that low-resolution data is supplied to the memory, the processing goes to step S74.

At step S74, the control unit 40 determines whether low-resolution data necessary to playback for the low-resolution annual-ring size Tsl×Nl has been accumulatively stored in the memory 38. If the control unit 40 determines that the low-resolution data for Tsl×Nl has not been stored in the memory 38, the processing returns to step S72 to repeat the steps thereafter. Further, at step S74, if the control unit 40 determines that the low-resolution data for the playback time period Tsl×Nl has been stored in the memory 38, the processing goes to step S75.

When the data amount detection unit 42 in the data conversion unit 39 detects an accumulative video signal and audio signal necessary to playback for the playback time period Tsl×Nl, the data amount detection unit sends the detection information to the memory controller 37. Based on the detection information, the memory controller 37 determines whether low-resolution data necessary to playback for the playback time period Tsl×Nl has been accumulatively stored in the memory 38, and sends the determination result to the control unit 40. The control unit 40 performs the determination at step S74 based on the determination result from the memory controller 37. In this embodiment, low-resolution data is generated by compressing/encoding a video signal etc. whose data amount is reduced. However, a video signal etc. whose data amount is reduced can be low-resolution data without being compressed/encoded.

At step S75, the control unit 40 controls the memory controller 37 so that the memory controller 37 reads and extracts, from low-resolution data stored in the memory 38, in a first-in-first-out manner, low-resolution data having the maximum amount of data readable from the memory 38 that is an integral multiple of (n times) the amount of data in a physical recording/playback unit (physical unit area) formed on the optical disk 31, for example, one sector. After that, the processing goes to step S76.

Further, low-resolution annual-ring data read from the memory 38 as low-resolution data having, the maximum amount of data readable from the memory 38 that is an integral multiple of the amount of data in one sector, is the above-described latest low-resolution annual-ring data prior to the playback time Tsl×Nl.

Further, low-resolution data that has not been read out at step S75 remains in the memory 38.

At step S76, the control unit 40 allows the memory controller 37 to supply the low-resolution annual-ring data of interest (obtained at step S75) having the amount of data that is an integral multiple of the amount of data in one sector to the signal processing unit 36, and thereby performs recording control so that the low-resolution annual-ring data of interest having the amount of data that is an integral multiple of the amount of data in one sector is recorded in the corresponding number of sectors. Thereby, the low-resolution annual-ring data having the amount of data that is an integral multiple of the amount of data in one sector is recorded in the corresponding number of sectors in such a way that the boundaries of low-resolution annual-ring data coincide with the boundaries of sectors of the optical disk 31.

Subsequently, the processing goes to step S77, where the control unit 40 increments the variable Nl by 1 and returns the processing to step S72 to repeat the steps thereafter.

On the other hand, at step S73, if the control unit 40 determines that low-resolution data is not supplied to the memory 38, that is, if the supply of low-resolution data from the data conversion unit 39 to the memory controller 37 is stopped, the processing goes to step S78. At step S78, the control unit 40 controls the memory controller 37 to read all low-resolution data remaining in the memory 38 and add padding data to the low-resolution data so that its amount becomes the minimum amount of data that is an integral multiple of the amount of data in one sector. Thus, the low-resolution data read from the memory 38 is formed into low-resolution annual-ring data having the amount of data that is an integral multiple of the amount of data in one sector. Further, the control unit 40 allows the memory controller 37 to supply the low-resolution annual-ring data to the signal processing unit 36 and thereby performs recording control so that the low-resolution annual-ring data having the amount of data that is an integral multiple of the amount of data in one sector is recorded in the corresponding number of sectors.

Subsequently, the processing goes to step S79, where the control unit 40 sets the variable Nl to a value corresponding to infinity and ends the low-resolution data recording task.

Next, referring to the flowchart of FIG. 10, a description will be made of the real-time metadata recording task initiated at step S5 in FIG. 6.

When the real-time metadata recording task starts S90, first at step S91, the control unit 40 initializes the variable Nm which is incremented by 1 at step S97 (described later) to, for example, 1, and the processing goes to step S92.

At step S92, the control unit 40 determines whether Tsm×Nm is less than Tsa×Na, Tsv×Nv, and Tsl×Nl.

As in the case of step S52 in FIG. 8, a state in which Tsm×Nm is less than Tsa×Na is a condition for recording real-time meta annual-ring data of interest as real-time meta annual-ring data to be recorded just after audio annual-ring data at the latest playback time slot prior to the playback time Tsm×Nm is recorded. Further, as in the case of step S72 in FIG. 9, a state in which Tsm×Nm is less than Tsv×Nv is a condition for recording real-time meta annual-ring data of interest as real-time meta annual-ring data to be recorded just after video annual-ring data at the latest playback time slot prior to the playback time Tsm×Nm is recorded. Furthermore, a state in which Tsm×Nm is less than Tsl×Nl is a condition for recording real-time meta annual-ring data of interest as real-time meta annual-ring data to be recorded just after low-resolution annual-ring data at the latest playback time slot prior to the playback time Tsm×Nm is recorded.

At step S92, if the control unit 40 determines that Tsm×Nm (playback time of real-time meta annual-ring data) is equal to or more than Tsa×Na (playback time of audio annual-ring data), Tsv×Nv (playback time of video annual-ring data), or Tsl×Nl (playback time of real-time meta annual-ring data), that is, the current timing is not a timing for recording real-time meta annual-ring data of interest, the processing returns to step S92 for repetition.

Further, at step S92, if the control unit 40 determines that Tsm×Nm (playback time of real-time meta annual-ring data) is less than Tsa×Na (playback time of audio annual-ring data), Tsv×Nv (playback time of video annual-ring data), and Tsl×Nl (playback time of low-resolution annual-ring data), that is, the current timing is a timing for recording real-time meta annual-ring data of interest, the processing goes to step S93, where the control unit 40 determines whether real-time metadata is supplied from the data conversion unit 39 through the memory controller 37 to the memory 38. At step S93, if the control unit 40 determines that real-time metadata is supplied to the memory 38, the processing goes to step S94.

At step S94, the control unit 40 determines whether real-time metadata necessary to playback for the real-time meta annual-ring size Tsm×Nm has been accumulatively stored in the memory 38. If the control unit 40 determines that the real-time metadata for Tsm×Nm has not been stored in the memory 38, the processing returns to step S92 to repeat the steps thereafter. Further, at step S94, if the control unit 40 determines that the real-time metadata for the playback time period Tsm×Nm has been stored in the memory 38, the processing goes to step S95.

When the data amount detection unit 62 in the data conversion unit 39 detects an accumulative video signal and audio signal necessary to playback for the playback time period Tsm×Nm, the data amount detection unit 62 sends the detection information to the memory controller 37. Based on the detection information, the memory controller 37 determines whether real-time metadata necessary to playback for the playback time period Tsm×Nm has been accumulatively stored in the memory 38 and sends the determination result to the control unit 40. The control unit 40 performs the determination at step S94 based on the determination result from the memory controller 37.

At step S95, the control unit 40 controls the memory controller 37 so that the memory controller 37 reads and extracts, from real-time metadata stored in the memory 38, in a first-in-first-out manner, metadata having the maximum amount of data readable from the memory 38 that is an integral multiple of (n times) the amount of data in a physical recording/playback unit (physical unit area) formed on the optical disk 31, for example, one sector. After that, the processing goes to step S96.

Further, real-time meta annual-ring data read from the memory 38 as real-time metadata, having the maximum amount of data readable from the memory 38 that is an integral multiple of the amount of data in one sector, is the above-described latest real-time meta annual-ring data prior to the playback time Tsm×Nm.

Further, real-time metadata that has not been read out at step S95 remains in the memory 38.

At step S96, the control unit 40 allows the memory controller 37 to supply the meta annual-ring data of interest (obtained at step S95) having the amount of data that is an integral multiple of the amount of data in one sector to the signal processing unit 36, and thereby performs recording control so that the real-time meta annual-ring data of interest having the amount of data that is an integral multiple of the amount of data in one sector is recorded in the corresponding number of sectors. Thereby, the meta annual-ring data having the amount of data that is an integral multiple of the amount of data in one sector is recorded in the corresponding number of sectors in such a way that the boundaries of real-time meta annual-ring data coincide with the boundaries of sectors of the optical disk 31.

Subsequently, the processing goes to step S97, where the control unit 40 increments the variable Nm by 1 and returns the processing to step S92 to repeat the steps thereafter.

On the other hand, at step S93, if the control unit 40 determines that real-time metadata is not supplied to the memory 38, that is, if the supply of real-time metadata from the data conversion unit 39 to the memory controller 37 is stopped, the processing goes to step S98. At step S98, the control unit 40 controls the memory controller 37 to read all real-time metadata remaining in the memory 38 and add padding data to the real-time metadata so that its amount becomes the minimum amount of data that is an integral multiple of the amount of data in one sector. Thus, the real-time metadata read from the memory 38 is formed into real-time meta annual-ring data having the amount of data that is an integral multiple of the amount of data in one sector. Further, the control unit 40 allows the memory controller 37 to supply the real-time meta annual-ring data to the signal processing unit 36, and thereby performs recording control so that the real-time meta annual-ring data having the amount of data that is an integral multiple of the amount of data in one sector is recorded in the corresponding number of sectors.

Subsequently, the processing goes to step S99, where the control unit 40 sets the variable Nm to a value corresponding to infinity and ends the real-time metadata recording task S100.

As described above, the real-time metadata includes, for example, LTC, a user bit, UMID, an essence mark, ARIB metadata, or setting/control information of a video camera with which shooting has been performed.

Figure 11:
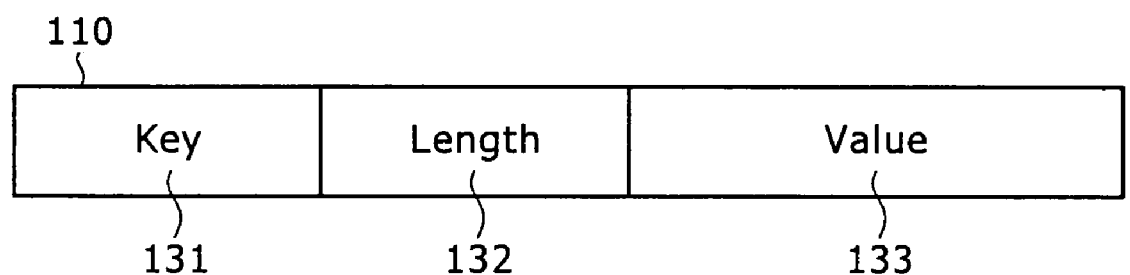
FIG. 11 is a schematic diagram of assistance in explaining the data structure of KLV (Key Length Value)-encoded data.

These pieces of data are KLV (Key Length Value)-encoded data (hereinafter referred to as KLV data) that is composed of key data 131, length data 132, and value data 133, as shown in FIG. 11. This format is in conformity with SMPTE 335M/RP214.

The key data 131 of KLV data 110 is an identifier that indicates a KLV-encoded data item. Identifiers defined in an SMTPE metadata dictionary and corresponding to various data items are used as the identifier. The length data 132 of the KLV data 110 indicates the length of the value data 133 in bytes. The value data 133 of the KLV data 110 is composed of data proper such as text data as in an XML (eXtensible Markup Language) document or the like. That is, the KLV data 110 is obtained by encoding the data of the data item indicated by the key data 131, whose length is indicated by the length data 132, and which is represented by the value data 133.

The real-time metadata includes the above-mentioned various kinds of data which are KLV data having such a data structure. From the viewpoint of contents, the real-time metadata composed of the plurality of data is broadly divided into two parts: an essential part and an optional part. The essential part is composed of real-time metadata that supports all frames, such as LTC, a user bit, UMID, an essence mark, and other KLV data. The optional part is composed of data that is included in the real-time metadata as necessary, such as ARIB metadata and video camera setting/control information.

Each data length of the essential part and the optional part is predetermined fixed length. Further, since the real-time performance is required of the real-time metadata to support data transfer according to a synchronization-based communication interface such as SDI, the essential part (and the optional part) is structured with one file in BIM (BInary Format for MPEG-7) so as to be written and read to/from the optical disk 31 at high speed.

Data in BIM format is obtained by converting XML data into binary data. It is possible to represent the above-mentioned various kinds of data included in the real-time metadata in XML format. However, the amount of data becomes large in the case of XML; therefore, XML is unsuitable for the real-time metadata that needs to be written and read in reduced time (real time). By using BIM in binary representation having information corresponding to XML representation, it becomes possible to write and read the real-time metadata in real time. Further, by using the real-time metadata in BIM format, it is possible not only to reduce data areas on the optical disk 31 necessary to record the real-time metadata, but also to shorten a read/write time and further reduce storage areas in a memory for storing data at the time of writing and reading, thereby making it possible to improve writing/reading speed as a whole.

The control unit 40 controls the real-time metadata processing unit 66 so that the real-time metadata processing unit 66 supplies the real-time metadata composed of the above-mentioned KLV data and supplied through the data amount detection unit 62 to the real-time metadata processing unit 66 to the memory controller 37 which records it onto the optical disk 31, as described above.

However, for example, if a video signal and an audio signal are inputted from a video camera (nor shown) used for shooting through the signal input/output device 51 to the disk recording/playback apparatus (disk drive) 30, that is, if a video signal and an audio signal obtained by shooting are supplied to the disk recording/playback apparatus 30 without metadata added, metadata such as LTC is not added to the video signal and the audio signal. For example, in the case where the disk recording/playback apparatus 30 is combined with a video camera, a video signal and an audio signal obtained by shooting are supplied to the data conversion unit 39 without processing such as adding real-time metadata or the like.

In such a case, the control unit 40 controls the real-time metadata processing unit 66 in the data conversion unit 39 so that the LTC data processing unit 71 included in the real-time metadata processing unit 66 performs LTC data generation processing for generating LTC data.

The control unit 101 in the LTC data processing unit 71 performs the LTC data generation processing. Upon being instructed by the real-time metadata processing unit 66 controlled by the control unit 40 to generate LTC data, the control unit 101 generates LTC data in synchronization with the frame of a video signal supplied from the signal input/output device 51 to the data conversion unit 39 and supplies the generated LTC data to the real-time metadata processing unit 66.

Referring now to the flowchart of FIG. 12, a description will be made of the LTC data generation processing by the control unit 101 in the LTC data processing unit 71.

When the LTC data generation processing starts S110, first, at step S111, the control unit 101 determines whether it has acquired an instruction to start generating LTC data from the real-time metadata processing unit 66, and the processing remains at step S111 until the control unit 101 determines that it has acquired an instruction.

If the control unit 101 determines that it has acquired an instruction to start generating LTC data, the control unit 101 advances the processing to step S112, where the control unit 101 determines whether to generate LTC using a real time.

In some cases, LTC data is generated using a real time or using a predetermined initial value. The control unit 40 supplies such information accepted through, for example, the operation unit 41, that is, information indicating whether to generate LTC data using a real time, or information indicating whether an initial value has been set in the case of generating LTC data without using a real time, to the real-time metadata processing unit 66 in the data conversion unit 39.

The real-time metadata processing unit 66 supplies the information as well as an instruction to start generating LTC data to the control unit 101 in the LTC data processing unit 71. The control unit 101 determines at step S112 whether to generate LTC using a real time, based on the supplied information.

If the control unit 101 determines at step S112 to generate LTC using a real time, the control unit 101 advances the processing to step S113, where, as described above, the control unit 101 controls the LTC generation unit 102 and the real-time clock 105 to generate LTC data in accordance with a synchronization signal using a real-time clock.

That is, the control unit 101 supplies a synchronization signal to the real-time clock 105 and allows the real-time clock 105 to supply information about the real time to the LTC generation unit 102 in accordance with a synchronization signal. Further, the control unit 101 supplies the synchronization signal to the LTC generation unit 102 for synchronization between the operation of the LTC generation unit 102 and the synchronization signal, and allows the LTC generation unit 102 to generate LTC data, based on the information about the real time supplied from the real-time clock 102.

After the completion of step S113, the control unit 101 advances the processing to step S114, where the control unit 101 controls the LTC generation unit 102 so that the LTC generation unit 102 supplies the generated LTC data to the real-time metadata processing unit 66, which supplies it to the memory controller 37. That is, the real-time metadata processing unit 66 supplies the LTC data of real-time metadata supplied from the LTC data processing unit 71 to the memory controller 37.

After the supply of the LTC data, the control unit 101 determines at step S115 whether it has acquired an instruction to end LTC data generation supplied from the real-time metadata processing unit 66 as in the case of the control signal and the synchronization signal. That is, the control unit 40 supplies an instruction to end LTC data generation to the real-time metadata processing unit 66 in the data conversion unit 39, based on, for example, an instruction inputted through the operation unit 41 from the user. Upon acquiring the instruction to end LTC data generation, the real-time metadata processing unit 66 supplies the instruction to the control unit 101 in the LTC data processing unit 71. The control unit 101 determines at step S115 whether it has acquired the instruction.

At step S115, if the control unit 101 determines that it has not acquired an instruction to end LTC data generation, the control unit 101 returns the processing to step S113 to repeat the steps thereafter. If the control unit 101 determines that it has acquired an instruction to end LTC data generation, the control unit 101 ends the LTC data generation processing.

If the control unit 101 determines at step S112 to generate LTC without using a real time, the control unit 101 advances the processing to step S116, where the control unit 101 determines whether the setting of an initial value has been specified, based on the information acquired from the real-time metadata processing unit 66 as described above.

If the control unit 101 determines that the setting of an initial value has been specified, the control unit 101 advances the processing to step S117, where the control unit 101 controls the initial-value setting unit 103 to set the initial value of LTC to a specified value. That is, in this case, the control unit 101 supplies information about an initial-value instruction (a specified initial value) to the initial-value setting unit 103 and allows the initial-value setting unit 103 to set the initial value of LTC to the specified value. The initial-value setting unit 103 supplies the set initial value to the LTC generation unit 102. After setting the initial value, the control unit 101 advances the processing to step S119.

At step S116, if the control unit 101 determines that the setting of an initial value has not been specified, the control unit 101 advances the processing to step S118, where the control unit 101 controls the initial-value setting unit 103 to set the initial value of LTC to "0". That is, in this case, the control unit 101 supplies value "0" to the initial-value setting unit 103 and allows the initial-value setting unit 103 to set the initial value of LTC to "0". After setting the initial value, the control unit 101 advances the processing to step S119.

At step S119, the control unit 101 controls the LTC generation unit 102 and the counter 104 so that the LTC generation unit 102 generates LTC data in accordance with the synchronization signal using the counter 104. That is, the counter 104 performs count processing in accordance with the synchronization signal supplied from the control unit 101 and sequentially supplies a calculated count value to the LTC generation unit 102. The LTC generation unit 102 operates in synchronization with the synchronization signal supplied from the control unit 101 and generates LTC data using the initial value supplied from the initial-value setting unit 103 and the count value supplied from the counter 104.

After the completion of step S119, at step S120 the control unit 101 controls the LTC generation unit 102 so that the LTC generation unit 102 supplies the generated LTC data to the real-time metadata processing unit 66, which supplies it to the memory controller 37. That is, the real-time metadata processing unit 66 supplies the LTC data of real-time metadata supplied from the LTC data processing unit 71 to the memory controller 37.

After the supply of the LTC data, the control unit 101 determines at step S121 whether it has acquired an instruction to end LTC data generation supplied from the real-time metadata processing unit 66, as in the case of step S115. That is, the control unit 40 supplies an instruction to end LTC data generation to the real-time metadata processing unit 66 in the data conversion unit 39, based on, for example, an instruction inputted through the operation unit 41 from the user. Upon acquiring the instruction to end LTC data generation, the real-time metadata processing unit 66 supplies the instruction to the control unit 101 in the LTC data processing unit 71. The control unit 101 determines at step S121 whether it has acquired the instruction.

At step S121, if the control unit 101 determines that it has not acquired an instruction to end LTC data generation, the control unit 101 returns the processing to step S119 to repeat the steps thereafter. If the control unit 101 determines that it has acquired an instruction to end LTC data generation, the control unit 101 ends the LTC data generation processing S122.

The LTC data generated as described above and supplied to the memory controller 37 is processed as real-time metadata as described above and recorded onto the optical disk 31 along with audio data and video data.

By recording the thus generated LTC data as real-time metadata along with essence data, the disk recording/playback apparatus 30 in FIG. 2 enables the user to more easily perform playback control processing at the time of playing back essence data as described later.

Further, the real-time metadata processing unit 66 supplies the LTC data acquired from the LTC data processing unit 71 or the data amount detection unit 62 not only to the memory controller 37 but also to the non-real-time metadata processing unit 67. The non-real-time metadata processing unit 67 supplies the acquired LTC data to the incorporated LTC data processing unit 72. Further, the non-real-time metadata processing unit 67 supplies a control signal, a synchronization signal, or necessary information such as FTC data supplied from the control unit 40 to the LTC data processing unit 72. These pieces of information are supplied in units of frames of video data. Accordingly, the LTC data processing unit 72 performs LTC change point table creation processing to create an LTC change point table based on these pieces of information supplied in units of frames.

Referring now to the flowcharts of FIGS. 13 to 15, a description will be made of the LTC change point table creation processing by the LTC data processing unit 72. Further, a description will be made with reference to FIGS. 16 to 20 as necessary.

When the LTC change point table creation processing starts S140, first, at step S141, the acquisition control unit 111 determines whether it has acquired LTC data. If the acquisition control unit 111 determines that it has acquired LTC data, the acquisition control unit 111 supplies the LTC data and FTC data supplied concurrently with the LTC data and corresponding to the LTC data to the determination processing unit 112 and advances the processing to step S142. The determination processing unit 112, which has acquired the LTC data from the acquisition control unit 111, controls the data management unit 113 so that the data management unit 113 checks whether there is LTC data in the data holding unit 114. Based on this control, the data management unit 113 accesses the data holding unit 114 to check whether there is LTC data in the data holding unit 114 and supplies the check result to the determination processing unit 112. At step S142, the determination processing unit 112 determines whether there is LTC data in the data holding unit 114, based on the supplied check result.

For example, at step S141 the acquisition control unit 111 has just acquired LTC data corresponding to the first frame of a clip. Therefore, if the determination processing unit 112 determines that there is no LTC data 121 in the data holding unit 114, the determination processing unit 112 advances the processing to step S143, where the determination processing unit 112 supplies the acquired LTC data and FTC data through the data management unit 113 to the data holding unit 114 which holds the LTC data and FTC data. After the determination processing unit 112 allows the data holding unit 114 to hold the LTC data and FTC data, the determination processing unit 112 returns the processing to step S141 to repeat the steps thereafter for LTC data and FTC data of the next frame.

At step S142, if the determination processing unit 112 determines that there is LTC data in the data holding unit 114, the determination processing unit 112 advances the processing to step S144, where the determination processing unit 112 controls the data management unit 113 to acquire the LTC data 121 from the data holding unit 114 and compares values between the LTC data (the acquired LTC data) supplied from the acquisition control unit 111 and the LTC data (the held LTC data) acquired from the data holding unit 114. Further, at step S145, the determination processing unit 112 controls the section setting management unit 115 to refer to the section name 123 held in the section setting holding unit 116, that is, the current section setting (status).

After the completion of step S145, the determination processing unit 112 advances the processing to step S146, where the determination processing unit 112 determines whether the value of the acquired LTC data is larger than the value of the held LTC data by 1 (consecutive increment), based on the comparison result at step S144. If the determination processing unit 112 determines that it is the consecutive increment, the determination processing unit 112 advances the processing to step S147, where the determination processing unit 112 determines whether the current section is an increment section (a section whose status is "increment"), based on the reference result at step S145.

If the determination processing unit 112 determines that the current section is not an increment section, the determination processing unit 112 determines that the status (i.e., the section) has changed, and advances the processing to step S148 in order to put the frame (corresponding to the held LTC data) into an LTC change point. At step S148, the determination processing unit 112 controls the data management unit 113 to acquire the LTC data 121 and the FTC data 122 held in the data holding unit 114 and adds status information ("increment" in this case) to the LTC data and the FTC data. Further, the determination processing unit 112 supplies the LTC data, the FTC data and the status information as elements of the LTC change point table to the registration processing unit 117. The registration processing unit 117 supplies the elements of the LTC change point table as an increment point (a change point whose status is "increment") to the memory 38 to register them in the LTC change point table.

After the completion of step S148, at step S149 the determination processing unit 112 supplies the status, determined this time through the section setting management unit 115 to the section setting holding unit 116 which stores it as the section name 123, thus setting the current section to an increment section. After that, the processing goes to step S150. Further, at step S147, if the determination processing unit 112 determines that the current section is an increment section, the determination processing unit 112 omits steps S148 and S149 and advances the processing to step S150.

Figures 16A, 16B:
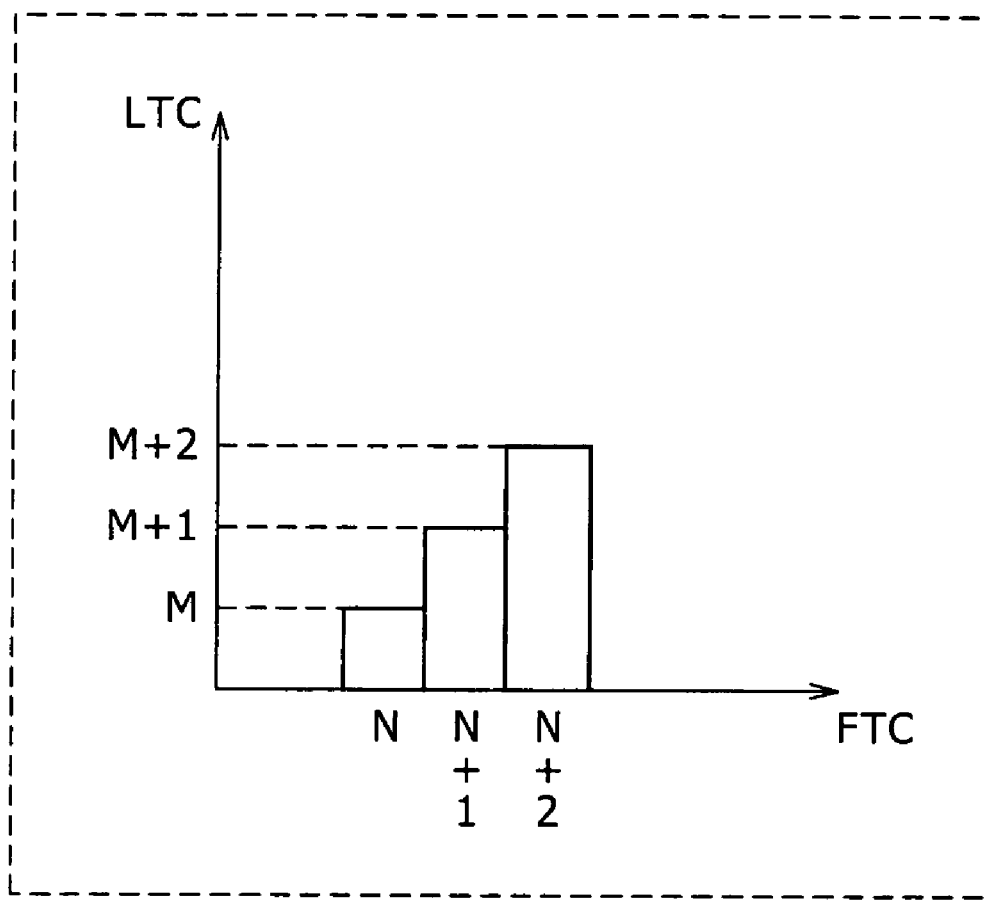
FIG. 16A is a diagram of assistance in explaining an example of a state of LTC change.
FIG. 16B is a diagram of assistance in explaining an example of an element of an LTC change point table.

FIG. 16A is a diagram showing an example of the relationship between FTC and LTC in an increment section. The horizontal axis indicates the FTC of a frame, and the vertical axis indicates the LTC of the frame. In FIG. 16A, for example, the LTC value of the frame whose FTC value is "N" (the frame whose frame number is N) is "M", the LTC value of the next frame (the frame whose FTC value is "N+1") is "M+1", and the LTC value of the frame after the next (the frame whose FTC value is "N+2") is "M+2". Thus, in the increment section, the LTC value in consecutive frames is incremented by 1 as the FTC value is incremented by 1.

For example, in the case where there is no setting of a status (the section setting holding unit 116 does not hold the section name 123) or a set status is not "increment" (the content of the section name 123 held in the section setting holding unit 116 is not "increment"), when a frame group (in which LTC is consecutively incremented) shown in FIG. 16A is inputted to the data conversion unit 39, the determination processing unit 112 determines that the status has changed to "increment" (the section has changed) and creates an element 141 of an LTC change point table 124 shown in FIG. 16B in which the first frame (frame number N) of the frame group is an increment point. As described above, the elements of the LTC change point table includes three items which are a "frame number" which indicates the FTC of the LTC change point, "LTC" which indicates the LTC of the LTC change point, and a "status" which indicates a type of LTC change pattern of frames after the LTC change point. In the case of the element 141 shown in FIG. 16B, the value of item "frame number" is "N", the value of item "LTC" is "M", and item "status" is "increment". After creating the element 141, the determination processing unit 112 supplies the created element to the registration processing unit 117 and allows the registration processing unit 117 to register the element in the LTC change point table 124 stored in the memory 38.

In the case where the content of the section name 123 held in the section setting holding unit 116 is "increment", when a frame group (in which LTC is consecutively incremented) shown in FIG. 16A is inputted to the data conversion unit 39, the determination processing unit 112 determines that the status has not changed (the same section continues) and does not create the element 141 (does not update the status).

At step S150, the determination processing unit 112 controls the data management unit 113 so that the data management unit 113 supplies the LTC data and the FTC data acquired this time through the acquisition control unit 111 to the data holding unit 114 to update the LTC data 121 and the FTC data 122 held in the data holding unit 114 using the acquired LTC data and FTC data.

Figure 15:
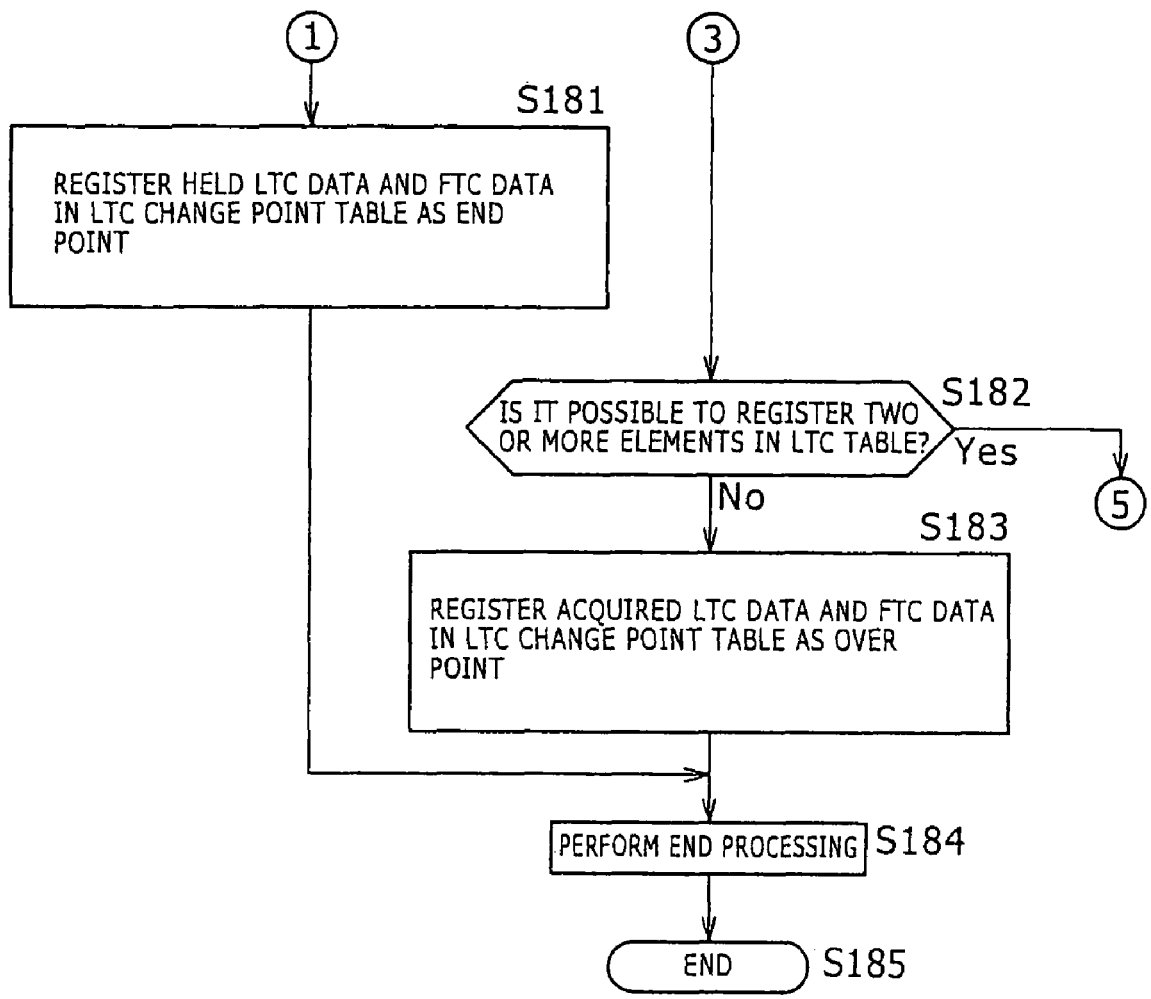
FIG. 15 is a flowchart of assistance in explaining LTC change point table creation processing, subsequent to FIG. 14.

After the completion of the update, the determination processing unit 112 advances the processing to step S182 in FIG. 15.

Figure 14:
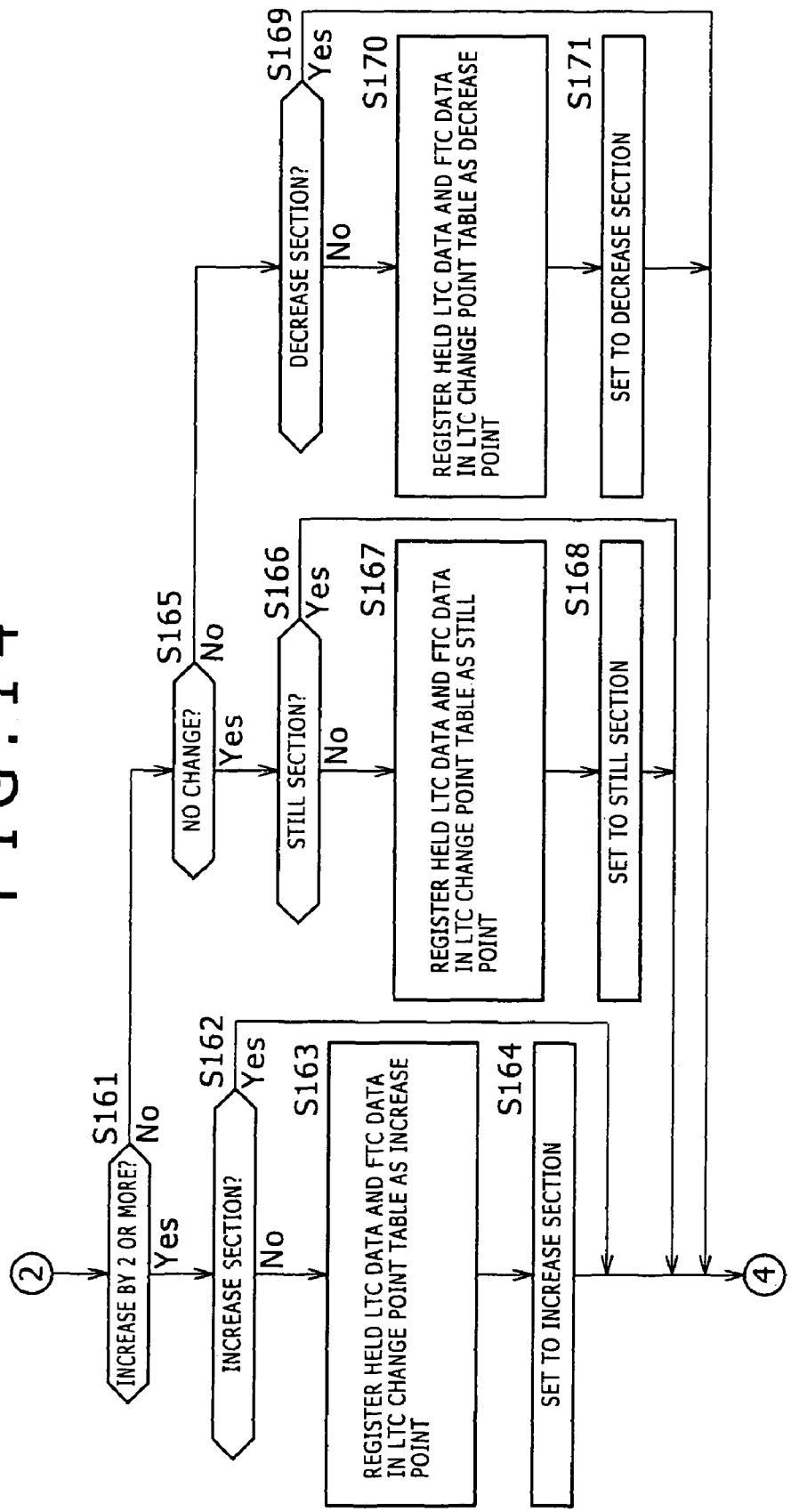
FIG. 14 is a flowchart of assistance in explaining LTC change point table creation processing, subsequent to FIG. 13.

At step S146, if the determination processing unit 112 determines that the value of the acquired LTC data is not larger than the value of the held LTC data by 1 (not consecutive increment), the determination processing unit 112 advances the processing to step S161 in FIG. 14.

Figure 13:
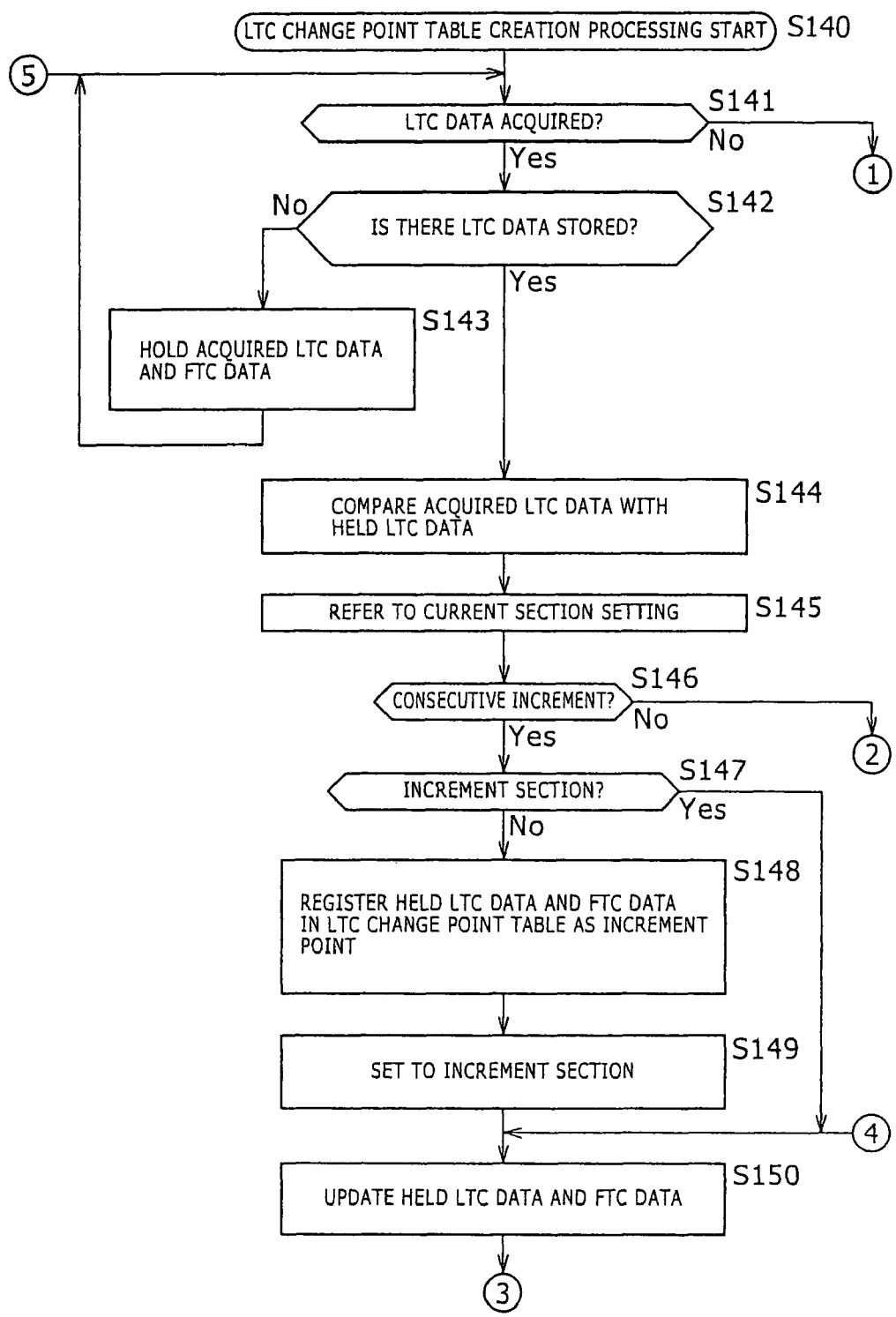
FIG. 13 is a flowchart of assistance in explaining LTC change point table creation processing.

At step S161 in FIG. 14, the determination processing unit 112 determines whether the value of the acquired LTC data is larger than the value of the held LTC data by 2 or more, based on the comparison result at step S144 in FIG. 13. If the determination processing unit 112 determines that the value of the acquired LTC data is larger than the value of the held LTC data by 2 or more, the determination processing unit 112 advances the processing to step S162, where the determination processing unit 112 determines whether the current section is an increase section (a section whose status is "increase"), based on the reference result at step S145 in FIG. 13.

If the determination processing unit 112 determines that the current section is not an increase section, the determination processing unit 112 determines that the status (i.e., the section) has changed, and advances the processing to step S163 in order to put the frame (corresponding to the held LTC data) into an LTC change point. At step S163, the determination processing unit 112 controls the data management unit 113 to acquire the LTC data 121 and the FTC data 122 held in the data holding unit 114 and adds status information ("increase" in this case) to the LTC data and the FTC data. Further, the determination processing unit 112 supplies the LTC data, the FTC data and the status information as elements of the LTC change point table to the registration processing unit 117. The registration processing unit 117 supplies the elements of the LTC change point table as an increase point (a change point whose status is "increase") to the memory 38 to register them in the LTC change point table.

After the completion of step S163, at step S164 the determination processing unit 112 supplies the status determined this time through the section setting management unit 115 to the section setting holding unit 116 which stores it as the section name 123, thus setting the current section to an increase section. After that, the processing returns to step S150 in FIG. 13 to repeat the steps thereafter. Further, at step S162 in FIG. 14, if the determination processing unit 112 determines that the current section is an increase section, the determination processing unit 112 omits steps S163 and S164 and returns the processing to step S150 in FIG. 13.

Figures 17A, 17B:
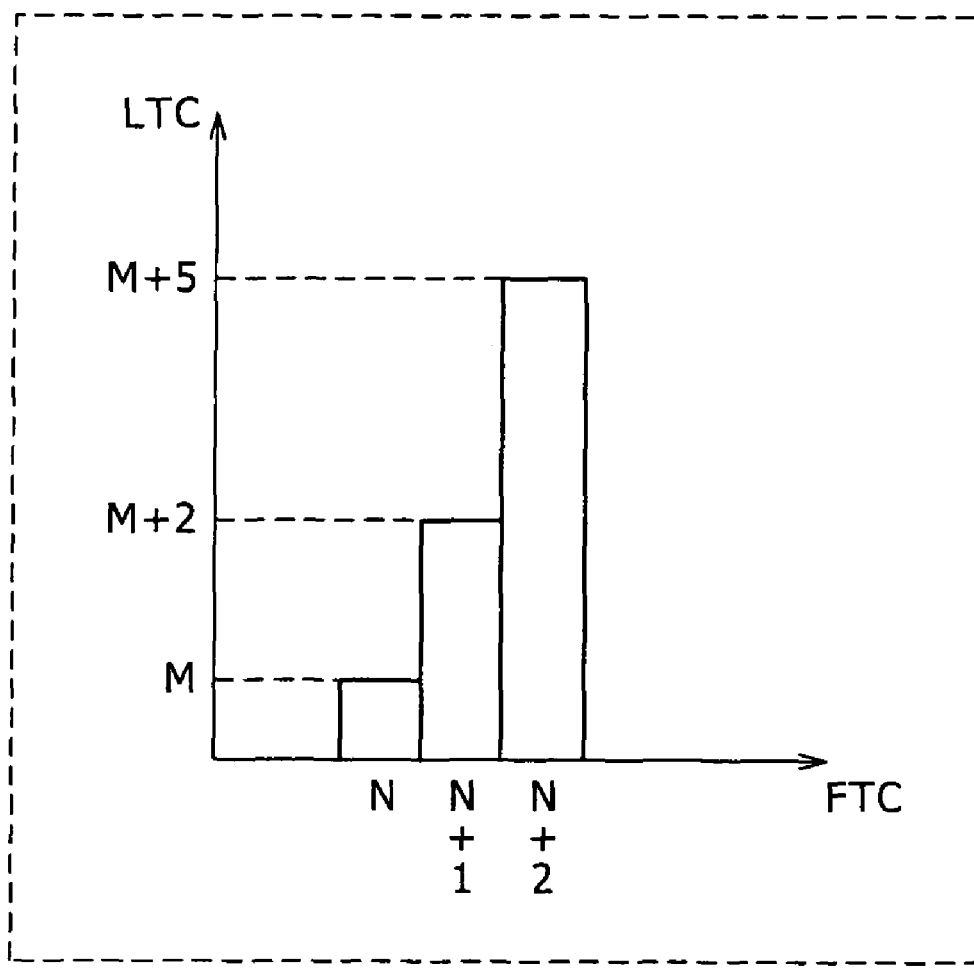
FIG. 17A is a diagram of assistance in explaining another example of a state of LTC change.
FIG. 17B is a diagram of assistance in explaining another example of an element of an LTC change point table.

FIG. 17A is a diagram showing an example of the relationship between FTC and LTC in an increase section. The horizontal axis indicates the FTC of a frame, and the vertical axis indicates the LTC of the frame. In FIG. 17A, for example, the LTC value of the frame whose FTC value is "N" (the frame whose frame number is N) is "M", the LTC value of the next frame (the frame whose FTC value is "N+1") is "M+2", and the LTC value of the frame after the next (the frame whose FTC value is "N+2") is "M+5". Thus, in the increase section, the LTC value in consecutive frames increases by 2 or more as the FTC value increases by 1.

For example, in the case where there is no setting of a status (the section setting holding unit 116 does not hold the section name 123) or a set status is not "increase" (the content of the section name 123 held in the section setting holding unit 116 is not "increase"), when a frame group (in which LTC increases by 2 or more) shown in FIG. 17A is inputted to the data conversion unit 39, the determination processing unit 112 determines that the status has changed to "increase" (the section has changed) and creates an element 142 of the LTC change point table 124 shown in FIG. 17B in which the first frame (frame number N) of the frame group is an increase point. In the case of the element 142 shown in FIG. 17B, the value of item "frame number" is "N", the value of item "LTC" is "M", and item "status" is "increase". After creating the element 142, the determination processing unit 112 supplies the created element to the registration processing unit 117 and allows the registration processing unit 117 to register the element in the LTC change point table 124 stored in the memory 38.

In the case where the content of the section name 123 held in the section setting holding unit 116 is "increase", when a frame group (in which LTC increases by 2 or more) shown in FIG. 17A is inputted to the data conversion unit 39, the determination processing unit 112 determines that the status has not changed (the same section continues) and does not create the element 142 (does not update the status).

At step S161, if the determination processing unit 112 determines that the value of the acquired LTC data is not larger than the value of the held LTC data by 2 or more, the determination processing unit 112 advances the processing to step S165.

At step S165, the determination processing unit 112 determines whether the value of the acquired LTC data is the same as the value of the held LTC data, based on the comparison result at step S144 in FIG. 13. If the determination processing unit 112 determines that the value of the acquired LTC data has not changed and is the same as the value of the held LTC data, the determination processing unit 112 advances the processing to step S166, where the determination processing unit 112 determines whether the current section is a still section (a section whose status is "still"), based on the reference result at step S145 in FIG. 13.

If the determination processing unit 112 determines that the current section is not a still section, the determination processing unit 112 determines that the status (i.e., the section) has changed, and advances the processing to step S167 in order to put the frame (corresponding to the held LTC data) into an LTC change point. At step S167, the determination processing unit 112 controls the data management unit 113 to acquire the LTC data 121 and the FTC data 122 held in the data holding unit 114 and adds status information ("still" in this case) to the LTC data and the FTC data. Further, the determination processing unit 112 supplies the LTC data, the FTC data and the status information as elements of the LTC change point table to the registration processing unit 117. The registration processing unit 117 supplies the elements of the LTC change point table as a still point (a change point whose status is "still") to the memory 38 to register them in the LTC change point table.

After the completion of step S167, at step S168 the determination processing unit 112 supplies the status determined this time through the section setting management unit 115 to the section setting holding unit 116 which stores it as the section name 123, thus setting the current section to a still section. After that, the processing returns to step S150 in FIG. 13 to repeat the steps thereafter. Further, at step S166 in FIG. 14, if the determination processing unit 112 determines that the current section is a still section, the determination processing unit 112 omits steps S167 and S168 and returns the processing to step S150 in FIG. 13.

Figures 18A, 18B:
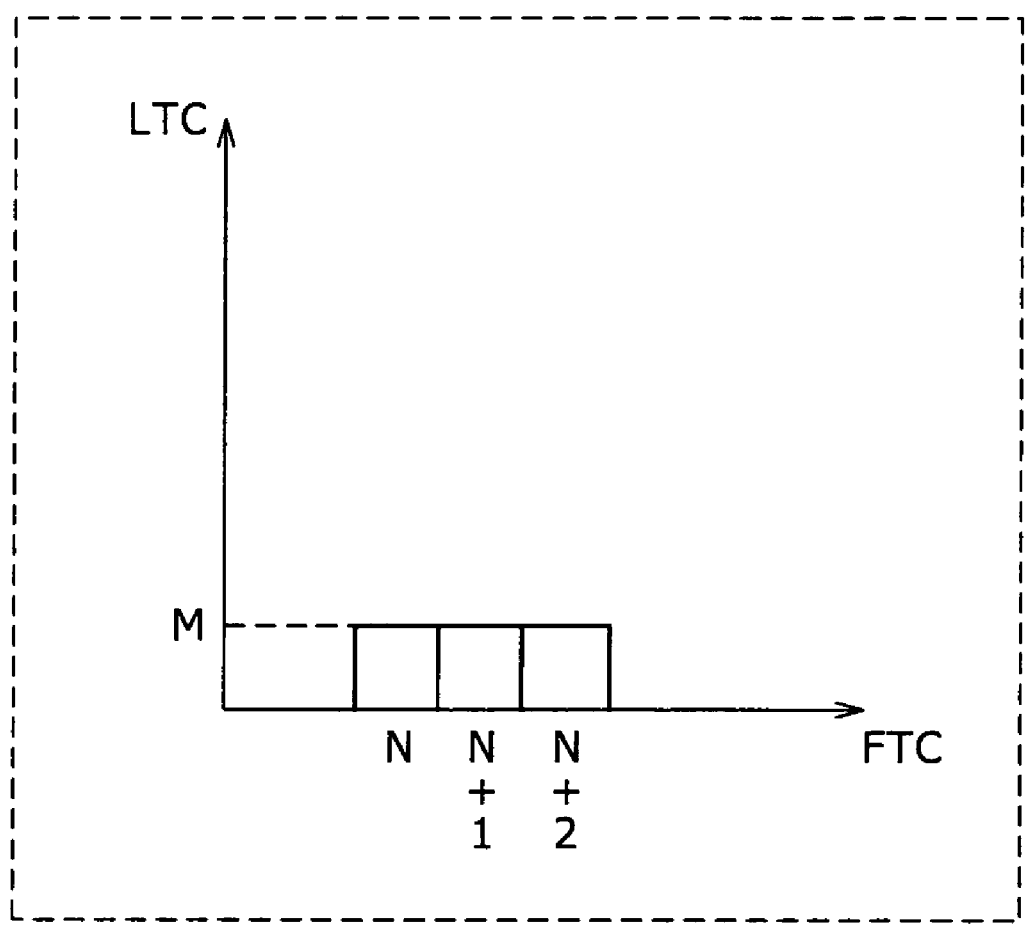
FIG. 18A is a diagram of assistance in explaining another example of a state of LTC change.
FIG. 18B is a diagram of assistance in explaining another example of an element of an LTC change point table.

FIG. 18A is a diagram showing an example of the relationship between FTC and LTC in a still section. The horizontal axis indicates the FTC of a frame, and the vertical axis indicates the LTC of the frame. In FIG. 18A, for example, the LTC value of the frame whose FTC value is "N" (the frame whose frame number is N) is "M", the LTC value of the next frame (the frame whose FTC value is "N+1") is also "M", and the LTC value of the frame after the next (the frame whose FTC value is "N+2") is also "M". Thus, in the still section, the LTC value in consecutive frames does not change as the FTC value increases by 1.

For example, in the case where there is no setting of a status (the section setting holding unit 116 does not hold the section name 123) or a set status is not "still" (the content of the section name 123 held in the section setting holding unit 116 is not "still"), when a frame group (in which LTC does not change) shown in FIG. 18A is inputted to the data conversion unit 39, the determination processing unit 112 determines that the status has changed to "still" (the section has changed) and creates an element 144 of the LTC change point table 124 shown in FIG. 18B in which the first frame (frame number N) of the frame group is a still point. In the case of the element 144 shown in FIG. 18B, the value of item "frame number" is "N", the value of item "LTC" is "M", and item "status" is "still". After creating the element 144, the determination processing unit 112 supplies the created element to the registration processing unit 117 and allows the registration processing unit 117 to register the element in the LTC change point table 124 stored in the memory 38.

In the case where the content of the section name 123 held in the section setting holding unit 116 is "still", when a frame group (in which LTC does not change) shown in FIG. 18A is inputted to the data conversion unit 39, the determination processing unit 112 determines that the status has not changed (the same section continues) and does not create the element 144 (does not update the status).

At step S165, if the determination processing unit 112 determines that the value of the acquired LTC data is not the same as the value of the held LTC data (i.e., the value of the acquired LTC data has decreased), the determination processing unit 112 advances the processing to step S169.

At step S169, the determination processing unit 112 determines whether the current section is a decrease section (a section whose status is "decrease"), based on the reference result at step S145 in FIG. 13.

If the determination processing unit 112 determines that the current section is not a decrease section, the determination processing unit 112 determines that the status (i.e., the section) has changed, and advances the processing to step S170 in order to put the frame (corresponding to the held LTC data) into an LTC change point. At step S170, the determination processing unit 112 controls the data management unit 113 to acquire the LTC data 121 and the FTC data 122 held in the data holding unit 114 and adds status information ("decrease" in this case) to the LTC data and the FTC data. Further, the determination processing unit 112 supplies the LTC data, the FTC data and the status information as elements of the LTC change point table to the registration processing unit 117. The registration processing unit 117 supplies the elements of the LTC change point table as a decrease point (a change point whose status is "decrease") to the memory 38 to register them in the LTC change point table.

After the completion of step S170, at step S171 the determination processing unit 112 supplies the status determined this time through the section setting management unit 115 to the section setting holding unit 116 which stores it as the section name 123, thus setting the current section to a still section. After that, the processing returns to step S150 in FIG. 13 to repeat the steps thereafter. Further, at step S169 in FIG. 14, if the determination processing unit 112 determines that the current section is a decrease section, the determination processing unit 112 omits steps S170 and S171 and returns the processing to step S150 in FIG. 13.

Figures 19A, 19B:
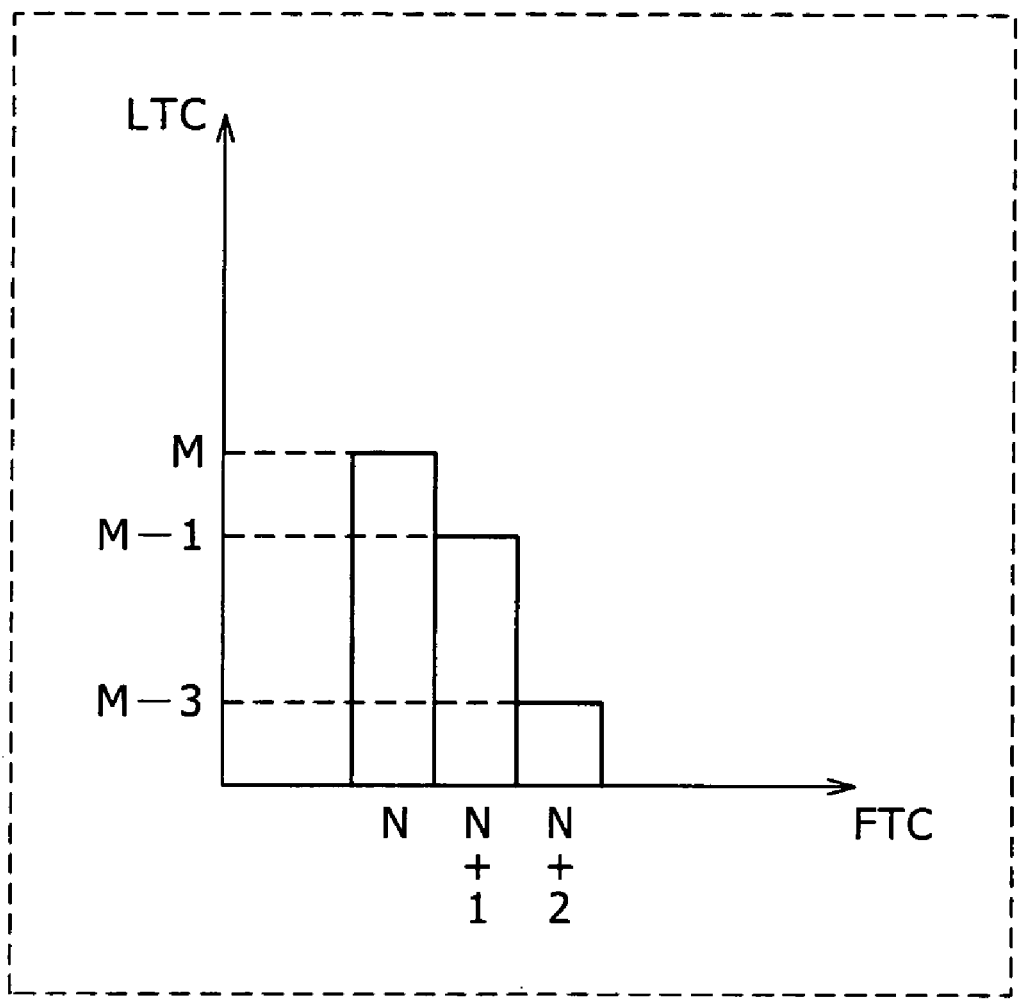
FIG. 19A is a diagram of assistance in explaining another example of a state of LTC change.
FIG. 19B is a diagram of assistance in explaining another example of an element of an LTC change point table.

FIG. 19A is a diagram showing an example of the relationship between FTC and LTC in a decrease section. The horizontal axis indicates the FTC of a frame, and the vertical axis indicates the LTC of the frame. In FIG. 19A, for example, the LTC value of the frame whose FTC value is "N" (the frame whose frame number is N) is "M", the LTC value of the next frame (the frame whose FTC value is "N+1") is "M−1", and the LTC value of the frame after the next (the frame whose FTC value is "N+2") is "M−3". Thus, in the decrease section, the LTC value in consecutive frames decreases by 1 or more as the FTC value increases by 1.

For example, in the case where there is no setting of a status (the section setting holding unit 116 does not hold the section name 123) or a set status is not "decrease" (the content of the section name 123 held in the section setting holding unit 116 is not "decrease"), when a frame group (in which LTC decreases by 1 or more) shown in FIG. 19A is inputted to the data conversion unit 39, the determination processing unit 112 determines that the status has changed to "decrease" (the section has changed) and creates an element 146 of the LTC change point table 124 shown in FIG. 19B in which the first frame (frame number N) of the frame group is a decrease point. In the case of the element 146 shown in FIG. 19B, the value of item "frame number" is "N", the value of item "LTC" is "M", and item "status" is "decrease". After creating the element 146, the determination processing unit 112 supplies the created element to the registration processing unit 117 and allows the registration processing unit 117 to register the element in the LTC change point table 124 stored in the memory 38.

In the case where the content of the section name 123 held in the section setting holding unit 116 is "decrease", when a frame group (in which LTC decreases) shown in FIG. 19A is inputted to the data conversion unit 39, the determination processing unit 112 determines that the status has not changed (the same section continues) and does not create the element 146 (does not update the status).

Further, at step S141 in FIG. 13, if the acquisition control unit 111 determines that it has not acquired LTC data with the original timing for acquiring the LTC data as the input of essence data is stopped for example, the acquisition control unit 111 advances the processing to step S181 in FIG. 15. At step S181 in FIG. 15, the determination processing unit 112 determines that the clip has ended, and the determination processing unit 112 controls the data management unit 113 to acquire the LTC data 121 and the FTC data 122 held in the data holding unit 114 and adds status information ("end" in this case) to the LTC data and the FTC data. Further, the determination processing unit 112 supplies the LTC data, the FTC data and the status information as elements of the LTC change point table to the registration processing unit 117. The registration processing unit 117 supplies the elements of the LTC change point table as an end point (a change point whose status is "end") to the memory 38 to register them in the LTC change point table.

Figures 20A, 20B:
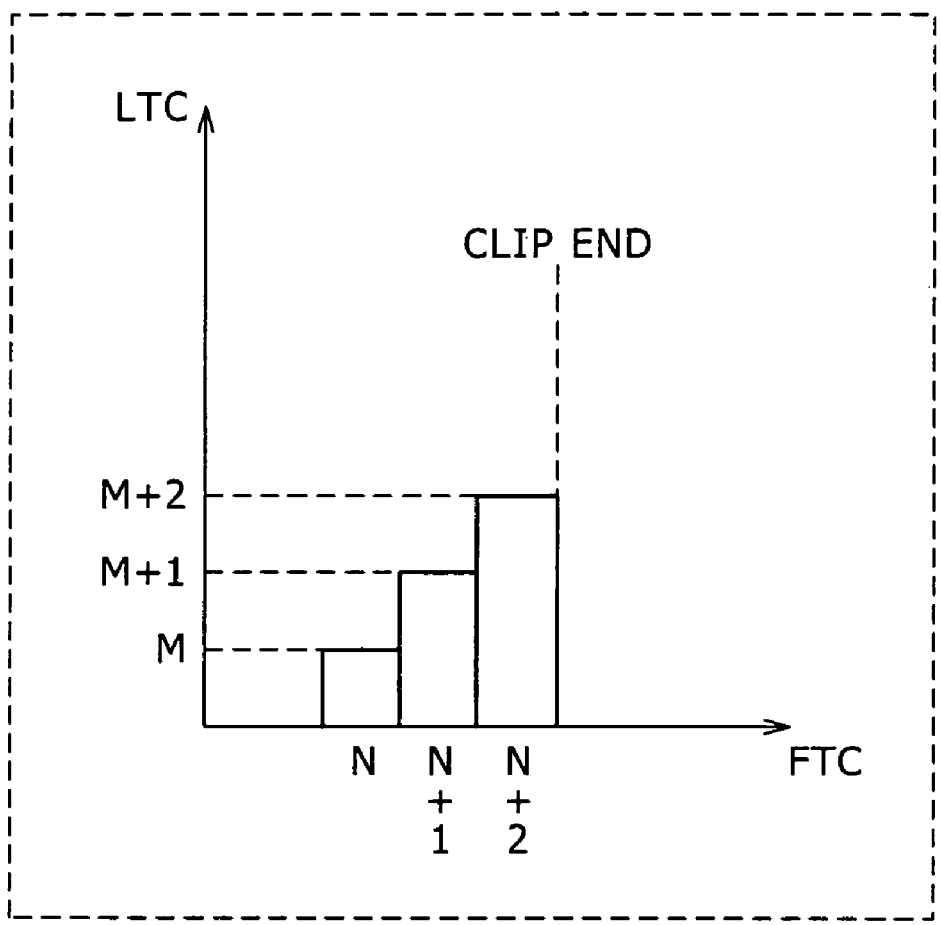
FIG. 20A is a diagram of assistance in explaining another example of a state of LTC change.
FIG. 20B is a diagram of assistance in explaining another example of an element of an LTC change point table.

FIG. 20A is a diagram showing an example of the relationship between FTC and LTC at an end point. The horizontal axis indicates the FTC of a frame, and the vertical axis indicates the LTC of the frame. In FIG. 20A, for example, the LTC value of the frame whose FTC value is "N" (the frame whose frame number is N) is "M", the LTC value of the next frame (the frame whose FTC value is "N+1") is "M+1", and the LTC value of the frame after the next (the frame whose FTC value is "N+2") is "M+2". That is, the status of this section is "increment". For example, as shown in FIG. 20B, an element 148 is registered in the LTC change point table 124. In the case of the element 148 shown in FIG. 20B, the value of item "frame number" is "N", the value of item "LTC" is "M", and item "status" is "increment".

In this case, if the clip has ended with the frame whose frame number is N+2 and the acquisition control unit 111 has not acquired a frame next to the frame whose frame number is N+2, the determination processing unit 112 determines that the clip has ended, and creates an element 149 of the LTC change point table 124 shown in FIG. 20B in which the last frame (frame number N+2) in the data holding unit 114 is an end point. In the case of the element 149 shown in FIG. 20B, the value of item "frame number" is "N+2", the value of item "LTC" is "M+2", and item "status" is "end".

After registering the endpoint in the LTC change point table as described above, the determination processing unit 112 advances the processing to step S184.

Further, after the completion of step S150 through the steps in FIG. 13 and FIG. 14 as described above, the determination processing unit 112 advances the processing to step S182 in FIG. 15, where the determination processing unit 112 controls the registration processing unit 117 so that the registration processing unit 117 checks for free space in the memory 38 and the determination processing unit 112 determines whether it is possible to register two more elements in the LTC change point table 142. If the determination processing unit 112 determines that there is enough free space and it is possible to register two more elements in the LTC change point table 124, the determination processing unit 112 returns the processing to step S141 in FIG. 13 to repeat the steps thereafter for the next frame.

At step S182 in FIG. 15, if the determination processing unit 112 determines that there is not enough free space in the memory 38 and only one more element can be added to the LTC change point table 124, the determination processing unit 112 advances the processing to step S183, where the determination processing unit 112 adds status information ("over" in this case) to the LTC data and the FTC data acquired this time through the acquisition control unit 111. Further, the determination processing unit 112 supplies the LTC data, the FTC data and the status information as elements of the LTC change point table to the registration processing unit 117. The registration processing unit 117 supplies the elements of the LTC change point table as an increase point (a change point whose status is "increase") to the memory 38 to register them in the LTC change point table 124.

Figures 21A, 21B:
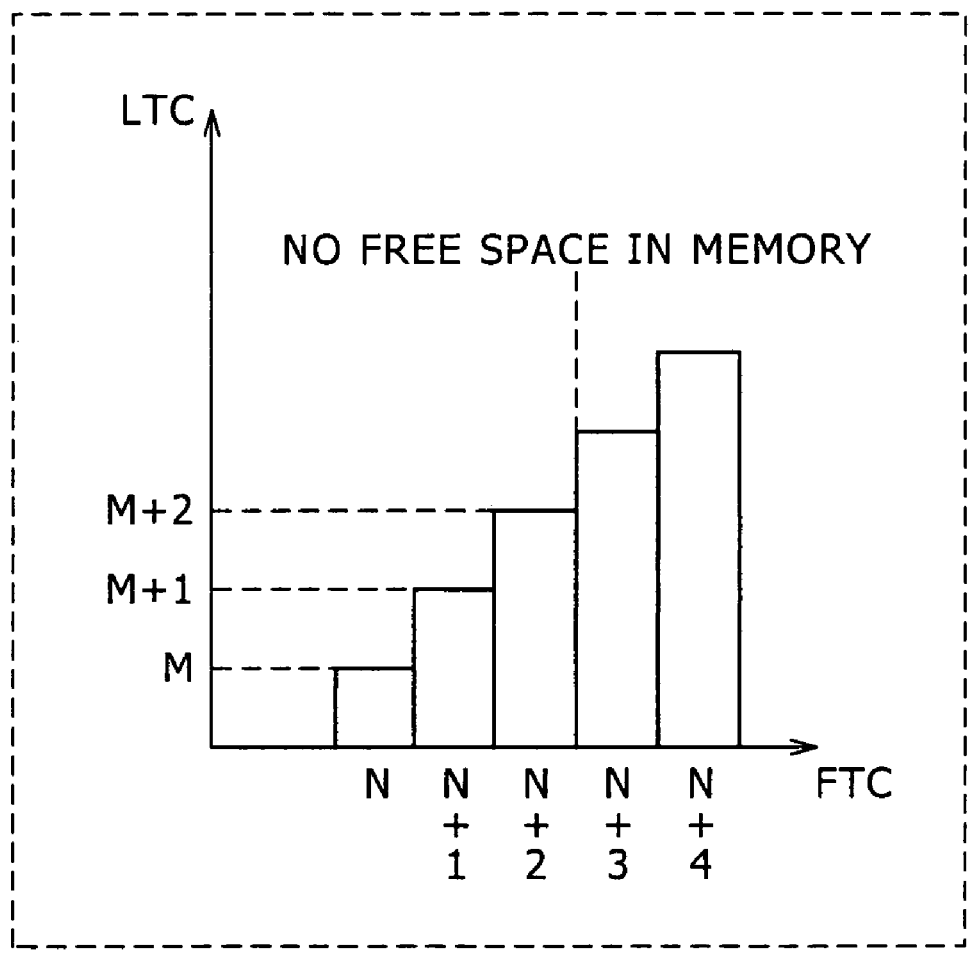
FIG. 21A is a diagram of assistance in explaining another example of a state of LTC change.
FIG. 21B is a diagram of assistance in explaining another example of an element of an LTC change point table.

FIG. 21A is a diagram showing an example of the relationship between FTC and LTC in an over point. The horizontal axis indicates the FTC of a frame, and the vertical axis indicates the LTC of the frame. In FIG. 21A, for example, the LTC value of the first frame whose FTC value is "N" (the frame whose frame number is N) is "M", the LTC value of the second frame (the frame whose FTC value is "N+1") is "M−1", the LTC value of the third frame (the frame whose FTC value is "N+2") is "M+2", the LTC value of the fourth frame (the frame whose FTC value is "N+3") is "M+3", and the LTC value of the fifth frame (the frame whose FTC value is "N+4") is "M+4". That is, the status of this section is "increment". For example, as shown in FIG. 21B, an element 150 is registered in the LTC change point table 124. In the case of the element 150 shown in FIG. 21B, the value of item "frame number" is "N", the value of item "LTC" is "M", and item "status" is "increment".

In this case, if the determination processing unit 112 determines that only one more element can be added to the LTC change point table 124 at the time of acquiring the LTC data and the FTC data of the frame whose frame number is N+2, the determination processing unit 112 creates an element 151 of the LTC change point table 124 shown in FIG. 21B in which the last frame (frame number N+2) acquired this time through the acquisition control unit 111 is an over point. In the case of the element 151 shown in FIG. 21B, the value of item "frame number" is "N+2", the value of item "LTC" is "M+2", and item "status" is "over".

After registering the over point in the LTC change point table as described above, the determination processing unit 112 advances the processing to step S184.

At step S184, the LTC data processing unit 72 performs end processing S185 and ends the LTC change point table creation processing. Further, the LTC change point table creation processing is performed every time a clip is inputted to the data conversion unit 39.

Figure 6:
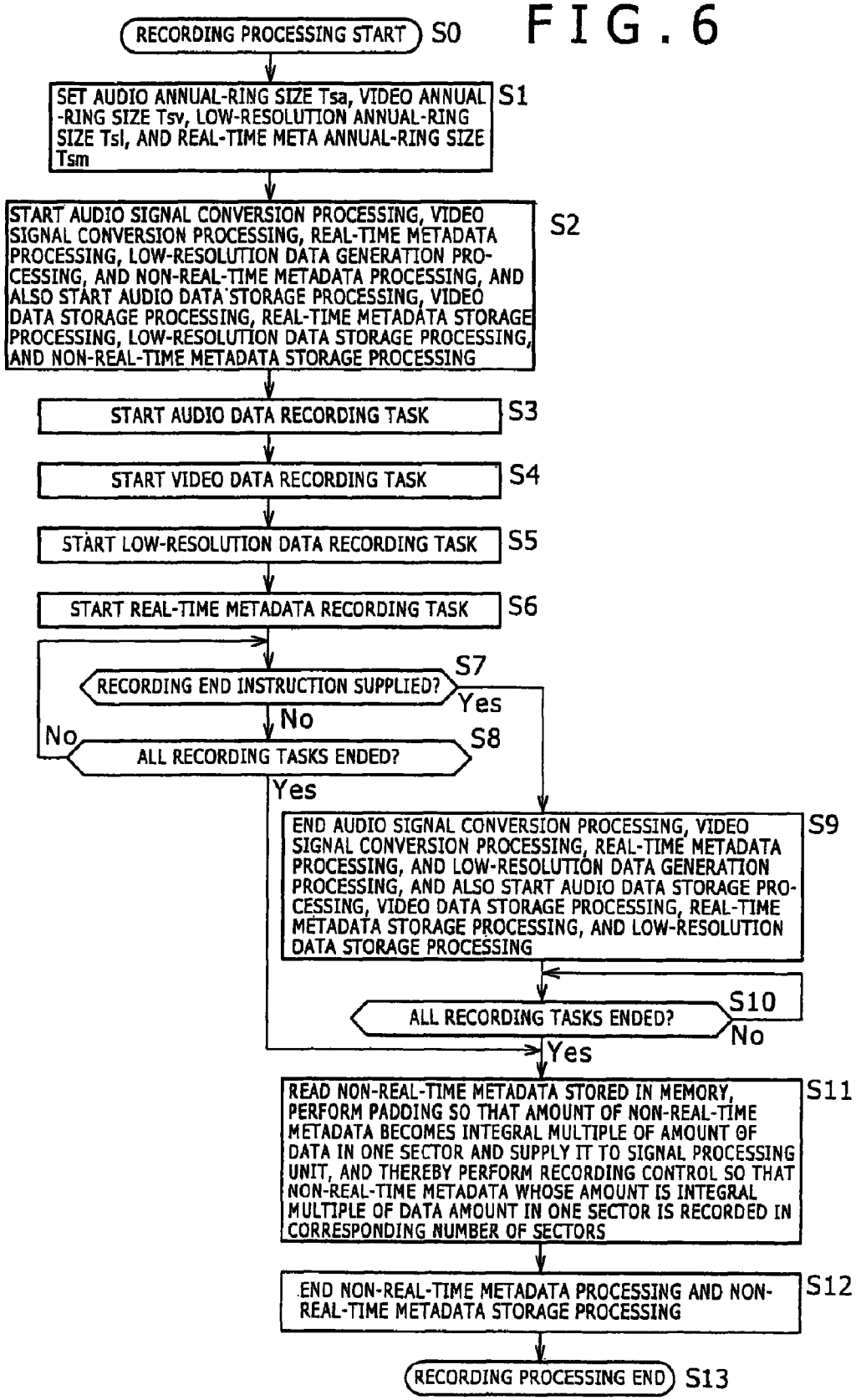
FIG. 6 is a flowchart of assistance in explaining recording processing by a control unit of FIG. 2.

The LTC change point table 124 thus created and stored in the memory 38 is read as non-real-time metadata and recorded on the optical disk 31, at step S11 in FIG. 6.

Thus, by creating the LTC change point table incorporating the change point from LTC included in real-time metadata and recording it as non-real-time metadata, the disk recording/playback apparatus 30 in FIG. 2 enables the user to more easily perform playback control processing as described later.

Figure 9:
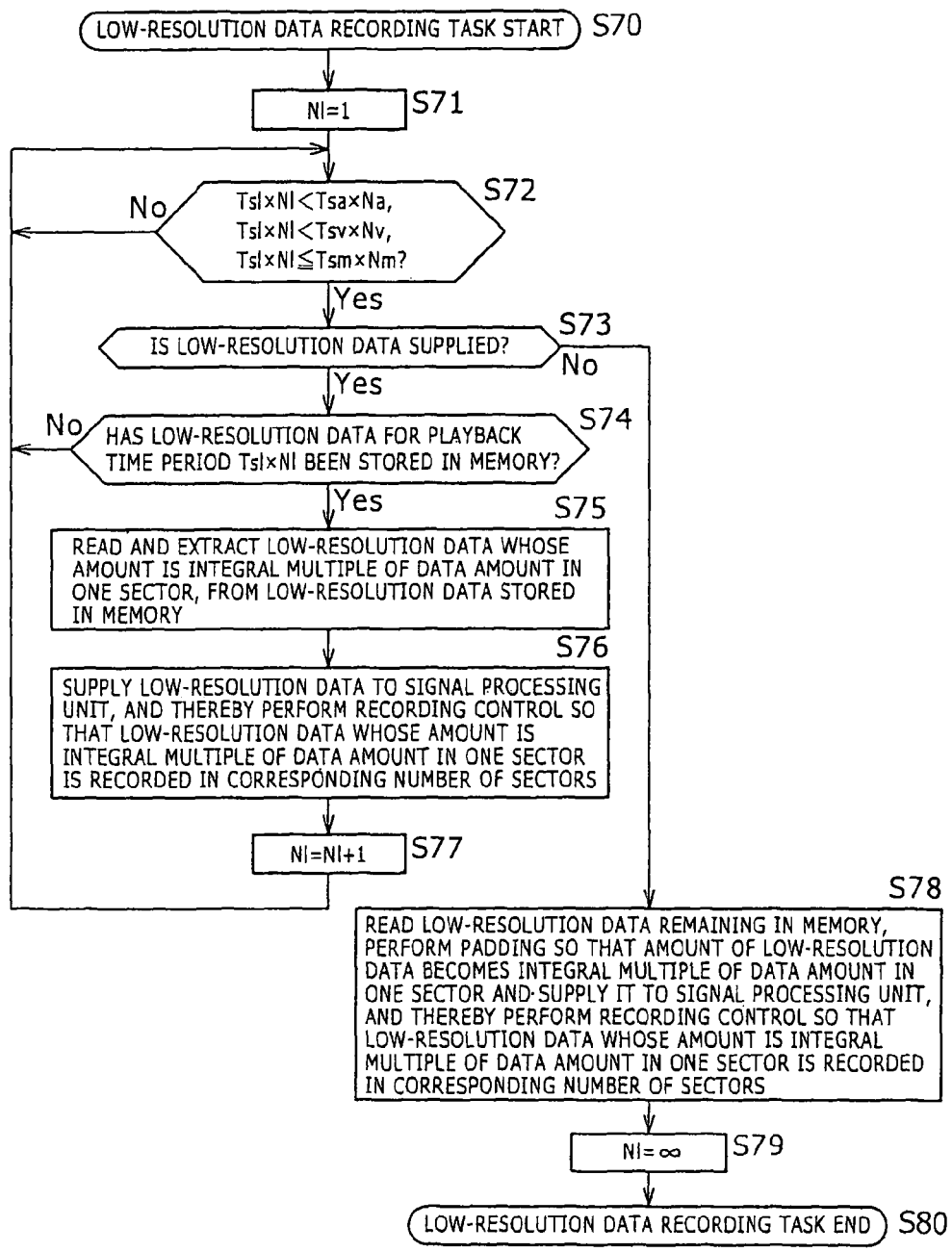
FIG. 9 is a flowchart of assistance in explaining the low-resolution data recording task initiated at step S5 in FIG. 6.
Figure 10:
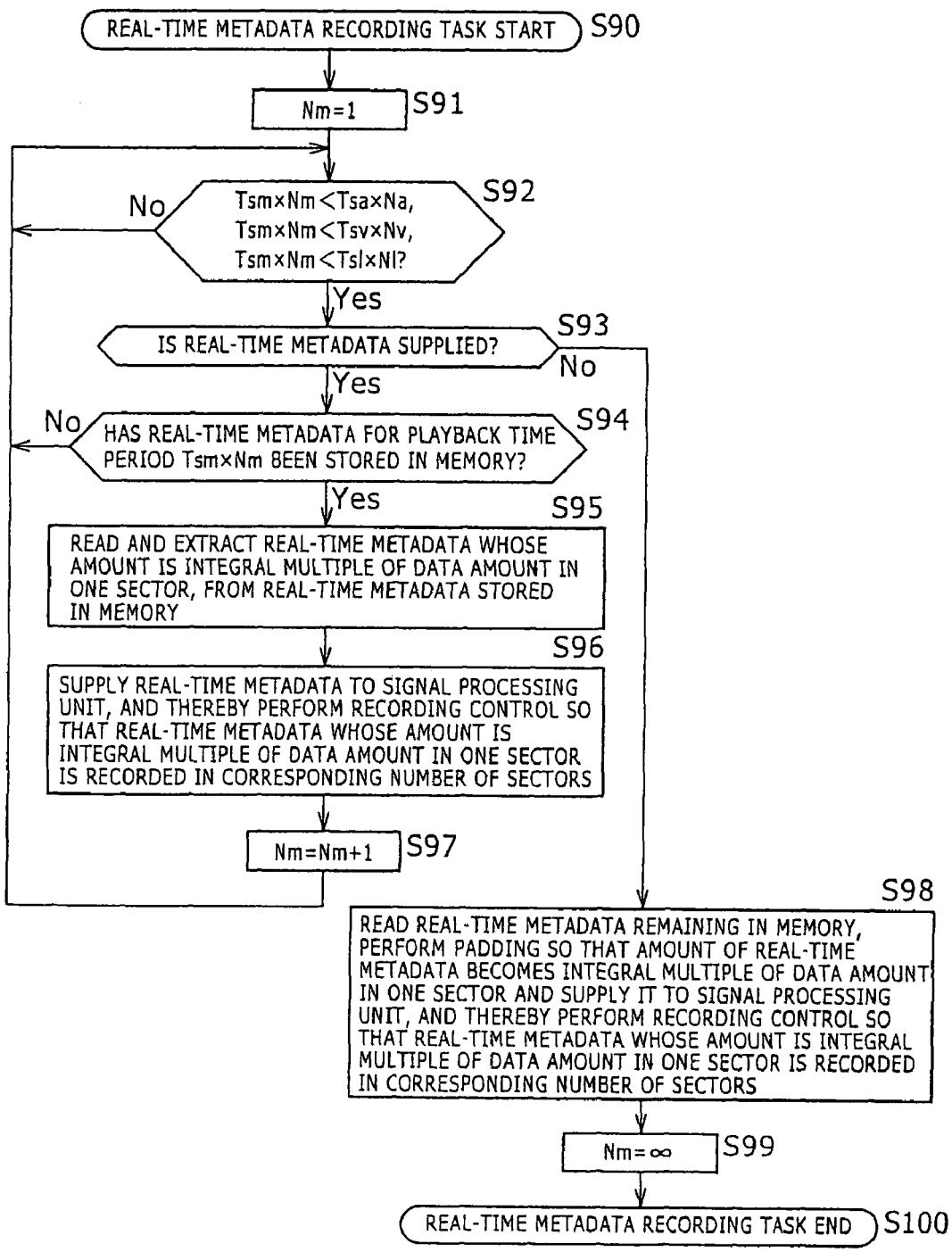
FIG. 10 is a flowchart of assistance in explaining the real-time metadata recording task initiated at step S6 in FIG. 6.
Figure 12:
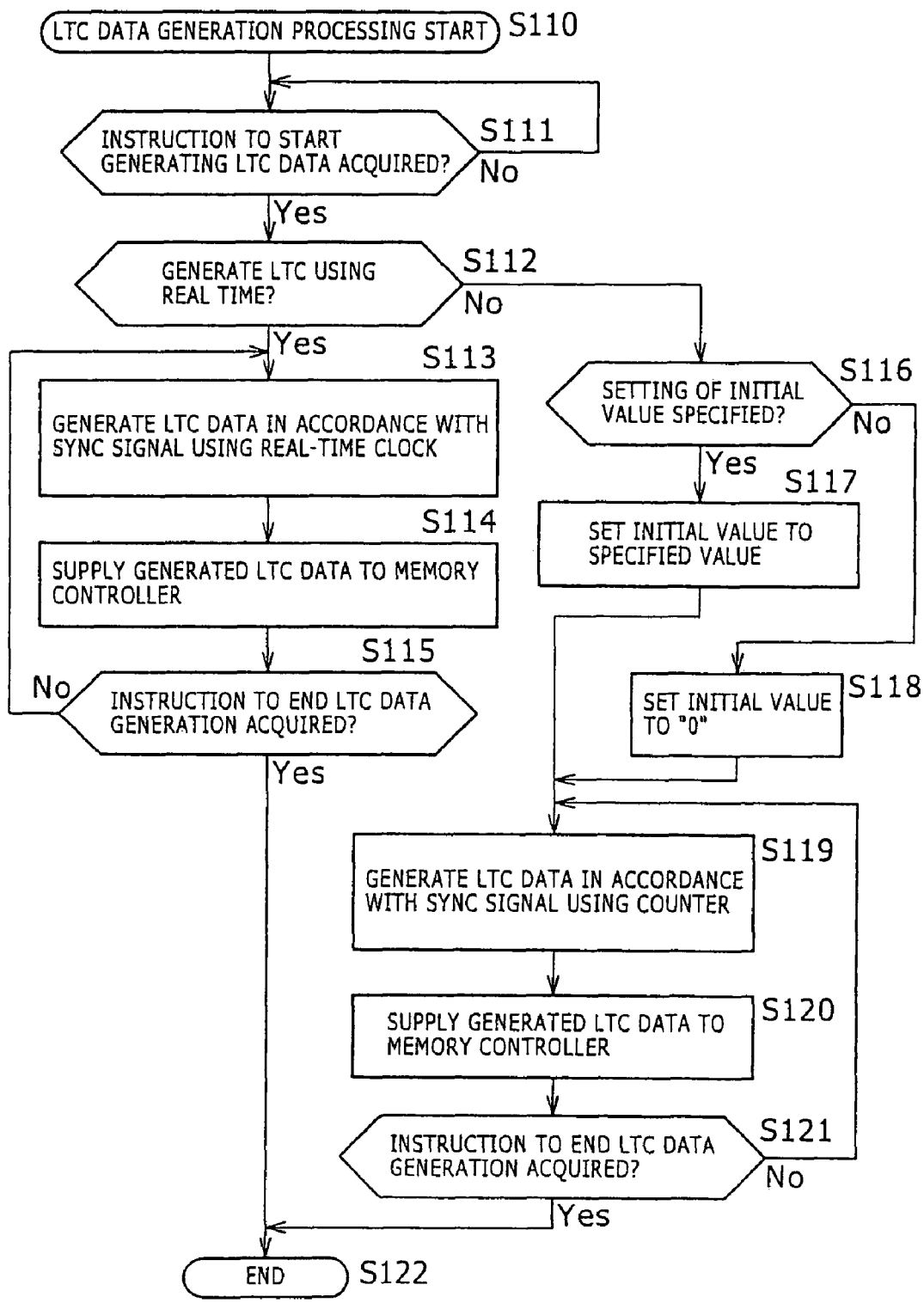
FIG. 12 is a flowchart of assistance in explaining LTC data generation processing.
Figure 22:
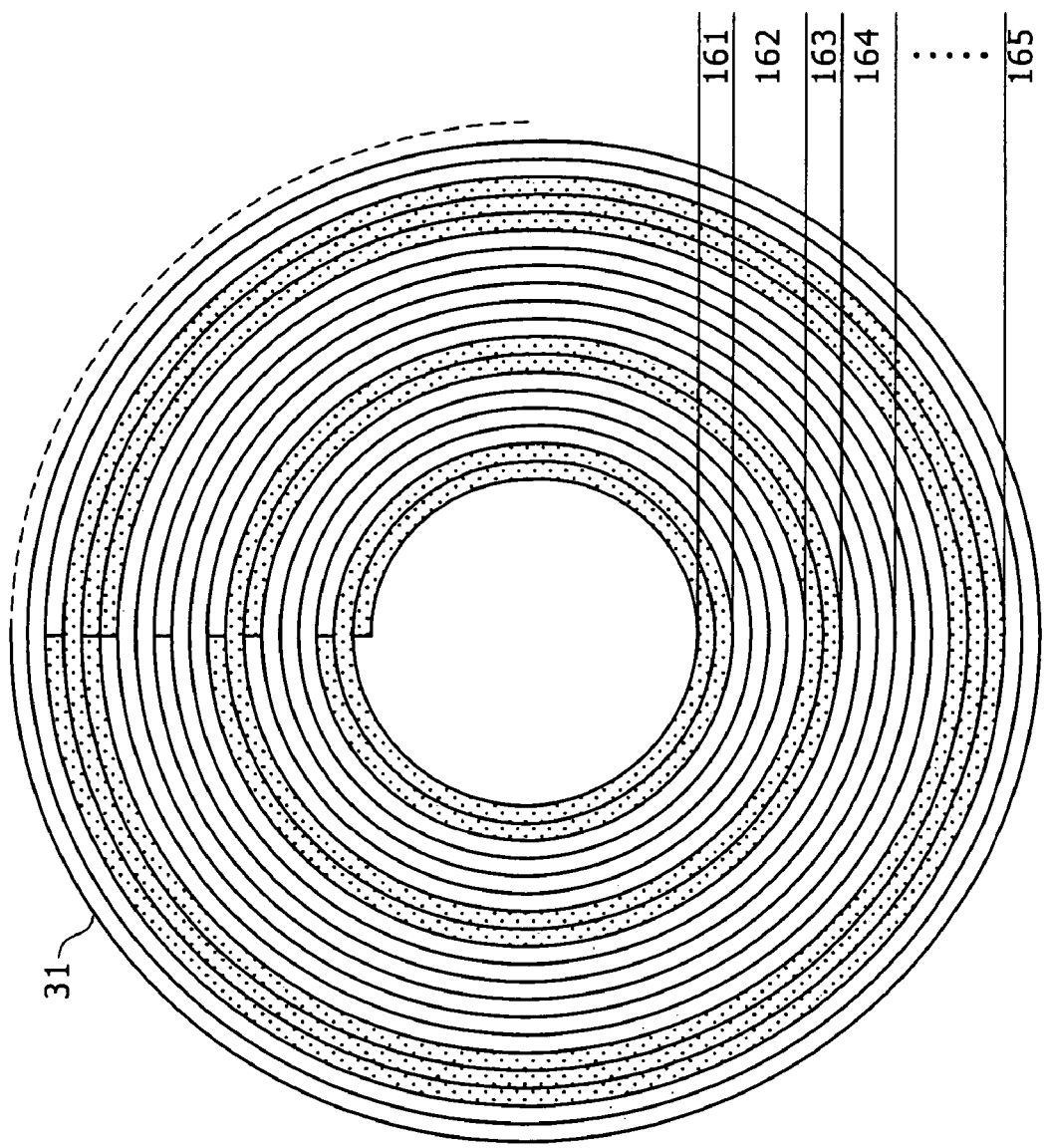
FIG. 22 is a schematic diagram showing an example of the structure of data recorded on an optical disk in FIG. 2.

According to the recording processing of FIG. 6, the audio data recording task of FIG. 7, the video data recording task of FIG. 8, the low-resolution data recording task of FIG. 9, the real-time metadata recording task of FIG. 10, the LTC data generation processing of FIG. 12, and the LTC change point table creation processing of FIGS. 13 to 15 as described above, the audio annual-ring data, the video annual-ring data, the low-resolution annual-ring data, the real-time meta annual-ring data, and the non-real-time metadata are recorded on the optical disk 31, as shown in FIG. 22.

As described above, audio annual-ring data, video annual-ring data, low-resolution annual-ring data, and real-time meta annual-ring data at similar playback time slots are recorded in forwarder positions on the optical disk 31 in the order of the audio annual-ring data, the video annual-ring data, the low-resolution annual-ring data, and the real-time meta annual-ring data.

With reference to, for example, audio annual-ring data with the highest priority, after audio annual-ring data at a certain playback time slot is recorded, video annual-ring data, low-resolution annual-ring data, and real-time meta annual-ring data at a similar playback time slots are recorded following the audio annual-ring data.

Thus, as shown in FIG. 22, audio annual-ring data, video annual-ring data, low-resolution annual-ring data, and real-time meta annual-ring data are recorded on the optical disk 31 from its inner to its outer circumference in the order of audio annual-ring data 161, video annual-ring data 162, low-resolution annual-ring data 163, and real-time meta annual-ring data 164, repeatedly.

Further, non-real-time metadata 165, of which real-time performance is not required, is recorded in an area other than areas for the above-mentioned annual-ring data.

Each relationship between the audio annual-ring size Tsa, the video annual-ring size Tsv, the low-resolution annual-ring size Tsl, and the real-time meta annual-ring size Tsm may be any relationship. As described above, the audio annual-ring size Tsa, the video annual-ring size Tsv, the low-resolution annual-ring size Tsl, and the real-time meta annual-ring size Tsm can be set, for example, to the same time period or to different time period. Further, as a matter of course, each of the low-resolution annual-ring size Tsl and the real-time meta annual-ring size Tsm may be two times each of the audio annual-ring size Tsa and the video annual-ring size Tsv.

Furthermore, the audio annual-ring size Tsa, the video annual-ring size Tsv, the low-resolution annual-ring size Tsl, and the real-time meta annual-ring size Tsm can be set for matching, for example, uses and purposes of use of the optical disk 31. For example, each of the low-resolution annual-ring size Tsl and the real-time meta annual-ring size Tsm can be set to be greater than each of the audio annual-ring size Tsa and the video annual-ring size Tsv.

Figure 23A:
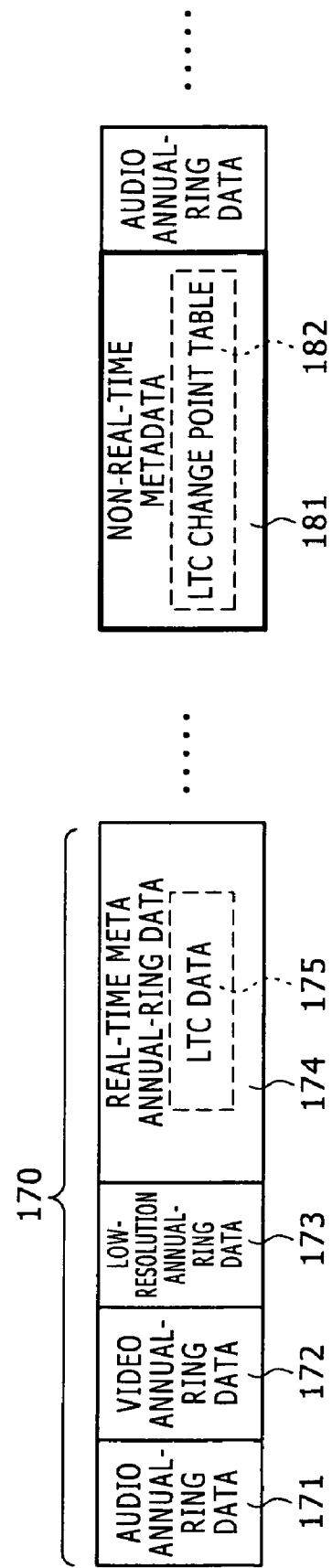
FIG. 23A is a schematic diagram of assistance in explaining an example of the structure of data recorded on an optical disk in FIG. 2.

Further, the non-real-time metadata 165 may be recorded in any position on the optical disk 31. For example, as shown in FIG. 23A, the non-real-time metadata 165 may be recorded between one annual-ring data and another. In the case of FIG. 23A, after annual-ring data 170 composed of audio annual-ring data 171, video annual-ring data 172, low-resolution annual-ring data 173, and real-time meta annual-ring data 174 are recorded a plurality of times, non-real-time metadata 181 is recorded, and subsequently another annual-ring data is recorded.

As described with reference to the flowchart of FIG. 6, non-real-time metadata is recorded after the audio data recording task, the video data recording task, the low-resolution data recording task, and the real-time metadata recording task are completed. Thus, with this timing, the non-real-time metadata 181 is recorded subsequently to the last annual-ring data 170 that has already been recorded, and the annual-ring data to be recorded at the next initiated recording processing is recorded subsequently to the last non-real-time metadata 181 that has been recorded.

The real-time meta annual-ring data 174 includes LTC data 175 corresponding to the audio annual-ring data 171 and the video annual-ring data 172 included in the same annual-ring data. Thus, the LTC data 175 is recorded close to the audio annual-ring data 171 and the video annual-ring data 172 that the LTC data 175 corresponds to. Therefore, in the case of reading the LTC data 175 at the time of playback of the audio annual-ring data 171 and the video annual-ring data 172 included in the annual-ring data 170, it is possible to reduce seek time and enhance the speed for reading the LTC data 175.

Further, the non-real-time metadata 181 includes an LTC change point table 182 corresponding to LTC data included in the first annual-ring data or annual-ring data subsequent to the preceding non-real-time metadata to the preceding annual-ring data. Therefore, the LTC change point table 182 is recorded somewhat closer (compared to the case in FIG. 23B described later) to the audio annual-ring data 171 and the video annual-ring data 172 that the LTC change point table 182 corresponds to. Metadata included in the non-real-time metadata 181 is basically metadata of which real-time performance is not required. However, for example, in the case where the user instructs the disk recording/playback apparatus 30 to play back a certain frame using the LTC change point table 182, recording the audio annual-ring data 171 and the video annual-ring data 172 in close to the LTC change point table 182 makes it possible to reduce seek time and enhance the speed for reading the audio annual-ring data 171 and the video annual-ring data 172 for suitable operation.

Figure 23B:
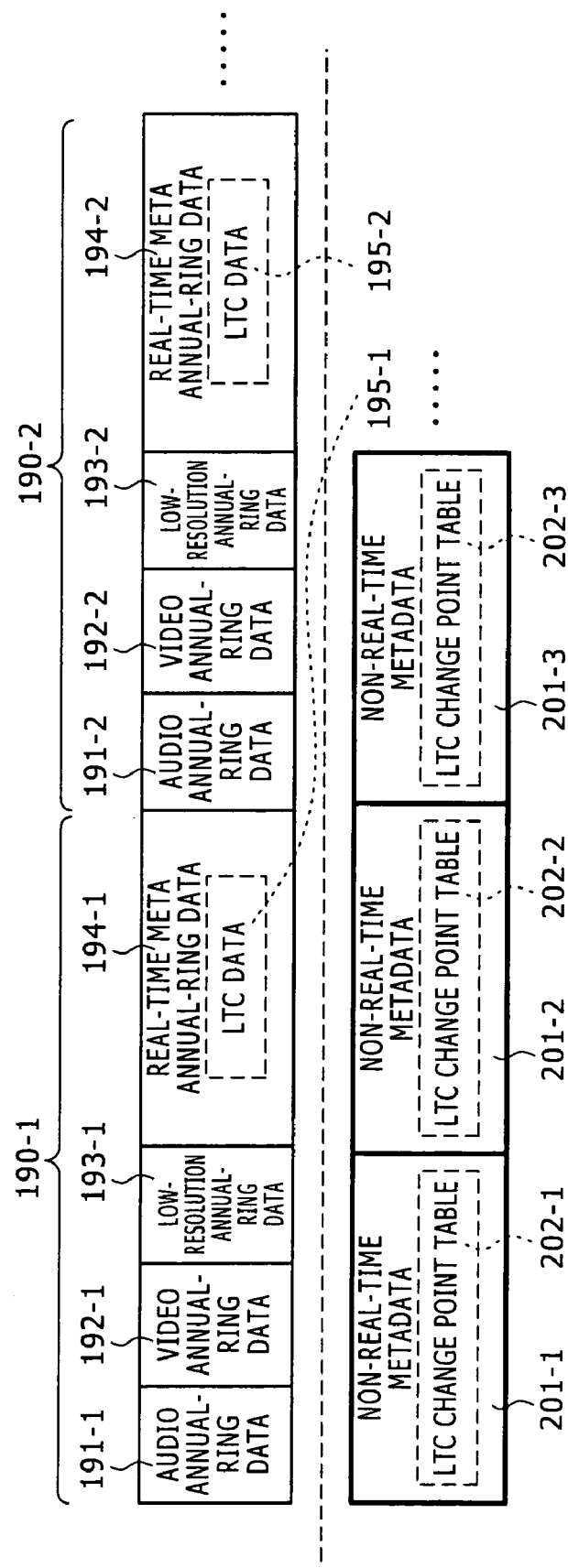
FIG. 23B is a schematic diagram of assistance in explaining another example of the structure of data recorded on an optical disk in FIG. 2.

Further, non-real-time metadata may be, for example, collectively recorded in areas other than areas where annual-ring data is stored, as shown in FIG. 23B. In the case of FIG. 23B, non-real-time metadata 201-1, non-real-time metadata 201-2, and non-real-time metadata 201-3 are recorded in areas other than areas where annual-ring data 190-1 composed of audio annual-ring data 191-1, video annual-ring data 192-1, low-resolution annual-ring data 193-1, and real-time meta annual-ring data 194-1 and annual-ring data 190-2 composed of audio annual-ring data 191-2, video annual-ring data 192-2, low-resolution annual-ring data 193-2, and real-time meta annual-ring data 194-2 are stored.

In this case, as described with reference to the flowchart of FIG. 6, non-real-time metadata is recorded in areas other than areas for annual-ring data after the audio data recording task, the video data recording task, the low-resolution data recording task, and the real-time metadata recording task are completed.

Thus, an LTC change point table 202-1, an LTC change point table 202-2, and an LTC change point table 202-3 respectively included in the non-real-time metadata 201-1, the non-real-time metadata 201-2, and the non-real-time metadata 201-3 are recorded close to each other. Accordingly, in the case of retrieving a certain frame using a plurality of conversion tables, it is possible to reduce seek time and retrieve a target frame at high speed.

Further, in the case of playing back audio data and video data, since non-real-time metadata unnecessary for playback does not exist between them, it is possible to reduce reading time and enhance the speed of the playback processing.

Since non-real-time metadata is composed of metadata of which real-time performance is not required, it is unnecessary to consider the seek time; therefore, non-real-time metadata may be placed in any physical position in storage areas on the optical disk 31. For example, a piece of non-real-time metadata may be recorded in a plurality of positions in a distributed manner.

As described above, LTC is recorded as real-time metadata along with essence data composed of audio data and video data. Also, an LTC change point table composed of LTC change points is recorded as non-real-time metadata. Therefore, in the case of editing the above-described data recorded on the optical disk 31, the user can easily perform playback control processing based on LTC such as retrieving and play backing a target frame based on LTC.

Figure 24:
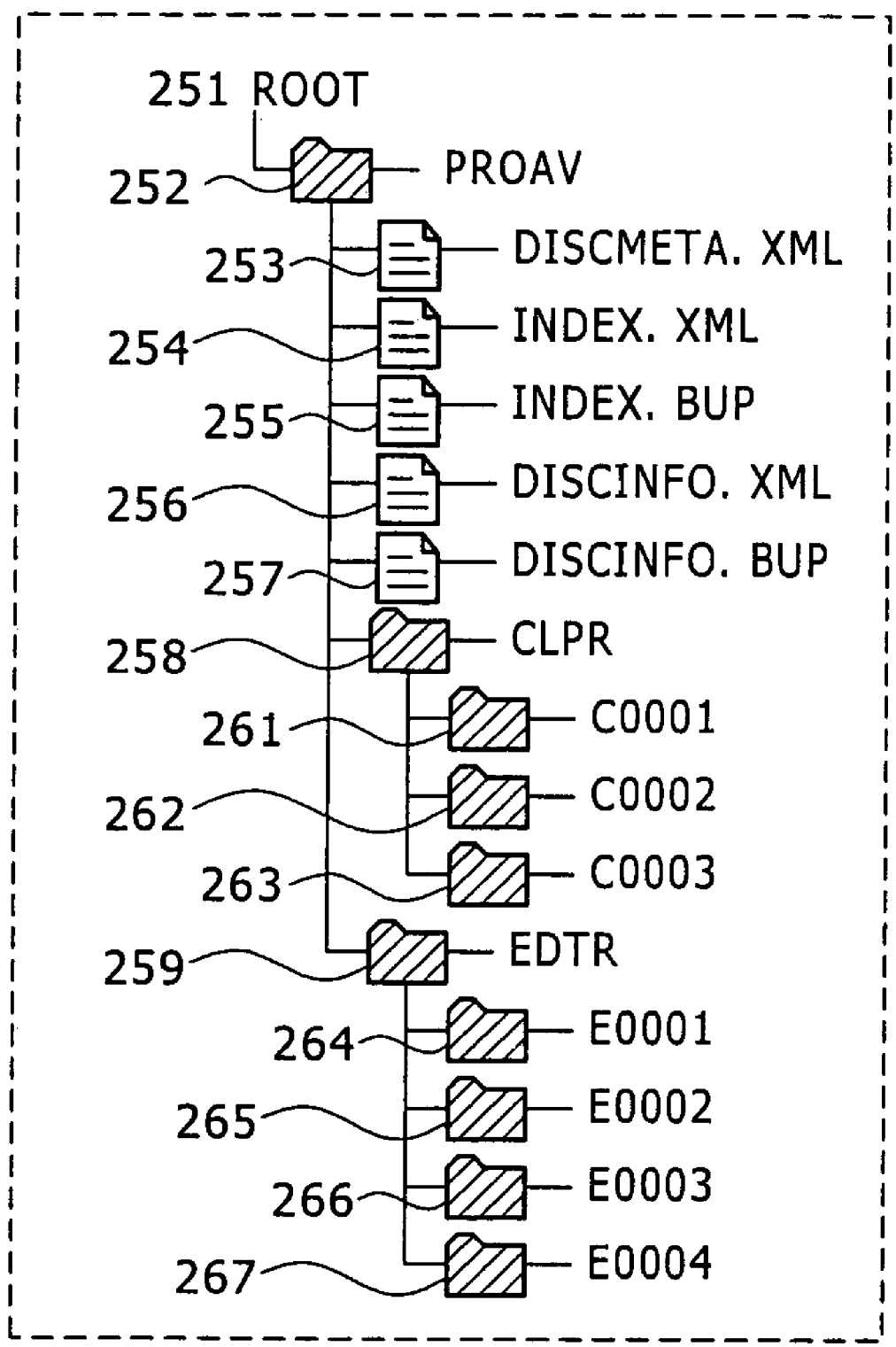
FIG. 24 is an illustration showing an example of a directory structure in an optical disk of FIG. 2.
Figure 25:
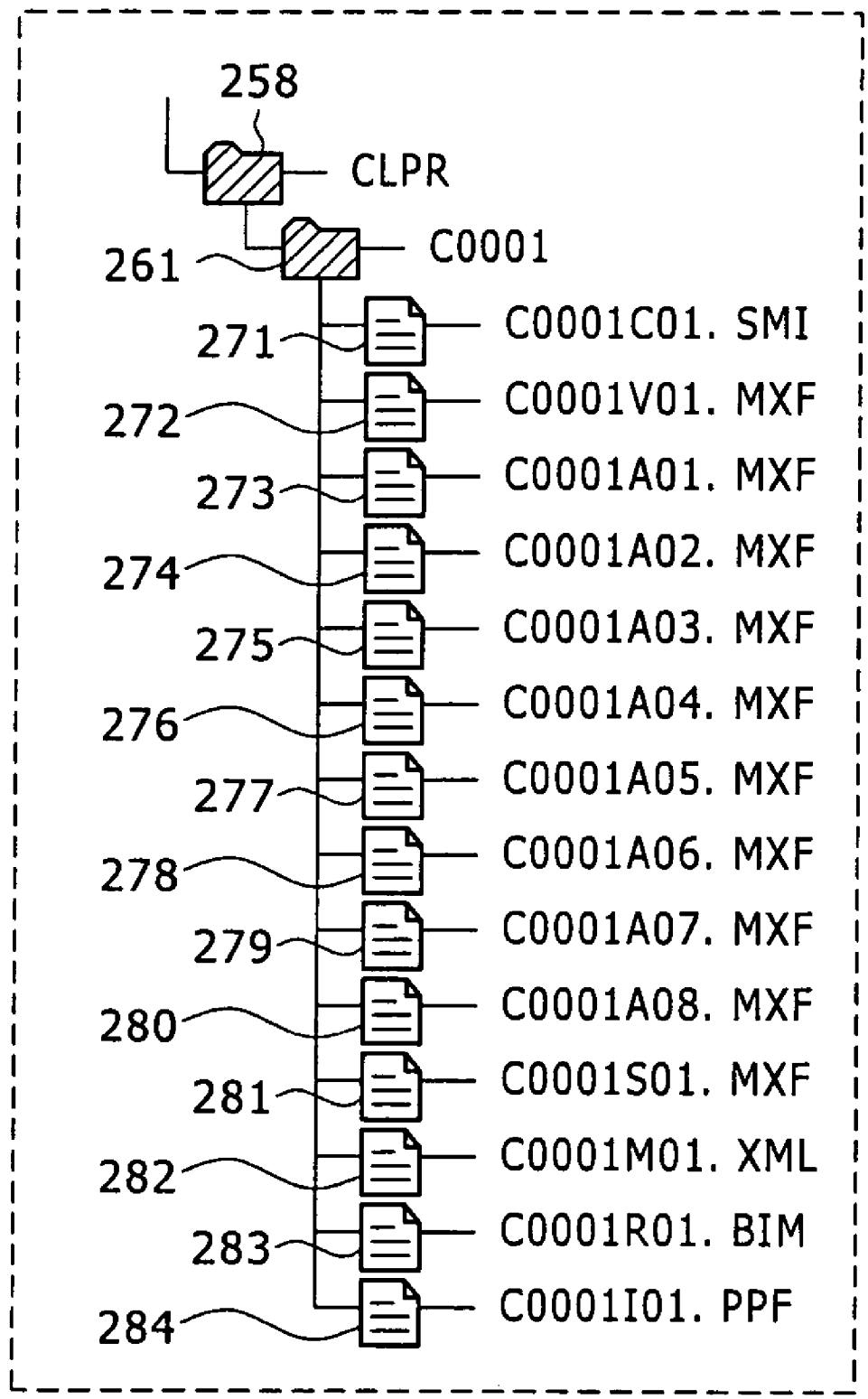
FIG. 25 is an illustration showing an example of a more detailed directory structure shown in FIG. 24.

Data thus recorded on the optical disk 31 is managed in units of files of directory structures shown in FIGS. 24 and 25, for example, by a file system such as UDF (Universal Disk Format). Any file system including UDF may be used as the file system for managing files on the optical disk 31, as long as it is a file system that the disk recording/playback apparatus 30 in FIG. 2 can support, such as ISO 9660 (International Organization for Standardization 9660). In the case where a magnetic disk such as a hard disk is used in place of the optical disk 31, FAT (File Allocation Tables), NTFS (New Technology File System), HFS (Hierarchical File System), UFS (Unix (registered trademark) File System) or the like may be used as the file system. Alternatively, a dedicated file system may be used.

A root directory (ROOT) 251 in FIG. 24 has a PROAV directory 252 including subdirectories in which information about essence data such as video data, audio data and the like, edit lists representing results of editing the essence data, and the like are disposed.

The PROAV directory 252 includes: a disk metadata file (DISCMETA.XML) 253 as a file such including information, for example, as a title and comments for all the essence data recorded on the optical disk 31 and a path to video data corresponding to a representative picture as a frame representative of all the video data recorded on the optical disk 31; and an index file (INDEX.XML) 254; and, an index file (INDEX.BUP) 255 including, for example, managing information for managing all clips and edit lists recorded on the optical disk 31. Further, the index file 255 is a replica of the index file 254. The two files are provided to improve reliability.

The PROAV directory 252 includes a disk information file (DISCINFO.XML) 256 and a disk information file (DISCINFO.BUP) 257, which are metadata for the entire data recorded on the optical disk 31 and a file including information such as a playback history. Further, the disk information file 257 is a replica of the disk information file 256. The two files are provided to improve reliability.

In addition to the files described above, the PROAV directory 252 further includes a clip root directory (CLPR) 258 having clip data disposed in subdirectories and an edit list root directory (EDTR) 259 having edit list data disposed in subdirectories.

In the clip root directory 258, the clip data recorded on the optical disk 31 is managed in different, separate directories one for each clip. In the case of FIG. 24, for example, three pieces of clip data are managed in three separate directories, that is, a clip directory (C0001) 261, a clip directory (C0002) 262, and a clip directory (C0003) 263. Specifically, data of a first clip recorded on the optical disk 31 is managed as files in a subdirectory of the clip directory 261; data of a second clip recorded on the optical disk 31 is managed as files in a subdirectory of the clip directory 262; and data of a third clip recorded on the optical disk 31 is managed as files in a subdirectory of the clip directory 263.

In the edit list root directory 259, the edit lists recorded on the optical disk 31 are managed in different, separate directories one for each edit process. In the case of FIG. 24, for example, four edit lists are managed in four separate directories, that is, an edit list directory (E0001) 264, an edit list directory (E0002) 265, an edit list directory (E0003) 266, and an edit list directory (E0004) 267. Specifically, the edit list representing a result of first editing of the clips recorded on the optical disk 31 is managed as files in a subdirectory of the edit list directory 264; the edit list representing a result of second editing is managed as files in a subdirectory of the edit list directory 265; the edit list representing a result of third editing is managed as files in a subdirectory of the edit list directory 266; and the edit list representing a result of fourth editing is managed as files in a subdirectory of the edit list directory 267.

In the subdirectory of the clip directory 261 provided in the above-described clip root directory 258, the data of the first clip recorded on the optical disk 31 is provided and managed as files as shown in FIG. 25.

In the case of FIG. 25, the clip directory 261 includes: a clip information file (C0001C01.SMI) 271 for managing this clip; a video data file (C0001V01.MXF) 272 including video data of the clip; eight audio data files (C0001A01.MXF to C0001A08.MXF) 273 to 280 including audio data of channels of the clip; a low-resolution data file (C0001S01.MXF) 281 including substream data of the clip; a non-real-time metadata file (C0001M01.XML) 282 corresponding to the essence data of the clip and including non-real-time metadata of which real-time performance is not required; a real-time metadata file (C0001R01.BIM) 283 corresponding to the essence data of the clip and including real-time metadata of which real-time performance is required; and a picture pointer file (C0001I01.PPF) 284 for describing the frame structure of the video data file 272 (for example, information about a compression form of each picture in MPEG or the like and information about an offset address from the start of the file and the like).

In the case of FIG. 23, video data, low-resolution data, and real-time metadata, of which real-time performance is required at the time of playback, are each managed as one file so as not to increase reading time.

While the real-time performance is required also of audio data at the time of playback, eight channels are provided to support multiple audio channels such as 7.1 channels or the like, and are managed as different files, respectively. That is, audio data is managed as eight files in the above description; however, the present invention is not limited to this, and a number of files corresponding to audio data may be 7 or less, or 9 or more.

Similarly, video data, low-resolution data, and real-time metadata may be each managed as two or more files in some cases.

In FIG. 25, non-real-time metadata of which real-time performance is not required is managed as a file different from that of real-time metadata of which real-time performance is required. This is to prevent reading of metadata that is not required during normal playback of video data and the like. It is thereby possible to reduce the processing time of playback processing and a load necessary in the processing.

While the non-real-time metadata file 282 is described in XML format for versatility, the real-time metadata file 283 is a file in BIM (BInary format for MPEG-7 data) format obtained by compiling a file in XML format in order to reduce the processing time of playback processing and a load necessary in the processing.

The example of structure of the files in the clip directory 261 shown in FIG. 25 is applicable in all the clip directories corresponding to clips recorded on the optical disk 31. Specifically, the example of structure of the files shown in FIG. 25 is applicable in the other clip directories 262 and 263 shown in FIG. 24. Therefore, a description thereof will be omitted.

While the files included in a clip directory corresponding to one clip have been described above, the structure of the files is not limited to the above example, and any structure may be employed.

FIG. 26 is an illustration showing an example of a specific description in an LTC change point table included in a non-real-time metadata file described in XML. The numbers added at the beginnings of lines are for convenience in description and are not part of the XML description.

The description [<LtcChangeTable tcFps="30">] on the 1st line in FIG. 26 is a start tag indicating the start of the description in the LTC change point table. The description [tcFps="30"] indicates that the time code is described as 30 frames per second in the LTC change point table.

On the 2nd to 12th lines, elements indicating LTC change points are described. On the 2nd to 12th lines, the description [frameCount=" "] indicates a frame number, that is, an FTC value; the description [value=" "] indicates an LTC value of the frame; and the description [status=" "] indicates a status of the frame. For example, in the case of the description [<LtcChange frameCount="0" value="55300201" status="increment"/>] on the 2nd line, the change point is the frame whose frame number is "0", the LTC is "55300201", and the status of the section starting from this frame is "increment". The structure of the descriptions on the 3rd to 12th lines is basically the same as that of the 2nd line except that values are different. Therefore, description thereof will be omitted.

The description [</LtcChangeTable>] on the 13th line is an end tag indicating the end of the description in the LTC change point table.

For example, when the user specifies a frame to be displayed using LTC, the disk recording/playback apparatus 30 in FIG. 2, as described later, reads an LTC change point table described, as shown in FIG. 26, from non-real-time metadata and retrieves and displays the specified frame based on this description. Thereby, the disk recording/playback apparatus 30 can retrieve a target frame more easily than it retrieves a target LTC (frame) from an LTC group described in real-time metadata associated with frames.

The disk recording/playback apparatus 30 shown in FIG. 2 may be, for example, as shown in FIG. 27, a disk recording unit 301 in a camcorder 300 having an imaging unit 302 other than the foregoing. In this case, the imaging unit 302 in place of the signal input/output device 51 is connected to the disk recording unit 301, and essence data, including video data imaged by the camera of the imaging unit 302 and audio data picked up by the microphone of the imaging unit 302, is inputted to the disk recording unit 301. The structure of the disk recording unit 301 is the same as that of the disk recording/playback apparatus 30, so that the disk recording unit 301, operating in the same manner as in the disk recording/playback apparatus 30, records essence data and metadata added to the essence data which are supplied from the imaging unit 302 onto the optical disk 31.

Next, a description will be made of an example of the specific manner in which the above-described LTC change point table is used.

FIG. 28 is an illustration showing an example of an editing system which edits essence data recorded on the optical disk 31 and records the edit result onto another optical disk 31.

In FIG. 28, an editing system 310 is composed of two disk recording/playback apparatuses 321 and 323 which are connected to each other through a network 322 and an editing control apparatus 324 which controls the editing of essence data.

The disk recording/playback apparatus 321 has a drive 321A supporting the optical disk 31. The disk recording/playback apparatus 321, controlled by the editing control apparatus 324 connected through the network 322, plays back essence data, etc., recorded on the optical disk 31 mounted on the drive 321A and supplies the played back essence data, etc., to the disk recording/playback apparatus 323 through the network 322. Further, the disk recording/playback apparatus 321 has a monitor 321B for displaying images and displays the image corresponding to video data played back from the optical disk 31 mounted on the drive 321A.

The network 322 is a network represented by the Internet, Ethernet (registered trademark), or the like. The disk recording/playback apparatus 321, the disk recording/playback apparatus 323, and the editing control apparatus 324 are connected to the network 322, and various kinds of data are transferred among these apparatuses through the network 322.

The disk recording/playback apparatus 323 has a drive 323A and a monitor 323B as in the case of the disk recording/playback apparatus 321. The disk recording/playback apparatus 323, controlled by the editing control apparatus 324 connected through the network 322, records the essence data, etc., supplied through the network 323 onto the optical disk 31 mounted on the drive 323A and displays the image corresponding to the recorded video data onto the monitor 323B.

The editing control apparatus 324 controls the disk recording/playback apparatuses 321 and 323 through the network 322 so that the disk recording/playback apparatus 321 supplies the essence data, etc., played back at the disk recording/playback apparatus 321 to the disk recording/playback apparatus 323 and the disk recording/playback apparatus 323 records the essence data, etc., onto the optical disk 31. Further, the editing control apparatus 324 is provided with an LTC inputting key 324A which is a ten key that the user operates at the time of specifying LTC, and a display unit 324B which displays the inputted LTC to be checked.

The structure of the disk recording/playback apparatuses 321 and 323 is basically the same as that of the disk recording/playback apparatus 30 shown in FIG. 2, so that the disk recording/playback apparatuses 321 and 323 operate in the same manner as in the disk recording/playback apparatus 30. However, each of the disk recording/playback apparatuses 321 and 323 has a communication unit in place of the signal input/output device 51 and communicates with another apparatus through the network so as to exchange various kinds of data such as essence data.

FIG. 29 is a block diagram showing an example of the internal structure of the editing control apparatus 324 in FIG. 28.

In FIG. 29, a CPU (Central Processing Unit) 331 in the editing control apparatus 324 executes various kind of processing in accordance with a program stored in a ROM (Read Only Memory) 332. Data and programs that are necessary for the CPU 331 to execute various kind of processing are stored in a RAM (Random Access Memory) 333 if necessary.

A playback control unit 334 controls the playback processing by the disk recording/playback apparatus 321 and the disk recording/playback apparatus 323 through a communication unit 344. For example, the playback control unit 334 controls the disk recording/playback apparatus 323 so that the disk recording/playback apparatus 323 plays back a clip of essence data, etc., from the optical disk 31 mounted on the drive 323A and displays a frame image corresponding to LTC specified by the user onto the monitor 323B.

An editing control unit 335 controls the disk recording/playback apparatus 321 and the disk recording/playback apparatus 323 through the communication unit 344 to control the editing processing of essence data. For example, the editing control unit 335 controls the disk recording/playback apparatus 321 through the network 322 so that the disk recording/playback apparatus 321 performs playback (normal playback, fast-forward playback, fast-rewind playback, pause, stop, etc.) of a clip, displays the video corresponding to the played back clip onto the monitor 321B, and supplies the clip data to the disk recording/playback apparatus 323 through the network 322. Further, the editing control unit 335 controls the disk recording/playback apparatus 323 through the network 322 so that the disk recording/playback apparatus 323 acquires clip data supplied thereto and records it onto the optical disk 31 mounted on the drive 323A.

The CPU 331, the ROM 332, the RAM 333, the playback control unit 334, and the editing control unit 335 are interconnected through a bus 336.

Further, an input/output interface 340 is connected to the bus 336. An input unit 341 composed of an LTC inputting ten key, various kinds of instruction inputting buttons, etc. is connected to the input/output interface 340, and the input unit 341 outputs a signal inputted to the input unit 341 to the CPU 331. Further, an output unit 342 including the display unit 324B, etc., is also connected to the input/output interface 340.

Further, a storage unit 343 including a magnetic drive such as a hard disk, an EEPROM (Electronically Erasable and Programmable Read Only Memory), etc., and the communication unit 344 communicating data with the disk recording/playback apparatus 321 and the disk recording/playback apparatus 323 through the network 322 are also connected to the input/output interface 340. A removable medium 346, which is a recording medium such as a magnetic disk, an optical disk, a magneto-optical disk, or a semiconductor memory, is mounted on a drive 345 as necessary. The drive 345 controls the reading of a program and data stored in the removable medium 346 mounted on the drive 345.

Figure 30:
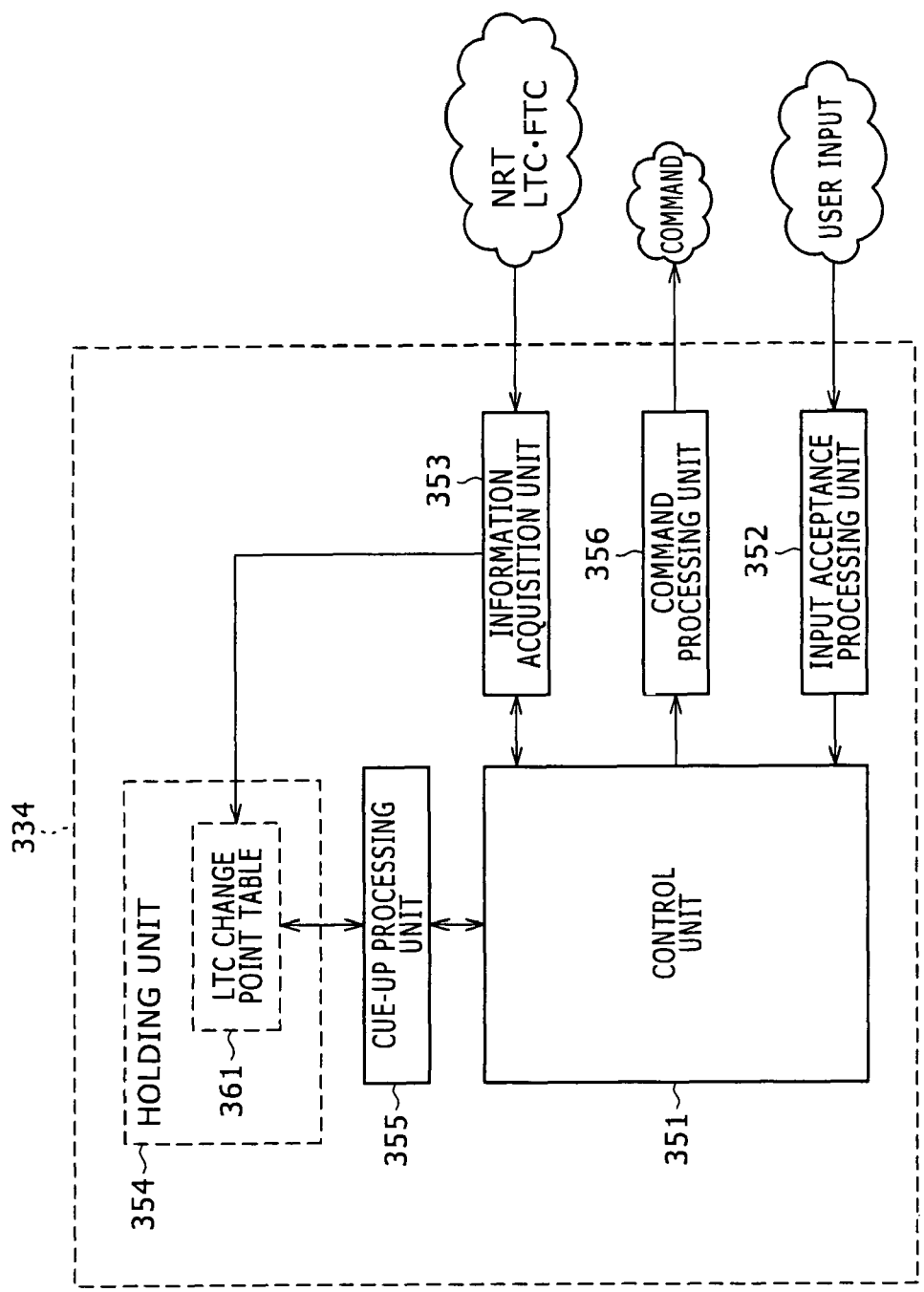
FIG. 30 is a block diagram showing an example of the detailed structure of a playback control unit in FIG. 29.

FIG. 30 is a block diagram showing an example of the detailed structure of the playback control unit 334 in FIG. 29. In FIG. 30, the playback control unit 334 includes a control unit 351 which controls the whole of the playback control unit 334, an input acceptance processing unit 352 which accepts a user input inputted through the input unit 341, an information acquisition unit 353 which acquires non-real-time metadata (NRT) such as LTC and FTC acquired through the communication unit 344, a holding unit 354 which holds non-real-time metadata acquired by the information acquisition unit 353, a cue-up processing unit 355 which controls cue-up processing for specifying a frame image to be displayed onto the monitor using LTC, and a command processing unit 356 which outputs various kinds of command information supplied from the control unit 351.

The control unit 351 includes a ROM and a RAM (not shown) and controls the operation of each unit in the playback control unit 334 by executing various kinds of programs. The input acceptance processing unit 352 controls the acceptance of a user input inputted through the input unit 341 and supplies the accepted user input to the control unit 351.

Upon acquiring non-real-time metadata (NRT) supplied through the communication unit 344 for example, the information acquisition unit 353, controlled by the control unit 351, supplies the acquired non-real-time metadata to the holding unit 354 which holds it.

The holding unit 354 is composed of a recording medium such as a hard disk or a semiconductor memory and holds non-real-time metadata supplied from the information acquisition unit 353. That is, the holding unit 354 holds an LTC change point table 361 included in non-real-time metadata.

The cue-up processing unit 355 performs cue-up processing, out of processing for playing back a clip, in which the user specifies the frame number of a frame image to be displayed on the monitor using LTC. For example, upon receiving LTC specified by the user from the control unit 351, the cue-up processing unit 355 accesses the holding unit 354, refers to the LTC change point table 361 held in the holding unit 354, identifies a frame corresponding to the specified LTC, and supplies the FTC information (frame number) of the frame to the control unit 351.

The command processing unit 356 supplies command information, etc., supplied from the control unit 351 to the disk recording/playback apparatus 323, etc., through the communication unit 344.

Next, a description will be made of editing processing in the editing system 310 in FIG. 28.

The user, by operating the input unit 341 of the editing control apparatus 324 in the editing system 310 in FIG. 28, allows the editing system to play back clip data recorded on the optical disk 31 mounted on the drive 321A of the disk recording/playback apparatus 321 and record the played back clip data onto the optical disk 31 mounted on the drive 323A of the disk recording/playback apparatus 323.

The editing control unit 335 in the editing control apparatus 324 controls the disk recording/playback apparatus 321 based on the user input so that the disk recording/playback apparatus 321 plays back a clip, supplies the clip data to the disk recording/playback apparatus 323 through the network 322, and displays the image corresponding to the video data of the clip onto the monitor 321B. Further, the editing control unit 335 in the editing control apparatus 324 controls the disk recording/playback apparatus 323 based on the user input so that the disk recording/playback apparatus 323 records the clip data (essence data and metadata) supplied to the disk recording/playback apparatus 323.

At this time, the user, by operating the input unit 341 of the editing control apparatus 324, for example, referring to the image displayed on the monitor 321B to instruct the editing control apparatus on normal playback, fast-forward playback, fast-rewind playback, pause, stop, or the like as necessary and input a playback control instruction for the clip. The editing control unit 335 in the editing control apparatus 324 controls the disk recording/playback apparatus 321 based on the user input to control the playback processing of the clip.

That is, clip data including such a playback operation (clip data in which a playback operation such as normal playback, fast-forward playback, fast-rewind playback, pause, stop, or the like performed at the disk recording/playback apparatus 321 is reflected) is recorded on the optical disk 31 mounted on the drive 323A of the disk recording/playback apparatus 323. Therefore, when normal playback is performed on the clip data thus recorded on the optical disk 31 mounted on the drive 323A of the disk recording/playback apparatus 323, images are displayed on the monitor 323B in the following manner. For example, a fast-forwarded image is displayed as to a portion where the fast-forward playback is performed at the disk recording/playback apparatus 321, a rewound image is displayed as to a portion where the fast-rewind playback is performed at the disk recording/playback apparatus 321, and a paused image is displayed as to a portion where the pause is performed at the disk recording/playback apparatus 321.

For example, when the user instructs the disk recording/playback apparatus 321 to perform fast-forward playback, the disk recording/playback apparatus 321 performs fast-forward playback by thinning out frames. In such a case, at the disk recording/playback apparatus 323, only the frames that remain after subjected to thinning out are recorded as to a portion where the fast-forward playback is performed. Accordingly, real-time metadata of the clip is recorded, apart of the real-time metadata being thinned out. Therefore, in a frame of this portion, while FTC is continuously incremented by 1 (since new FTC is assigned when real-time metadata is recorded onto the optical disk 31), LTC increases discontinuously (by 2 or more).

That is, in the clip thus recorded, the increase/decrease pattern of LTC changes in accordance with playback processing performed by the disk recording/playback apparatus 321. The disk recording/playback apparatus 323, in the same way as in the disk recording/playback apparatus 30 in FIG. 2, receives clip data, creates an LTC change point table based on LTC data of real-time metadata, and records it as non-real-time metadata onto the optical disk 31.

Further, the user operates the editing control apparatus 324 to control the disk recording/playback apparatus 323 so that the disk recording/playback apparatus 323 plays back the clip thus recorded and displays the video onto the monitor 323B. At this time, the user can also select a frame to be displayed on the monitor 323B using LTC by operating the LTC inputting ten key 324A of the editing control apparatus 324.

Next, a description will be made of the operation of the playback control unit 334 in the editing control apparatus 324.

Upon acquiring an LTC change point table 361 from the outside, the information acquisition unit 353 in the playback control unit 334, controlled by the control unit 351, supplies the acquired LTC change point table 361 to the holding unit 354 which holds it.

The input acceptance processing unit 352, upon accepting a user input of a cue-up instruction from the outside, supplies the user input (cue-up instruction) through the control unit 351 to the cue-up processing unit 355. The cue-up processing unit 355, upon acquiring the cue-up instruction, refers to the LTC change point table 361 held in the holding unit 354 in order to identify the frame number (FTC) of a frame corresponding to LTC (which specifies a frame to be displayed) included in the instruction. Based on the LTC change point table 361, the cue-up processing unit 355 identifies the frame number of a frame corresponding to the LTC (a frame to be displayed, that is, a frame to be cued up), and supplies this information to the control unit 351. Based on the information (information as to the FTC of a frame to be cued up), the control unit 351 supplies command information including a command for displaying the frame (cueing up the frame) through the command processing unit 356 to the disk recording/playback apparatus 323.

Figure 31:
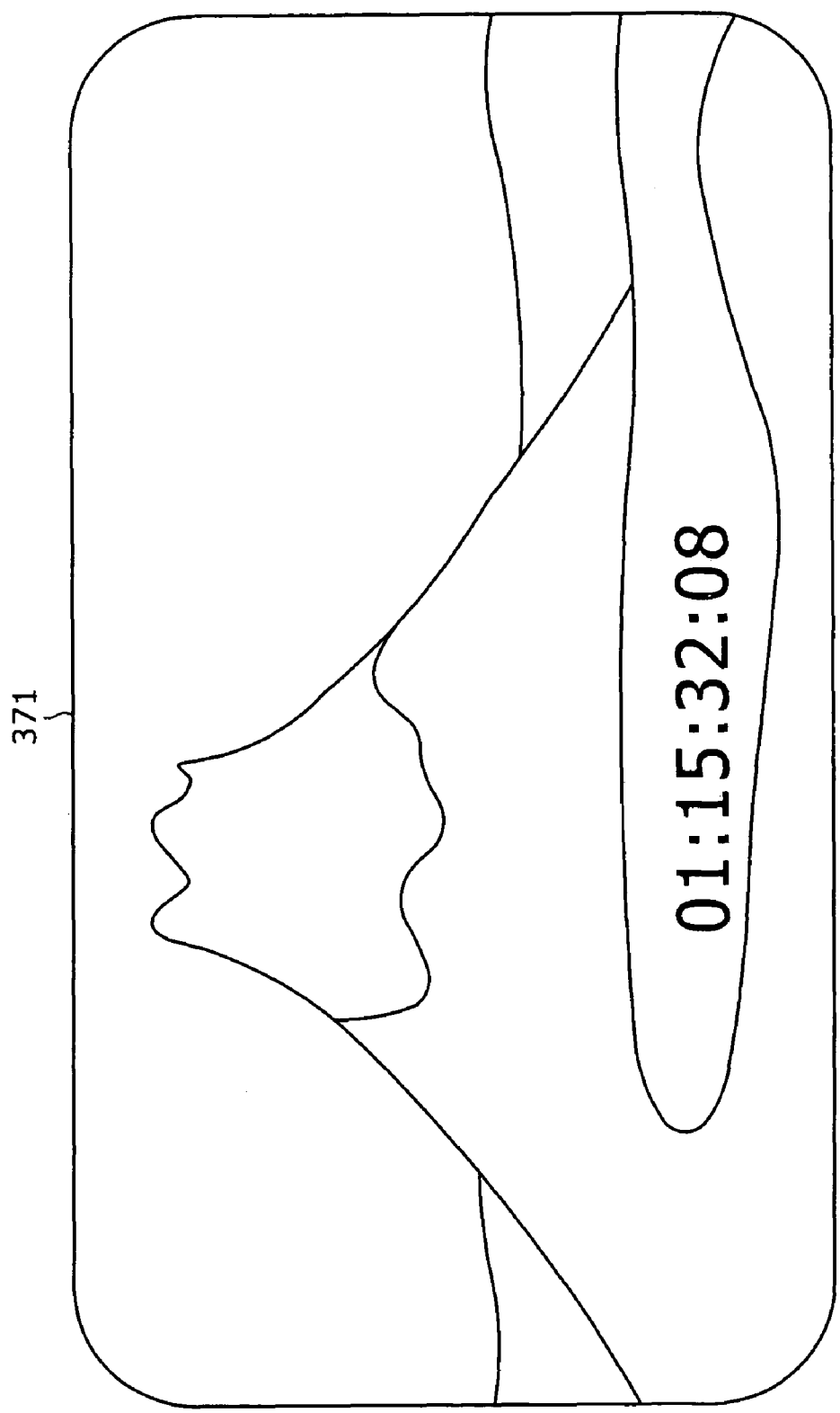
FIG. 31 is an illustration of assistance in explaining an example of a display by a monitor in FIG. 28.

The thus supplied command information is supplied to the disk recording/playback apparatus 323 through the network 322. Based on the command information, the disk recording/playback apparatus 323 performs cue-up processing and displays the frame image of the specified frame onto the monitor 3238. FIG. 31 is an illustration showing an example of a frame image displayed on the monitor 323B. In FIG. 31, the frame image 371 displayed on the monitor 323B shows the LTC of the frame such as "01:15:32:08" besides the video data.

Next, a description will be made of the playback control processing performed by the playback control unit 334, with reference to the flowchart of FIG. 32.

If the playback control processing is performed by being controlled by the CPU 331 when, for example, the editing control apparatus 324 is turned on. When the playback control processing starts S200, first at step S201, the input acceptance processing unit 352 starts accepting user inputs, and the processing goes to step S202. At step S202, the control unit 351 controls the input acceptance processing unit 352 to determine whether the input acceptance processing unit 352 has accepted specification of a clip to be played back. If the control unit 351 determines that the input acceptance processing unit 352 has accepted specification of a clip, the control unit 351 controls the command processing unit 356 to request non-real-time metadata of the specified clip from the disk recording/playback apparatus 323. Based on the request, the disk recording/playback apparatus 323 reads the specified non-real-time metadata from the disk 31 mounted on the drive 323A and supplies it to the editing control apparatus 324 through the network 322. Upon acquiring the non-real-time metadata, the communication unit 344 in the editing control apparatus 324 supplies it to the information acquisition unit 353 in the playback control unit 334 through the bus 336. At step S203, the information acquisition unit 353 acquires the supplied non-real-time metadata (the non-real-time metadata of the specified clip) and, controlled by the control unit 351, supplies it to the holding unit 354. The holding unit 354 holds the supplied non-real-time metadata in the storage area.

After the holding unit 354 holds the non-real-time metadata, the processing goes to step S204. At step S202, if the control unit 351 determines that the input acceptance processing unit 352 has not accepted specification of a clip, the control unit 351 omits step S203 and advances the processing to step S204.

At step S204, the control unit 351 controls the input acceptance processing unit 352 to determine whether the input acceptance processing unit 352 has accepted a playback control instruction. If the control unit 351 determines that the input acceptance processing unit 352 has accepted a playback control instruction (e.g., normal playback, fast-forward playback, fast-rewind playback, pause, stop, or the like), the control unit 351 advances the processing to step S205, where the control unit 351 creates command information for controlling the playback of the specified clip based on the playback control instruction and supplies it through the command processing unit 356 to the disk recording/playback apparatus 323 to control the playback.

After the completion of step S205, the control unit 351 advances the processing to step S206. At step S204, if the control unit 351 determines that the input acceptance processing unit 352 has not accepted a playback control instruction, the control unit 351 omits step S205 and advances the processing to step S206.

At step S206, the control unit 351 controls the input acceptance processing unit 352 to determine whether the input acceptance processing unit 352 has accepted a display frame specification input performed by the user using LTC. If the control unit 351 determines that the input acceptance processing unit 352 has accepted a display frame specification input, the control unit 351 advances the processing to step S207, where the control unit 351 performs cue-up control processing described later in which the control unit 351 controls the cue-up processing unit 355 so that the cue-up processing unit 355 identifies the frame number of a frame to be displayed, based on the specified LTC. The cue-up processing unit 355 refers to the LTC change point table 361 held in the holding unit 354, identifies the frame number of a frame to be displayed based on the specified LTC, and supplies this information to the control unit 351. The control unit 351 creates command information for displaying the frame corresponding to the frame number and supplies the command information through the command processing unit 356 to the disk recording/playback apparatus 323 which displays the image of the specified frame onto the monitor 323B.

After the completion of step S207, the control unit 351 advances the processing to step S208. At step S206, if the control unit 351 determines that the input acceptance processing unit 352 has not accepted a display frame specification input, the control unit 351 omits step S207 and advances the processing to step S208.

At step S208, the control unit 351 determines whether to end the playback control processing. If the control unit 351 determines not to end the playback control processing, the control unit 351 returns the processing to step S202 to repeat the steps thereafter.

At step S208, if the control unit 351 determines to end the playback control processing, the control unit 351 performs end processing at step S209 and ends S210 the playback control processing.

By performing the playback control as described, the playback control unit 334 enables the user to more easily perform the playback control processing.

Next, a description will be made of cue-up control processing for controlling cue-up processing in which the user specifies a frame to be displayed using LTC, with reference to the flowcharts of FIGS. 33 to 35. Further, a description will be made with reference to FIGS. 36 to 40 as necessary. This processing corresponds to step S207.

Figure 33:
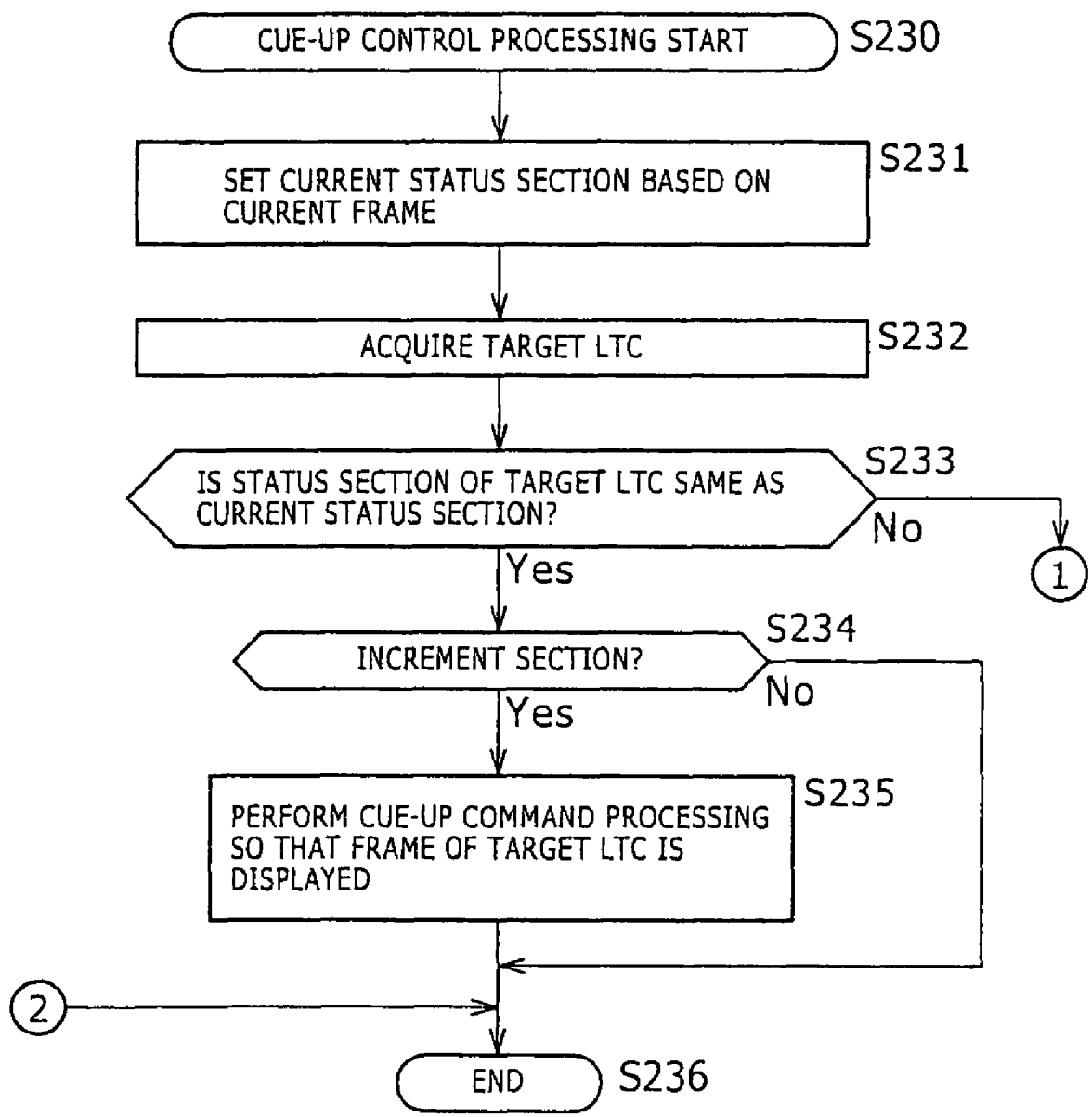
FIG. 33 is a flowchart of assistance in explaining cue-up control processing.

When the cue-up control processing starts S230, at step S231 in FIG. 33, the cue-up processing unit 355, controlled by the control unit 351, refers to the LTC change point table 361 held in the holding unit 354 and sets the current status section based on the currently displayed frame. That is, the cue-up processing unit 355 finds which status section the FTC (or LTC) (supplied from the control unit 351) of a frame that is currently displayed on the disk recording/playback apparatus 323 is positioned at in the LTC change point table 361, and sets the current status section to the status section of the position.

After the cue-up processing unit 355 sets the current status section, the processing goes to step S232, where the cue-up processing unit 355 acquires from the control unit 351, the LTC of a frame to be cued up, that is, a target LTC and advances the processing to step S233. At step S233, the cue-up processing unit 355 refers to the LTC change point table 361 and determines, based on the target LTC acquired at step S232, whether the status section of the target LTC is the same as the current status section. If the cue-up processing unit 355 determines that the status section of the target LTC is the same as the current status section, the cue-up processing unit 355 advances the processing to step S234.

At step S234, the cue-up processing unit 355 determines based, on the LTC change point table 361, whether the status section of the target LTC (i.e., the current status section) is an increment section. If the cue-up processing unit 355 determines that the status section of the target LTC is an increment section, the cue-up processing unit 355 advances the processing to step S235.

At step S235, the cue-up processing unit 355 performs cue-up command processing so that the disk recording/playback apparatus 323 displays the frame of the target LTC. Specifically, the cue-up processing unit 355 supplies cue-up command information through the control unit 351 and the command processing unit 356 to the disk recording/playback apparatus 323 which displays the frame of the target LTC. That is, if both the current status section and the status section of the target LTC are the same increment section, the cue-up processing unit 355 calculates the FTC of the frame corresponding to the target LTC based on the LTC change point table 361 and supplies the FTC to the control unit 351. The control unit 351 creates cue-up command information using the FTC of the frame to be cued up and supplies it to the command processing unit 356. The command processing unit 356 supplies the acquired cue-up command information through the communication unit 344 to the disk recording/playback apparatus 323 which displays the frame to be cued up that is specified by the FTC.

Figure 36:
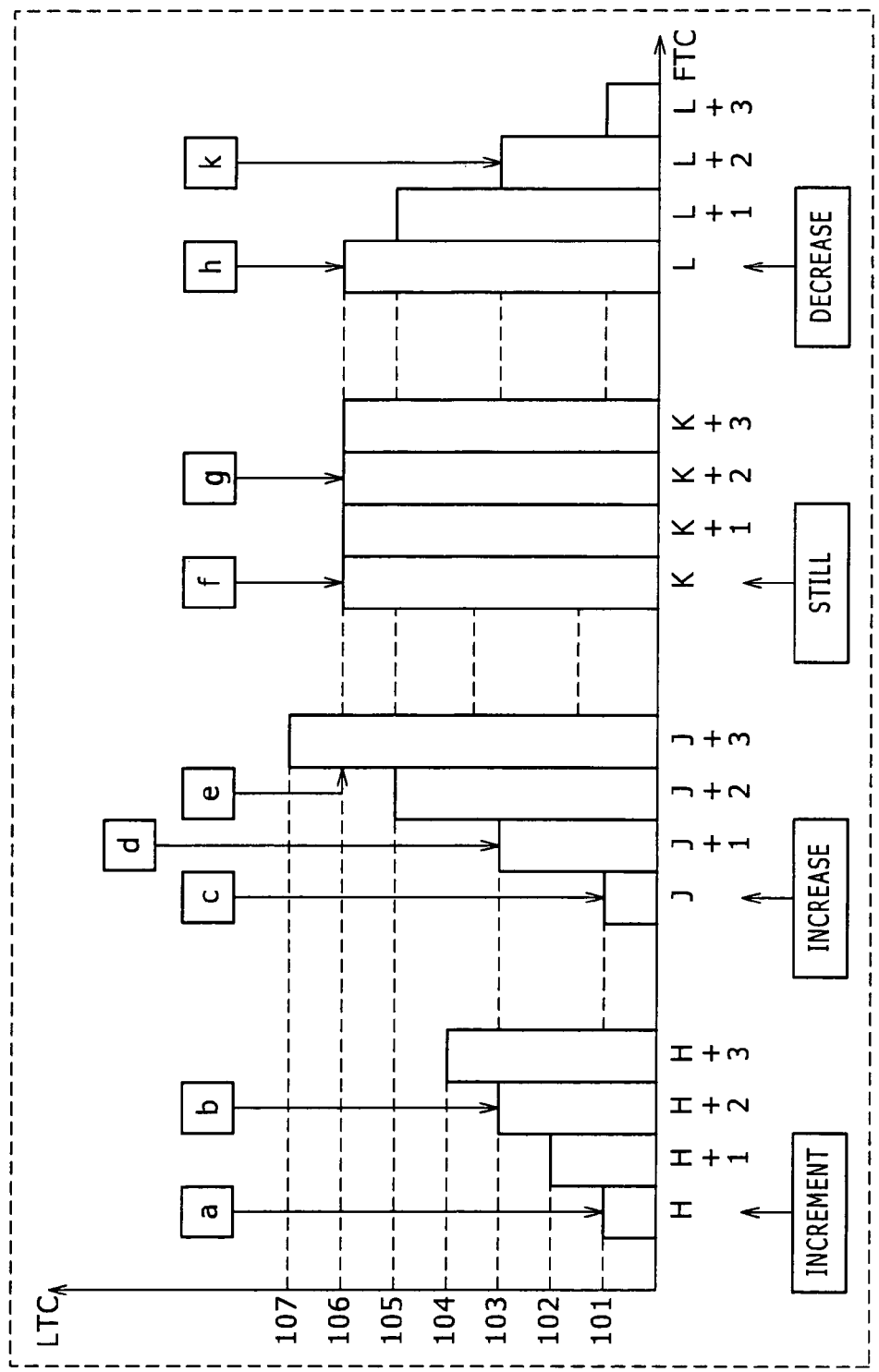
FIG. 36 is a diagram of assistance in explaining an example of a state of cue-up processing.

FIG. 36 is a diagram showing an example of the relationship between LTC and FTC. The horizontal axis indicates FTC, and the vertical axis indicates LTC. Frame numbers "H" to "H+3" in frames correspond to LTC values "101" to "104", respectively; therefore, this status section is an increment section. For example, in the case of cueing up frame a of LTC "101" (frame of frame number "H") to frame b of LTC "103" (frame of frame number "H+2") in this increment section, the cue-up processing unit 355 executes step S235 and calculates the FTC of frame b, namely, frame number "H+2". Thereby, the frame image of frame b is displayed onto the monitor 323B.

After the completion of step S355, the cue-up processing unit 355 ends the cue-up control processing.

At step S234, if the cue-up processing unit 355 determines that the status section of the target LTC (i.e., the current status section) is not an increment section, the cue-up processing unit 355 ends the cue-up control processing not to cue up a frame since there is no guarantee that a frame corresponding to the target LTC exists.

In FIG. 36, frame numbers "J" to "J+3" in frames correspond to LTC values "101", "103", "105", and "107", respectively, which increase by twos. Therefore, this status section is an increase section. For example, in the case of cueing up frame c of LTC value "101" (frame of frame number "J") to frame d of LTC value "103" (frame of frame number "J+1") in this increase section, it is possible to cue up, since frame d (frame of frame number "J+1") exists in reality. However, for example, in the case where "106" is specified as an LTC value of a frame to be cued up, that is, in the case of being instructed to cue up frame c to frame e of LTC value "106", the cue-up processing unit 355 cannot cue up it since frame e does not exist in reality. Thus, in the case where a frame to be cued up exists in an increase section, there is a possibility that a load of processing increases since the cue-up processing unit 355 needs to directly check the existence of each frame. Therefore, in such a case, the cue-up processing unit 355 does not execute step S235 and ends the cue-up control processing.

Further, in FIG. 36, frame numbers "K" to "K+3" in frames correspond to the same LTC value "106", which does not change. Therefore, this status section is a still section. For example, in this still section, all frames have the same LTC value "106", and the LTC value does not change in, for example, frame f (frame of frame number "K") and frame g (frame of frame number "K+2"); therefore, it is not possible to identify these frames by LTC. Thus, in the case where a frame to be cued up exist in a still section, it is unknown which frame has been specified. Therefore, in such a case, the cue-up processing unit 355 does not execute step S235 and ends the cue-up control processing S236.

Furthermore, in FIG. 36, frame numbers "L" to "L+3" in frames correspond to LTC values "106", "105", "103", and "101", respectively, which decrease by 1 or more. Therefore, this status section is a decrease section. For example, in the case of performing cue-up processing in this decrease section, there is a possibility that a load of processing increases since the cue-up processing unit 355 needs to directly check the existence of each frame, in the same way as in the increase section. Therefore, in such a case, the cue-up processing unit 355 does not execute step S235 and ends the cue-up control processing.

Thus, in the case of being instructed to cue up a frame in a status section other than an increment section, the cue-up processing unit 355 ends the cue-up control processing without cueing up a frame.

Figure 34:
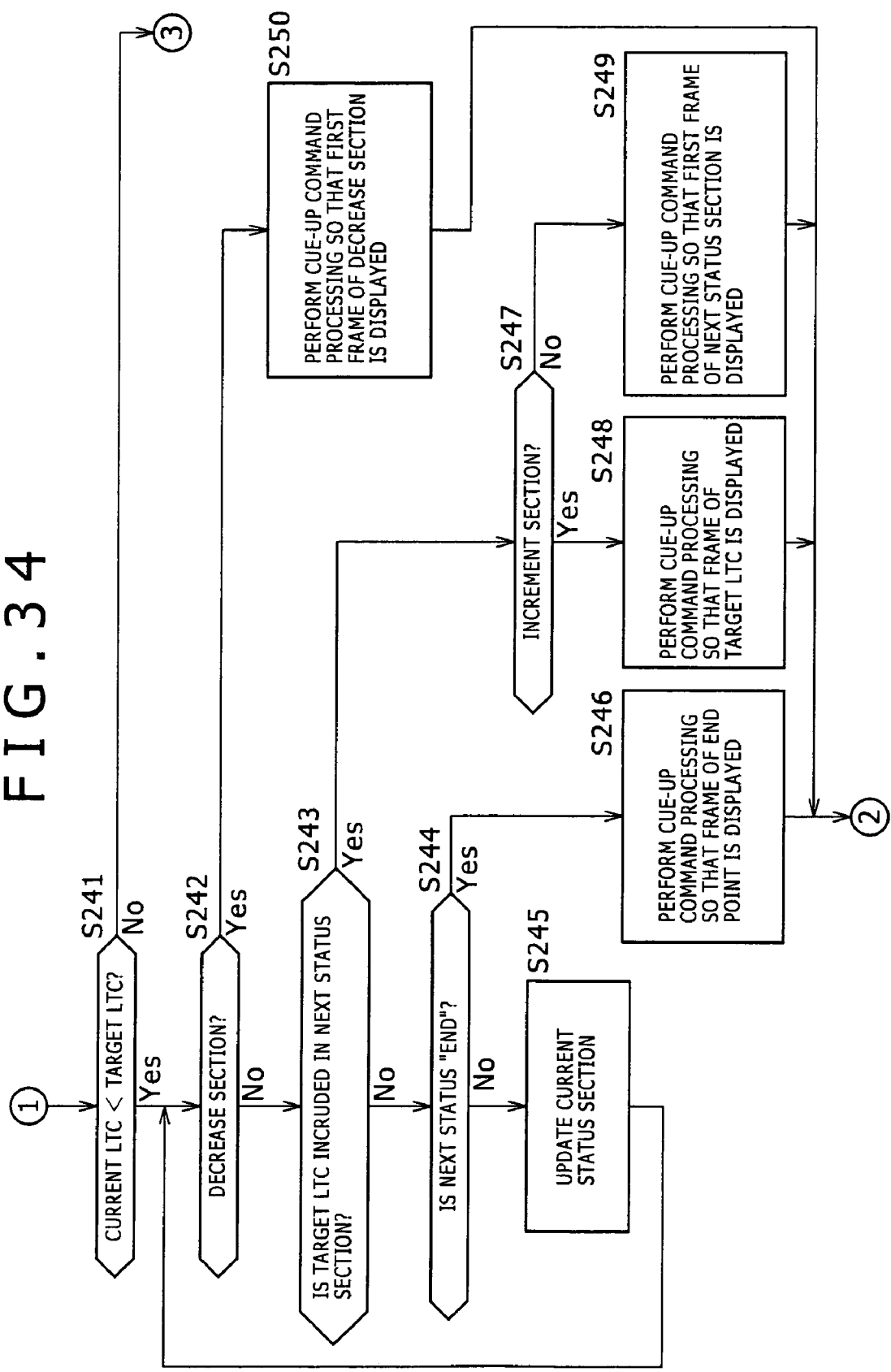
FIG. 34 is a flowchart of assistance in explaining cue-up control processing, subsequent to FIG. 33.

At step S233, if the cue-up processing unit 355 determines that the status section of the target LTC is not the same as the current status section, the cue-up processing unit 355 advances the processing to step S241 in FIG. 34. At step S241 in FIG. 34, the cue-up processing unit 355 determines whether the value of the target LTC is larger than the value of the LTC (the current LTC) of the currently displayed frame. If the cue-up processing unit 355 determines that the value of the target LTC is larger than the value of the current LTC, that is, if the cue-up processing unit 355 determines that the frame to be cued up is after the current frame in terms of time, the cue-up processing unit 355 advances the processing to step S242.

Basically, if the value of the target LTC is larger than the value of the current LTC, the cue-up processing unit 355 retrieves a frame to be cued up from frames after the current frame (frames having larger FTC). If the value of the target LTC is smaller than the value of the current LTC, the cue-up processing unit 355 retrieves a frame to be cued up from frames before the current frame (frames having smaller FTC).

At step S242, the cue-up processing unit 355 refers to the LTC change point table 361 and determines whether the status section subsequent to the current status section is a decrease section. If the cue-up processing unit 355 determines that the next status section is not a decrease section, the cue-up processing unit 355 advances the processing to step S243, where the cue-up processing unit 355 determines based on the LTC change point table 361 whether the frame of the target LTC is included in the status section subsequent to the current status section.

If the cue-up processing unit 355 determines that the frame of the target LTC is not included in the status section subsequent to the current status section, the cue-up processing unit 355 advances the processing to step S244, where the cue-up processing unit 355 determines, based on the LTC change point table 361, whether the next status (i.e., the status of the next change point in the LTC change point table) is "end". If the cue-up processing unit 355 determines that the next change point in the LTC change point table is not an end point, that is, the next status is not "end", the cue-up processing unit 355 advances the processing to step S245.

At step S245, the cue-up processing unit 355 updates the setting of the current status section to the next status section and returns the processing to step S242 to repeat the steps thereafter. That is, the cue-up processing unit 355 retrieves a frame to be cued up for each status section in the same direction as time travels in data.

At step S244, if the cue-up processing unit 355 determines that the next status is "end", the cue-up processing unit 355 advances the processing to step S246, where the cue-up processing unit 355 performs the cue-up command processing so that the disk recording/playback apparatus 323 displays a frame that is registered in the LTC change point table 361 as an end point. That is, the cue-up processing unit 355 supplies the FTC of the endpoint frame to be cued up to the control unit 351. The control unit 351 creates cue-up command information using the FTC of the frame to be cued up and supplies it to the command processing unit 356. The command processing unit 356 supplies the acquired cue-up command information through the communication unit 344 to the disk recording/playback apparatus 323 which displays the frame to be cued up that is specified by the FTC.

Figure 37:
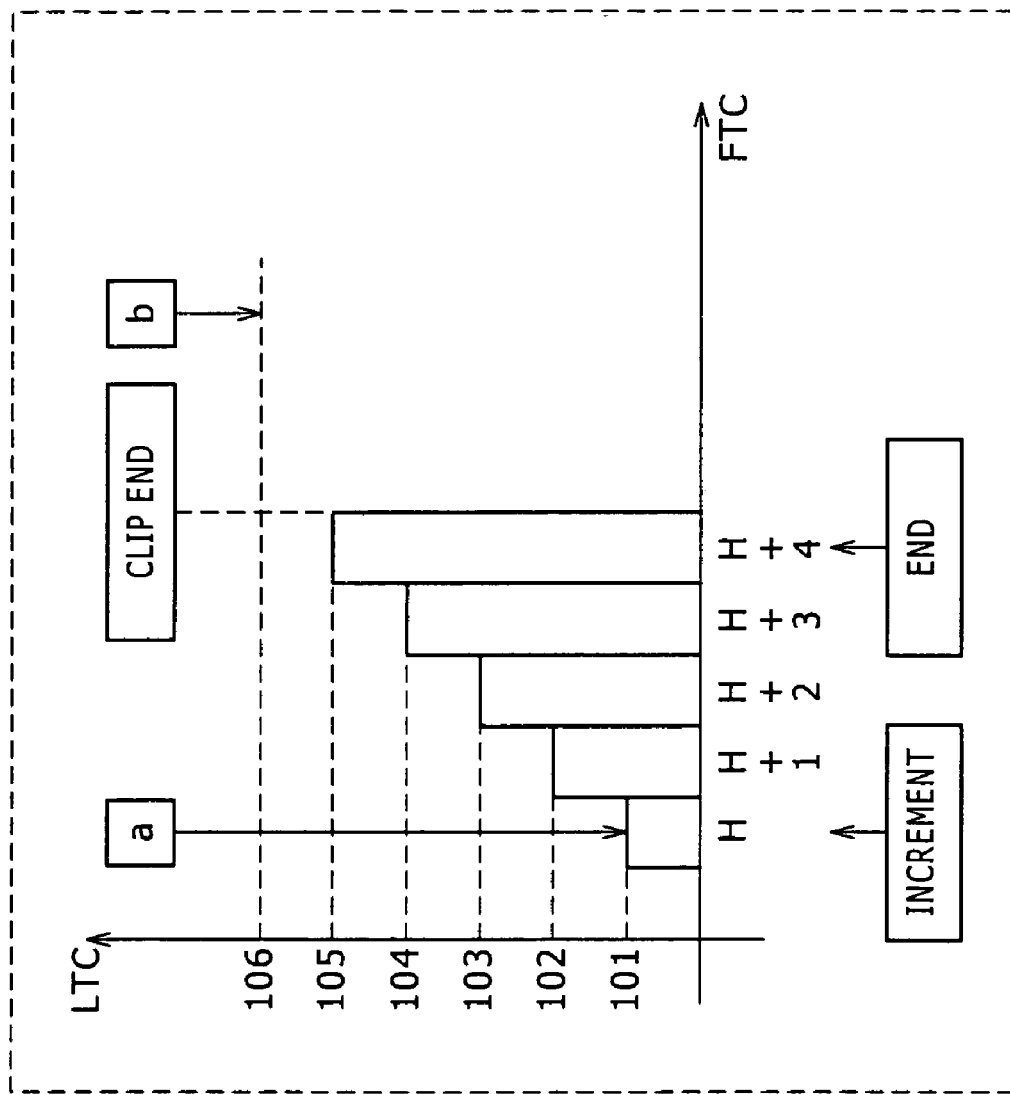
FIG. 37 is a diagram of assistance in explaining another example of a state of cue-up processing.

FIG. 37 is a diagram showing an example of the relationship between LTC and FTC. The horizontal axis indicates FTC, and the vertical axis indicates LTC. Frame numbers "H" to "H+4" in frames correspond to LTC values "101" to "105", respectively; therefore, this status section is an increment section. Further, this clip ends at the frame having frame number "H+4", and the frame having frame number "H+4" is an end point. For example, in the case of being instructed to cue up frame a of LTC "102" (frame of frame number "H+1") to frame b of LTC "106", frame b is a frame after the end of the clip, judged from the LTC; therefore, frame b does not exist in reality. In practice, there is a possibility of existence before frame a. However, in order to check it, the cue-up processing unit 355 needs to directly check for each frame, thereby causing a possibility that a load of processing increases. Therefore, the cue-up processing unit 355 executes step S246 and calculates the FTC of the end point frame, namely, frame number "H+4". Thereby, the frame image of frame number "H+4" is displayed onto the monitor 323B.

After the completion of step S246, the cue-up processing unit 355 ends the cue-up control processing.

At step S243, if the cue-up processing unit 355 determines that the frame of the target LTC is included in the next status section, the cue-up processing unit 355 advances the processing to step S247, where the cue-up processing unit 355 determines whether the next status section is an increment section. If the cue-up processing unit 355 determines that the next status section is an increment section, the cue-up processing unit 355 advances the processing to step S248, where the cue-up processing unit 355 performs the cue-up command processing so that the disk recording/playback apparatus 323 displays the frame of the target LTC. That is, if the next status section is an increment section, in the status section, the cue-up processing unit 355 calculates the FTC of the frame corresponding to the target LTC based on the LTC change point table 361 and supplies the FTC of the frame to be cued up to the control unit 351. The control unit 351 creates cue-up command information using the FTC of the frame to be cued up and supplies it to the command processing unit 356. The command processing unit 356 supplies the acquired cue-up command information through the communication unit 344 to the disk recording/playback apparatus 323 which displays the frame to be cued up that is specified by the FTC.

Figure 38:
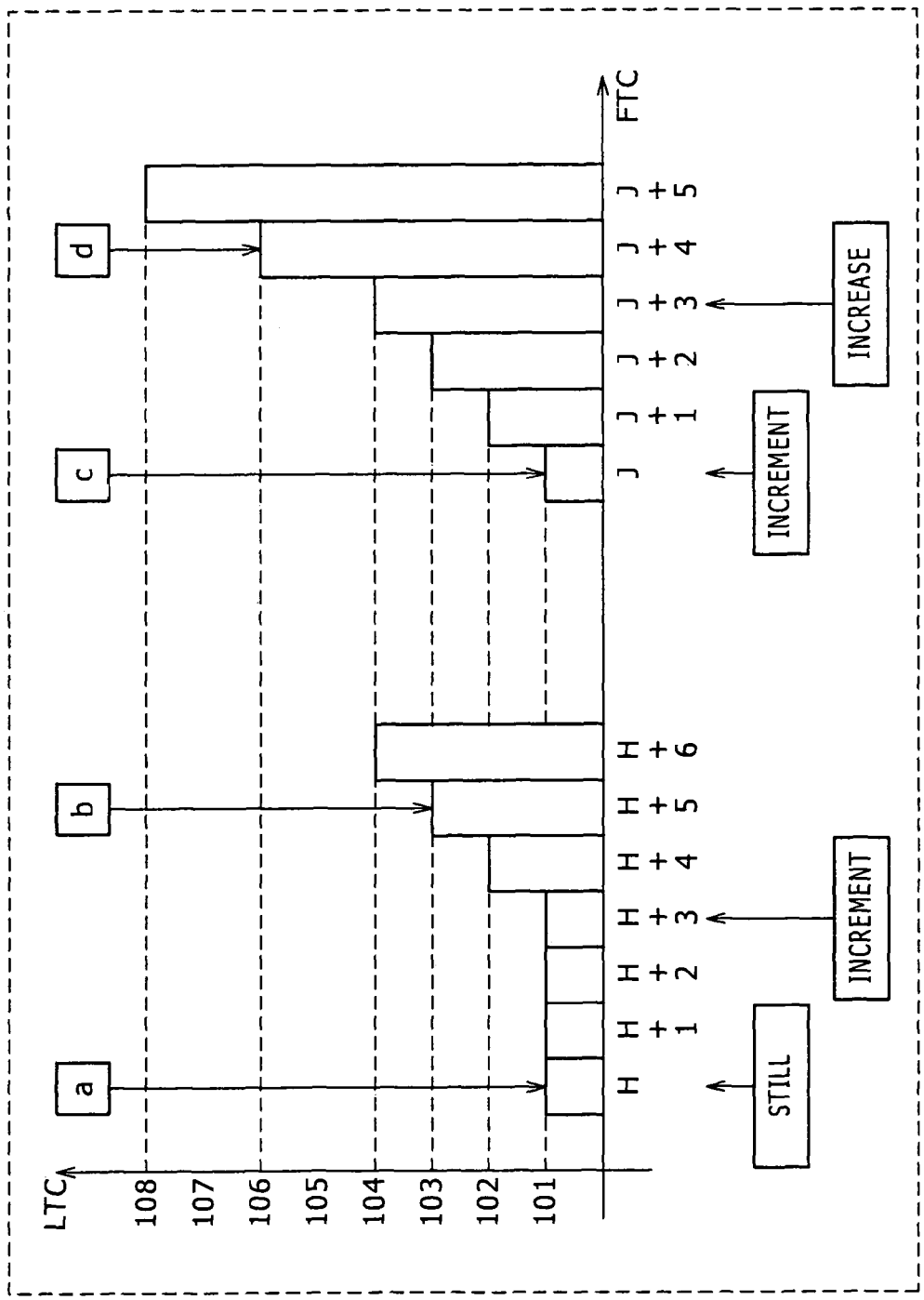
FIG. 38 is a diagram of assistance in explaining another example of a state of cue-up processing.

FIG. 38 is a diagram showing an example of the relationship between LTC and FTC. The horizontal axis indicates FTC, and the vertical axis indicates LTC. Frame numbers "H" to "H+3" in frames correspond to the same LTC value "101"; therefore, this status section is a still section. Further, frame numbers "H+3" to "H+6" in frames correspond to LTC values "101" to "104" respectively; therefore, this status section is an increment section. For example, in the case of being instructed to cue up frame a (frame of frame number "H") in this still section to frame b of LTC "103" (frame of frame number "H+5"), the cue-up processing unit 355 retrieves frame b for each status section, thereby making it possible to calculate the FTC. Therefore, the cue-up processing unit 355 executes step S248 and calculates the FTC of frame b, namely, frame number "H+5". Thereby, the frame image of frame b is displayed onto the monitor 323B.

After the completion of step S248, the cue-up processing unit 355 ends the cue-up control processing.

At step S247, if the cue-up processing unit 355 determines that the status section subsequent to the current status section is not an increment section, the cue-up processing unit 355 advances the processing to step S249 since there is no guarantee that a frame corresponding to the target LTC exists. At step S249, the cue-up processing unit 355 performs the cue-up command processing so that the disk recording/playback apparatus 323 displays the first frame of the next status section in which the frame of the target LTC exists. That is, if the status section of the target LTC is an increase section, a still section or the like that exists after the current status section, the cue-up processing unit 355 calculates the FTC of the first frame of the status section based on the LTC change point table 361 and supplies the FTC of the frame to be cued up to the control unit 351. The control unit 351 creates cue-up command information using the FTC of the frame to be cued up and supplies it to the command processing unit 356. The command processing unit 356 supplies the acquired cue-up command information through the communication unit 344 to the disk recording/playback apparatus 323, which displays the frame to be cued up that is specified by the FTC.

In FIG. 38, frame numbers "J" to "J+3" in frames correspond to LTC values "101" to "104", respectively; therefore, this status section is an increment section. Further, frame numbers "J+3" to "J+5" in frames correspond to LTC values "104", "106", and "108", respectively, which increase by twos. Therefore, this status section is an increase section. For example, in the case of being instructed to cue up frame c (frame of frame number "J") in this increment section to frame d of LTC "106" (frame of frame number "J+4"), the cue-up processing unit 355 cannot check the existence of frame d as described above since frame d exists in the increase section. Therefore, in such a case, the cue-up processing unit 355 executes step S249 and performs control to cue up the first frame (frame of frame number "J+3") of the status section in which frame d exists.

After the completion of step S249, the cue-up processing unit 355 ends the cue-up control processing.

At step S242, if the cue-up processing unit 355 determines that the status section subsequent to the current status section is a decrease section, the cue-up processing unit 355 advances the processing to step S250, where the cue-up processing unit 355 performs the cue-up command processing so that the disk recording/playback apparatus 323 displays the first frame of the decrease section in which the frame of the target LTC exists. That is, if the status section of the target LTC is a decrease section or the like that exists after the current status section, the cue-up processing unit 355 calculates the FTC of the first frame of the decrease section based on the LTC change point table 361 and supplies the FTC of the frame to be cued up to the control unit 351. The control unit 351 creates cue-up command information using the FTC of the frame to be cued up and supplies it to the command processing unit 356. The command processing unit 356 supplies the acquired cue-up command information through the communication unit 344 to the disk recording/playback apparatus 323 which displays the frame to be cued up that is specified by the FTC.

Figure 39:
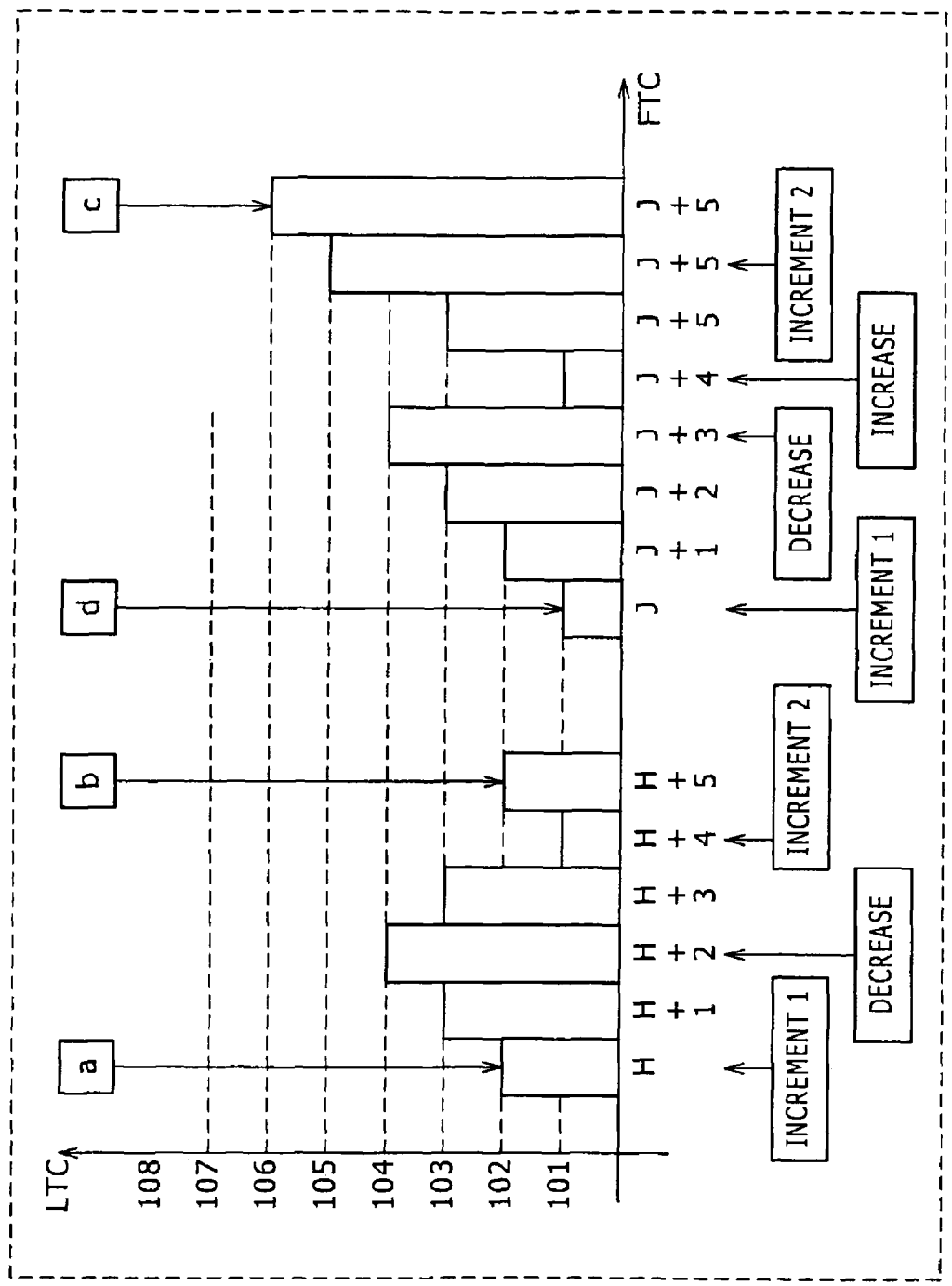
FIG. 39 is a diagram of assistance in explaining another example of a state of cue-up processing.

FIG. 39 is a diagram showing an example of the relationship between LTC and FTC. The horizontal axis indicates FTC, and the vertical axis indicates LTC. Frame numbers "H" to "H+2" in frames correspond to LTC values "102" to "104", respectively; therefore, this status section is an increment section (increment 1). Further, frame numbers "H+2" to "H+4" in frames correspond to LTC values "104", "103", and "101", respectively; therefore, this status section is a decrease section. Furthermore, frame numbers "H+4" and "H+5" in frames correspond to LTC values "101" and "102", respectively; therefore, this status section is an increment section (increment 2). For example, in the case of being instructed to cue up frame a of LTC "101" (frame of frame number "H") to frame b of LTC "102" (frame of frame number "H+5") the cue-up processing unit 355 retrieves frame b for each status section. However, in the case where a decrease section exists in the course of retrieval, it is unknown whether a frame of a specified LTC can be identified since there are cases where a plurality of frames having the same LTC exist, such as frame numbers "H" and "H+4". Therefore, in such a case, the cue-up processing unit 355 executes step S250 and performs control to cue up the first frame (frame of frame number "H+2") of the this decrease section.

After the completion of step S250, the cue-up processing unit 355 ends the cue-up control processing.

Figure 35:
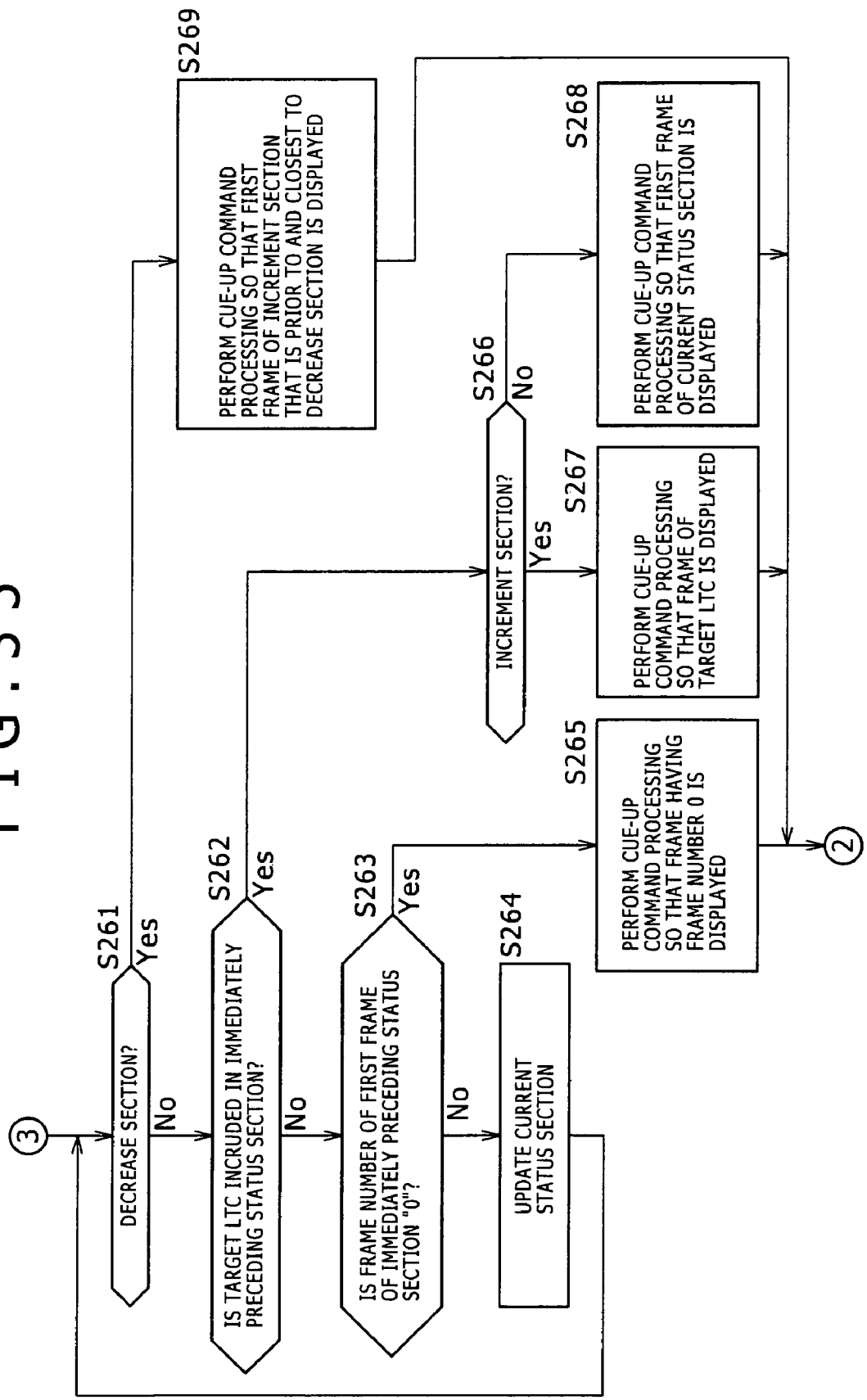
FIG. 35 is a flowchart of assistance in explaining cue-up control processing, subsequent to FIG. 34.

At step S241, if the cue-up processing unit 355 determines that the value of the target LTC is not larger than the value of the current LTC, that is, if the cue-up processing unit 355 determines that the frame to be cued up is before the current frame in terms of time, the cue-up processing unit 355 advances the processing to step S261 in FIG. 35.

At step S261 in FIG. 35, the cue-up processing unit 355 refers to the LTC change point table 361 and determines whether the status section just prior to the current status section is a decrease section. If the immediately preceding status section is not a decrease section, the cue-up processing unit 355 advances the processing to step S262, where the cue-up processing unit 355 determines based on the LTC change point table 361 whether the frame of the target LTC is included in the status section just prior to the current status section.

If the cue-up processing unit 355 determines that the frame of the target LTC is not included in the status section just prior to the current status section, the cue-up processing unit 355 advances the processing to step S263, where the cue-up processing unit 355 determines based on the LTC change point table 361 whether the frame number (FTC) of the first frame of the status section just prior to the current status section is "0". If the cue-up processing unit 355 determines that the frame number (FTC) of the first frame of the immediately preceding status section is not "0", the cue-up processing unit 355 advances the processing to step S264.

At step S264, the cue-up processing unit 355 updates the setting of the current status section to the immediately preceding status section and returns the processing to step S261 to repeat the steps thereafter. That is, the cue-up processing unit 355 retrieves a frame to be cued up for each status section in the direction opposite to the time traveling direction in data.

At step S263, if the cue-up processing unit 355 determines that the frame number (FTC) of the first frame of the immediately preceding status section is "0", the cue-up processing unit 355 advances the processing to step S265, the cue-up processing unit 355 performs the cue-up command processing so that the disk recording/playback apparatus 323 displays the frame having frame number "0". That is, the cue-up processing unit 355 supplies the FTC (i.e., "0") of the first frame of the clip to be cued up to the control unit 351. The control unit 351 creates cue-up command information using the FTC of the frame to be cued up and supplies it to the command processing unit 356. The command processing unit 356 supplies the acquired cue-up command information through the communication unit 344 to the disk recording/playback apparatus 323 which displays the frame to be cued up that is specified by the FTC.

Figure 40:
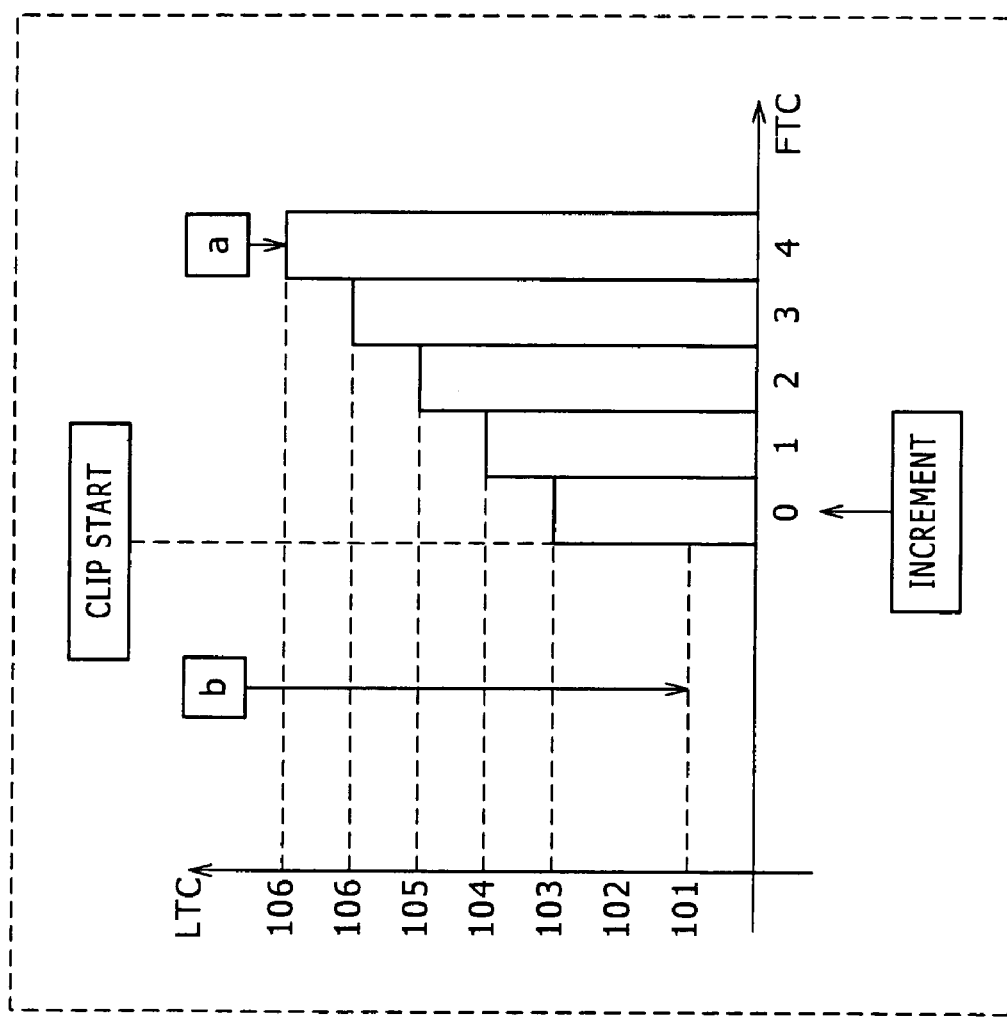
FIG. 40 is a diagram of assistance in explaining another example of a state of cue-up processing.

FIG. 40 is a diagram showing an example of the relationship between LTC and FTC. The horizontal axis indicates FTC, and the vertical axis indicates LTC. Frame numbers "0" to "4" in frames correspond to LTC values "103" to "107", respectively; therefore, this status section is an increment section. Further, this clip starts at the frame having frame number "0". For example, in the case of being instructed to cue up frame a of LTC "107" (frame of frame number "H+4") to frame b of LTC "101", frame b is a frame before the start of the clip, judged from the LTC; therefore, frame b does not exist in reality. In practice, there is a possibility of existence after frame a. However, in order to check it, the cue-up processing unit 355 needs to directly check for each frame, thereby causing a possibility that a load of processing increases. Therefore, the cue-up processing unit 355 executes step S265 and calculates the FTC of the first frame of the clip, namely, frame number "0". Thereby, the frame image of frame number "0" is displayed onto the monitor 323B.

After the completion of step S265, the cue-up processing unit 355 ends the cue-up control processing.

At step S262, if the cue-up processing unit 355 determines that the frame of the target LTC is included in the status section just prior to the current status section, the cue-up processing unit 355 advances the processing to step S266, where the cue-up processing unit 355 determines whether the immediately preceding status section is an increment section. If the cue-up processing unit 355 determines that the immediately preceding status section is an increment section, the cue-up processing unit 355 advances the processing to step S267, where the cue-up processing unit 355 performs the cue-up command processing so that the disk recording/playback apparatus 323 displays the frame of the target LTC. That is, if the immediately preceding status section is an increment section, in the status section, the cue-up processing unit 355 calculates the FTC of the frame corresponding to the target LTC based on the LTC change point table 361 and supplies the FTC of the frame to be cued up to the control unit 351. The control unit 351 creates cue-up command information using the FTC of the frame to be cued up and supplies it to the command processing unit 356. The command processing unit 356 supplies the acquired cue-up command information through the communication unit 344 to the disk recording/playback apparatus 323 which displays the frame to be cued up that is specified by the FTC.

For example, in FIG. 38, in the case of being instructed to cue up frame d of LTC "106" (frame of frame number "J+4") to frame c of LTC "101" (frame of frame number "J"), the cue-up processing unit 355 retrieves frame b for each status section, thereby making it possible to calculate the FTC. Therefore, the cue-up processing unit 355 executes step S267 and calculates the FTC of frame c, namely, frame number "J". Thereby, the frame image of frame c is displayed onto the monitor 323B.

After the completion of step S267, the cue-up processing unit 355 ends the cue-up control processing.

At step S266, if the cue-up processing unit 355 determines that the status section just prior to the current status section is not an increment section, the cue-up processing unit 355 advances the processing to step S268 since there is no guarantee that a frame corresponding to the target LTC exists. At step S268, the cue-up processing unit 355 performs the cue-up command processing so that the disk recording/playback apparatus 323 displays the first frame of the current status section. That is, if the status section of the target LTC is an increase section, a still section or the like that exists before the current status section, the cue-up processing unit 355 calculates the FTC of the first frame of the status section subsequent to the status section of the target LTC based on the LTC change point table 361 and supplies the FTC of the frame to be cued up to the control unit 351. The control unit 351 creates cue-up command information using the FTC of the frame to be cued up and supplies it to the command processing unit 356. The command processing unit 356 supplies the acquired cue-up command information through the communication unit 344 to the disk recording/playback apparatus 323 which displays the frame to be cued up that is specified by the FTC.

For example, in FIG. 38, in the case of being instructed to cue up frame b of LTC "103" (frame of frame number "H+5") to frame a of LTC "101" (frame of frame number "H"), the cue-up processing unit 355 cannot identify the FTC of frame a as described above since frame a exists in a still section. Therefore, in such a case, the cue-up processing unit 355 executes step S268 and performs control to cue up the first frame (frame of frame number "H+3") of the current status section.

After the completion of step S268, the cue-up processing unit 355 ends the cue-up control processing.

At step S261, if the immediately preceding status section is a decrease section, the cue-up processing unit 355 advances the processing to step S269, where the cue-up processing unit 355 performs the cue-up command processing so that the disk recording/playback apparatus 323 displays the first frame of the increment section that is in the cue-up direction prior to and the closest to the decrease section in which the frame of the target LTC exists. That is, if the status section of the target LTC is a decrease section or the like that exists before the current status section, the cue-up processing unit 355 calculates the FTC of the first frame of the increment section that is before the decrease section in the cue-up direction and the closest to the decrease section based on the LTC change point table 361 and supplies the FTC of the frame to be cued up to the control unit 351. The control unit 351 creates cue-up command information using the FTC of the frame to be cued up and supplies it to the command processing unit 356. The command processing unit 356 supplies the acquired cue-up command information through the communication unit 344 to the disk recording/playback apparatus 323 which displays the frame to be cued up that is specified by the FTC.

In FIG. 39, frame numbers "J" to "J+3" in frames correspond to LTC values "101" to "104", respectively; therefore, this status section is an increment section (increment 1). Further, frame numbers "J+3" and "J+4" in frames correspond to LTC values "104" and "101", respectively; therefore, this status section is a decrease section. Furthermore, frame numbers "J+4" to "J+6" in frames correspond to LTC values "101", "103", and "105", respectively; therefore, this status section is an increase section. Furthermore, frame numbers "J+6" and "J+7" in frames correspond to LTC values "105" and "106", respectively; therefore, this status section is an increment section (increment 2). For example, in the case of being instructed to cue up frame c of LTC "104" (frame of frame number "J+7") to frame d of LTC "101" (frame of frame number "J"), the cue-up processing unit 355 retrieves frame d for each status section. However, in the case where a decrease section exists in the course of retrieval, it is unknown whether a frame of a specified LTC can be identified since there are cases where a plurality of frames having the same LTC exist, such as frame numbers "J" and "J+4". Therefore, in such a case, the cue-up processing unit 355 executes step S269 and performs control to cue up the first frame (frame of frame number "J+6") of the increment section (increment 2) that is prior to and the closest to this decrease section.

After the completion of step S269, the cue-up processing unit 355 ends the cue-up control processing.

The cue-up processing unit 355 performs the cue-up control processing by referring to the LTC change point table 361, as described above. Thus, by specifying the LTC of a frame to be cued up, the user can easily display the specified frame or a frame close to the specified frame. In this manner, the editing system 310 in FIG. 28 enables the user to more easily perform the playback control processing.

As described above, in the case where the frame of a target LTC exists in a section other than an increment section, the cue-up processing unit 355 does not cue up the frame. However, the editing control apparatus 324 may perform more advanced retrieval using real-time metadata LTC to identify a specified frame as long as the editing control apparatus 324 has enough capability.

The LTC values and FTC values used in the above description are one example, and LTC values and FTC values are not limited to the above example. Further, the order in which status sections are arranged in the above description may be any other order. Furthermore, status types are not limited to the foregoing, and any status type and any number of status types can be used. As described above, there are cases where a frame to be actually cued up differs from a specified frame to be cued up depending on the status of the specified frame. However, a frame to be actually cued up may be a frame other than the foregoing.

The above description has been made on the case of performing the cue-up processing using an LTC change point table incorporating a change point where an increase/decrease pattern of LTC changes. However, a table used in the cue-up processing may be any other table besides an LTC change point table as long as LTC is associated with FTC.

The description has been made on the example of the editing system 310 composed of the two disk recording/playback apparatuses 321 and 323 and the editing control apparatus 324 which are interconnected through the network 322 in FIG. 28. However, the structure of the editing system may be varied. For example, the number of disk recording/playback apparatuses or editing control apparatuses may be one or more than one. Further, the disk recording/playback apparatus 321 or 323 may have two drives, and the playback and recording of a clip is performed between these drives. Furthermore, the editing system 310 may include another apparatus such as the camcorder 300. Moreover, the editing system 310 may be a playback control system composed of a disk recording/playback apparatus with a drive equipped with the optical disk 31 on which a clip edited beforehand is recorded and an editing control apparatus.

Further, the disk recording/playback apparatus 321 or 323 and the editing control apparatus 324 may be configured as one apparatus, and a part of the function of the apparatuses may further be configured as a separate device.

The present invention can also be applied to an information processing apparatus having a function other than the above-described functions. Therefore, the disk recording/playback apparatuses 30, 321 and 323, the camcorder 300, and the editing control apparatus 324 may have a function besides the above-described functions.

The above-described consecutive processing can be carried out not only by hardware but also by software as described above. In the case of using software to carry out the consecutive processing, a program forming the software is installed from a recording medium or the like onto a computer incorporated in special hardware, or, for example, a general-purpose personal computer that can execute various functions by installing various programs thereon.

For example, as shown in FIG. 29, the recording medium is not only formed by the removable medium 346 distributed to the user to provide the program separately from a computer, the removable medium 346 including a packaged medium such as a magnetic disk (including a flexible disk), an optical disk (including a CD-ROM (Compact Disc-Read Only Memory) and a DVD (Digital Versatile Disc)), a magneto-optical disk (including an MD(Mini-Disc) (registered trademark)), a semiconductor memory or the like which has the program recorded thereon, but also formed by the ROM 332, the hard disk including the storage unit 343, or the like which has the program stored thereon and is provided to the user in a state of being preincorporated in the computer.

It is to be noted that in the present specification, the steps describing the program recorded on the recording medium include not only processing carried out in time series in the described order but also processing carried out in parallel or individually and not necessarily in time series.

Further, in the present specification, a system refers to an apparatus as a whole formed by a plurality of apparatus.

FIG. 1A
LTC: LINEAR TIME CODE
VTR: VIDEO TAPE RECORDER
10: VIDEOTAPE
11: ESSENCE DATA RECORDING AREA
12-1: CLIP
12-2: CLIP
12-3: CLIP
13: ADDITIONAL-INFORMATION RECORDING AREA
14-1: VALUE OF THE FIRST LTC ASSOCIATED WITH 12-1
14-2: VALUE OF THE FIRST LTC ASSOCIATED WITH 12-2
14-3: VALUE OF THE FIRST LTC ASSOCIATED WITH 12-3

FIG. 1B
FTC: FILE TIME CODE
NLE: NON-LINEAR EDITING
20: HARD DISK (HDD)
21-1: FILE
21-2: FILE
0 1 2 3 4: FRAME NUMBERS

FIG. 2
30: DISK RECORDING/PLAYBACK APPARATUS (DISK DRIVE)
31: OPTICAL DISK
32: SPINDLE MOTOR
33: PICKUP UNIT
34: RF (RADIO FREQUENCY) AMPLIFIER
35: SERVO CONTROL UNIT
36: SIGNAL PROCESSING UNIT
37: MEMORY CONTROLLER
38: MEMORY
39: DATA CONVERSION UNIT
40: CONTROL UNIT
41: OPERATION UNIT
51: SIGNAL INPUT/OUTPUT DEVICE

FIG. 3
39: DATA CONVERSION UNIT
FROM SIGNAL INPUT/OUTPUT DEVICE 51
61: DEMULTIPLEXER
62: DATA AMOUNT DETECTION UNIT
63: VIDEO SIGNAL CONVERSION UNIT
64: AUDIO SIGNAL CONVERSION UNIT
65: LOW-RESOLUTION DATA GENERATION UNIT
66: REAL-TIME METADATA PROCESSING UNIT
67: NON-REAL-TIME METADATA PROCESSING UNIT
71: LTC DATA PROCESSING UNIT
72: LTC DATA PROCESSING UNIT
TO MEMORY CONTROLLER 37
FROM MEMORY CONTROLLER 37
81: VIDEO DATA CONVERSION UNIT
82: AUDIO DATA CONVERSION UNIT
83: LOW-RESOLUTION DATA PROCESSING UNIT
84: REAL-TIME METADATA PROCESSING UNIT

85: NON-REAL-TIME METADATA PROCESSING UNIT TO SIGNAL INPUT/OUTPUT DEVICE 51

FIG. 4
71: LTC DATA PROCESSING UNIT (INCORPORATED IN THE REAL-TIME METADATA PROCESSING UNIT)
Control Signal and Sync Signal
101: CONTROL UNIT
102: LTC GENERATION UNIT
103: INITIAL-VALUE SETTING UNIT
104: COUNTER
105: REAL-TIME CLOCK
LTC DATA FIG. 5
38: MEMORY
72: LTC DATA PROCESSING UNIT (INCORPORATED IN THE NON-REAL-TIME METADATA PROCESSING UNIT)
LTC DATA AND FTC DATA
111: ACQUISITION CONTROL UNIT
112: DETERMINATION PROCESSING UNIT
113: DATA MANAGEMENT UNIT
114: DATA HOLDING UNIT
115: SECTION SETTING MANAGEMENT UNIT
116: SECTION SETTING HOLDING UNIT
117: REGISTRATION PROCESSING UNIT
121: LTC DATA
122: FTC DATA
123: SECTION NAME
124: LTC CHANGE POINT TABLE FIG. 6
S0: RECORDING PROCESSING START
S1: SET AUDIO ANNUAL-RING SIZE Tsa, VIDEO ANNUAL-RING SIZE Tsv, LOW-RESOLUTION ANNUAL-RING SIZE Tsl, AND REAL-TIME META ANNUAL-RING SIZE Tsm
S2: START AUDIO SIGNAL CONVERSION PROCESSING, VIDEO SIGNAL CONVERSION PROCESSING, REAL-TIME METADATA PROCESSING, LOW-RESOLUTION DATA GENERATION PROCESSING, AND NON-REAL-TIME METADATA PROCESSING, AND ALSO START AUDIO DATA STORAGE PROCESSING, VIDEO DATA STORAGE PROCESSING, REAL-TIME METADATA STORAGE PROCESSING, LOW-RESOLUTION DATA STORAGE PROCESSING, AND NON-REAL-TIME METADATA STORAGE PROCESSING
S3: START AUDIO DATA RECORDING TASK
S4: START VIDEO DATA RECORDING TASK
S5: START LOW-RESOLUTION DATA RECORDING TASK
S6: START REAL-TIME METADATA RECORDING TASK
S7: RECORDING END INSTRUCTION SUPPLIED?
S8: ALL RECORDING TASKS ENDED?
S9: END AUDIO SIGNAL CONVERSION PROCESSING, VIDEO SIGNAL CONVERSION PROCESSING, REAL-TIME METADATA PROCESSING, AND LOW-RESOLUTION DATA GENERATION PROCESSING, AND ALSO END AUDIO DATA STORAGE PROCESSING, VIDEO DATA STORAGE PROCESSING, REAL-TIME METADATA STORAGE PROCESSING, AND LOW-RESOLUTION DATA STORAGE PROCESSING
S10: ALL RECORDING TASKS ENDED?
S11: READ NON-REAL-TIME METADATA STORED IN MEMORY, PERFORM PADDING SO THAT AMOUNT OF NON-REAL-TIME METADATA BECOMES INTEGRAL MULTIPLE OF AMOUNT OF DATA IN ONE SECTOR AND SUPPLY IT TO SIGNAL PROCESSING UNIT, AND THEREBY PERFORM RECORDING CONTROL SO THAT NON-REAL-TIME METADATA WHOSE AMOUNT IS INTEGRAL MULTIPLE OF DATA AMOUNT IN ONE SECTOR IS RECORDED IN CORRESPONDING NUMBER OF SECTORS
S12: END NON-REAL-TIME METADATA PROCESSING AND NON-REAL-TIME METADATA STORAGE PROCESSING
S13: RECORDING PROCESSING END FIG. 7
S30: AUDIO DATA RECORDING TASK START
S31: Na=1, VARIABLE Na IS INITIALIZED
S32: IS Tsa×Na≦Tsv×Nv, Tsa×Na≦Tsl×Nl, AND Tsa×Na≦Tsm×Nm?
S33: IS AUDIO DATA SUPPLIED?
S34: HAS AUDIO DATA OF AUDIO SIGNAL FOR Tsa×Na BEEN STORED IN MEMORY?
S35: READ AND EXTRACT AUDIO DATA WHOSE AMOUNT IS INTEGRAL MULTIPLE OF DATA AMOUNT IN ONE SECTOR, FROM AUDIO DATA STORED IN MEMORY
S36: SUPPLY AUDIO DATA TO SIGNAL PROCESSING UNIT, AND THEREBY PERFORM RECORDING CONTROL SO THAT AUDIO DATA WHOSE AMOUNT IS INTEGRAL MULTIPLE OF DATA AMOUNT IN ONE SECTOR IS RECORDED In Corresponding Number of Sectors
S37: Na=Na+1, Na IS INCREMENTED BY 1
S38: READ AUDIO DATA REMAINING IN MEMORY, PERFORM PADDING SO THAT AMOUNT OF AUDIO DATA BECOMES INTEGRAL MULTIPLE OF AMOUNT OF DATA IN ONE SECTOR AND SUPPLY IT TO SIGNAL PROCESSING UNIT, AND THEREBY PERFORM RECORDING CONTROL SO THAT AUDIO DATA WHOSE AMOUNT IS INTEGRAL MULTIPLE OF DATA AMOUNT IN ONE SECTOR IS RECORDED IN CORRESPONDING NUMBER OF SECTORS
S39: Na=∞, Na IS SET TO A VALUE CORRESPONDING TO INFINITY
S40: AUDIO DATA RECORDING TASK END FIG. 8
S50: VIDEO DATA RECORDING TASK START
S51: Nv=1, VARIABLE Nv IS INITIALIZED
S52: IS Tsv×Nv<Tsa×Na, Tsv×Nv≦Tsl×Nl, AND Tsv×Nv≦Tsm×Nm?
S53: IS VIDEO DATA SUPPLIED?
S54: HAS VIDEO DATA OF VIDEO SIGNAL FOR Tsv×Nv BEEN STORED IN MEMORY?
S55: READ AND EXTRACT VIDEO DATA WHOSE AMOUNT IS INTEGRAL MULTIPLE OF DATA AMOUNT IN ONE SECTOR, FROM VIDEO DATA STORED IN MEMORY
S56: SUPPLY VIDEO DATA TO SIGNAL PROCESSING UNIT, AND THEREBY PERFORM RECORDING CONTROL SO THAT VIDEO DATA WHOSE AMOUNT IS INTEGRAL MULTIPLE OF DATA AMOUNT IN ONE SECTOR IS RECORDED IN CORRESPONDING NUMBER OF SECTORS
S57: Nv=Nv+1, Nv IS INCREMENTED BY 1
S58: READ VIDEO DATA REMAINING IN MEMORY, PERFORM PADDING SO THAT AMOUNT OF VIDEO DATA BECOMES INTEGRAL MULTIPLE OF DATA AMOUNT IN ONE SECTOR AND SUPPLY IT TO SIGNAL PROCESSING UNIT, AND THEREBY PERFORM RECORDING CONTROL SO THAT VIDEO DATA WHOSE AMOUNT IS INTEGRAL MULTIPLE OF DATA AMOUNT IN ONE SECTOR IS RECORDED IN CORRESPONDING NUMBER OF SECTORS S59: $Nv=\infty$, Nv IS SET TO A VALUE CORRESPONDING TO INFINITY

S60: VIDEO DATA RECORDING TASK END

FIG. 9

S70: LOW-RESOLUTION DATA RECORDING TASK START

S71: Nl=1, VARIABLE Nl IS INITIALIZED

S72: IS Tsl×Nl<Tsa×Na, Tsl×Nl<Tsv×Nv, AND Tsl×Nl≦Tsm×Nm?

S73: IS LOW-RESOLUTION DATA SUPPLIED?

S74: HAS LOW-RESOLUTION DATA FOR PLAYBACK TIME PERIOD Tsl×Nl BEEN STORED IN MEMORY?

S75: READ AND EXTRACT LOW-RESOLUTION DATA WHOSE AMOUNT IS INTEGRAL MULTIPLE OF DATA AMOUNT IN ONE SECTOR, FROM LOW-RESOLUTION DATA STORED IN MEMORY

S76: SUPPLY LOW-RESOLUTION DATA TO SIGNAL PROCESSING UNIT, AND THEREBY PERFORM RECORDING CONTROL SO THAT LOW-RESOLUTION DATA WHOSE AMOUNT IS INTEGRAL MULTIPLE OF DATA AMOUNT IN ONE SECTOR IS RECORDED IN CORRESPONDING NUMBER OF SECTORS

S77: Nl=Nl+1, Nl IS INCREMENTED BY 1S78: READ LOW-RESOLUTION DATA REMAINING IN MEMORY, PERFORM PADDING SO THAT AMOUNT OF LOW-RESOLUTION DATA BECOMES INTEGRAL MULTIPLE OF DATA AMOUNT IN ONE SECTOR AND SUPPLY IT TO SIGNAL PROCESSING UNIT, AND THEREBY PERFORM RECORDING CONTROL SO THAT LOW-RESOLUTION DATA WHOSE AMOUNT IS INTEGRAL MULTIPLE OF DATA AMOUNT IN ONE SECTOR IS RECORDED IN CORRESPONDING NUMBER OF SECTORS

S79: $Nl=\infty$, Nl IS SET TO A VALUE CORRESPONDING TO INFINITY

S80: LOW-RESOLUTION DATA RECORDING TASK END

FIG. 10

S90: REAL-TIME METADATA RECORDING TASK START

S91: Nm=1, VARIABLE Nm IS INITIALIZED

S92: IS Tsm×Nm<Tsa×Na, Tsm×Nm<Tsv×Nv, AND Tsm×Nm<Tsl×Nl?

S93: IS REAL-TIME METADATA SUPPLIED?

S94: HAS REAL-TIME METADATA FOR PLAYBACK TIME PERIOD Tsm×Nm BEEN STORED IN MEMORY?

S95: READ AND EXTRACT REAL-TIME METADATA WHOSE AMOUNT IS INTEGRAL MULTIPLE OF DATA AMOUNT IN ONE SECTOR, FROM REAL-TIME METADATA STORED IN MEMORY

S96: SUPPLY REAL-TIME METADATA TO SIGNAL PROCESSING UNIT, AND THEREBY PERFORM RECORDING CONTROL SO THAT REAL-TIME METADATA WHOSE AMOUNT IS INTEGRAL MULTIPLE OF DATA AMOUNT IN ONE SECTOR IS RECORDED IN CORRESPONDING NUMBER OF SECTORS

S97: Nm=Nm+1, Nm IS INCREMENTED BY 1S98: READ REAL-TIME METADATA REMAINING IN MEMORY, PERFORM PADDING SO THAT AMOUNT OF REAL-TIME METADATA BECOMES INTEGRAL MULTIPLE OF DATA AMOUNT IN ONE SECTOR AND SUPPLY IT TO SIGNAL PROCESSING UNIT, AND THEREBY PERFORM RECORDING CONTROL SO THAT REAL-TIME METADATA WHOSE AMOUNT IS INTEGRAL MULTIPLE OF DATA AMOUNT IN ONE SECTOR IS RECORDED IN CORRESPONDING NUMBER OF SECTORS

S99: $Nm=\infty$, Nm IS SET TO A VALUE CORRESPONDING TO INFINITY

S100: REAL-TIME METADATA RECORDING TASK END

FIG. 11

110: KLV (KEY LENGTH VALUE) DATA

131: KEY DATA

132: LENGTH DATA

133: VALUE DATA

FIG. 12

S110: LTC DATA GENERATION PROCESSING START

S111: INSTRUCTION TO START GENERATING LTC DATA ACQUIRED?

S112: GENERATE LTC USING REAL TIME?

S113: GENERATE LTC DATA IN ACCORDANCE WITH SYNC SIGNAL USING REAL-TIME CLOCK

S114: SUPPLY GENERATED LTC DATA TO MEMORY CONTROLLER

S115: INSTRUCTION TO END LTC DATA GENERATION ACQUIRED?

S116: SETTING OF INITIAL VALUE SPECIFIED?

S117: SET INITIAL VALUE TO SPECIFIED VALUE

S118: SET INITIAL VALUE TO "0"

S119: GENERATE LTC DATA IN ACCORDANCE WITH SYNC SIGNAL USING COUNTER

S120: SUPPLY GENERATED LTC DATA TO MEMORY CONTROLLER

S121: INSTRUCTION TO END LTC DATA GENERATION ACQUIRED?

S122: END

FIG. 13

S140: LTC CHANGE POINT TABLE CREATION PROCESSING START

S141: LTC DATA ACQUIRED?

S142: IS THERE LTC DATA STORED?

S143: HOLD ACQUIRED LTC DATA AND FTC DATA

S144: COMPARE ACQUIRED LTC DATA AND HELD LTC DATA

S145: REFER TO CURRENT SECTION SETTING

S146: CONSECUTIVE INCREMENT?

S147: INCREMENT SECTION?

S148: REGISTER HELD LTC DATA AND FTC DATA IN LTC CHANGE POINT TABLE AS INCREMENT POINT

S149: SET TO INCREMENT SECTION

S150: UPDATE HELD LTC DATA AND FTC DATA

FIG. 14

S161: INCREASE BY 2 OR MORE?

S162: INCREASE SECTION?

S163: REGISTER HELD LTC DATA AND FTC DATA IN LTC CHANGE POINT TABLE AS INCREASE POINT

S164: SET TO INCREASE SECTION

S165: NO CHANGE?

S166: STILL SECTION?

S167: REGISTER HELD LTC DATA AND FTC DATA IN LTC CHANGE POINT TABLE AS STILL POINT

S168: SET TO STILL SECTION

S169: DECREASE SECTION?

S170: REGISTER HELD LTC DATA AND FTC DATA IN LTC CHANGE POINT TABLE AS DECREASE POINT
S171: SET TO DECREASE SECTION

FIG. 15
S181: REGISTER HELD LTC DATA AND FTC DATA IN LTC CHANGE POINT TABLE AS END POINT
S182: IS IT POSSIBLE TO REGISTER TWO OR MORE ELEMENTS IN LTC TABLE?
S183: REGISTER ACQUIRED LTC DATA AND FTC DATA IN LTC CHANGE POINT TABLE AS OVER POINT
S184: PERFORM END PROCESSING
S185: END

FIG. 16A
INCREMENT

FIG. 16B
124: AN LTC CHANGE POINT TABLE
141: AN ELEMENT OF THE LTC CHANGE POINT TABLE 124

FIG. 17A
INCREASE

FIG. 17B
124: AN LTC CHANGE POINT TABLE
142: AN ELEMENT OF THE LTC CHANGE POINT TABLE 124 WHOSE FTC VALUE IS N

FIG. 18A
STILL

FIG. 18B
124: AN LTC CHANGE POINT TABLE
144: AN ELEMENT OF THE LTC CHANGE POINT TABLE 124 WHOSE FTC VALUE IS N

FIG. 19A
DECREASE

FIG. 19B
124: AN LTC CHANGE POINT TABLE
146: AN ELEMENT OF THE LTC CHANGE POINT TABLE 124 WHOSE FTC VALUE IS N

FIG. 20A
CLIP END

FIG. 20B
124: AN LTC CHANGE POINT TABLE
148: AN ELEMENT OF THE LTC CHANGE POINT TABLE 124 WHOSE FTC VALUE IS N
149: AN ELEMENT OF THE LTC CHANGE POINT TABLE 124 WHOSE FTC VALUE IS N+2

FIG. 21A
NO FREE SPACE IN MEMORY

FIG. 21B
124: AN LTC CHANGE POINT TABLE
150: AN ELEMENT OF THE LTC CHANGE POINT TABLE 124 WHOSE FTC VALUE IS N
151: AN ELEMENT OF THE LTC CHANGE POINT TABLE 124 WHOSE FTC VALUE IS N+2

FIG. 22
161: AUDIO ANNUAL-RING DATA
162: VIDEO ANNUAL-RING DATA
163: LOW-RESOLUTION ANNUAL-RING DATA
164: REAL-TIME META ANNUAL-RING DATA
165: NON-REAL-TIME METADATA

FIG. 23A
170: ANNUAL-RING DATA
171: AUDIO ANNUAL-RING DATA
172: VIDEO ANNUAL-RING DATA
173: LOW-RESOLUTION ANNUAL-RING DATA
174: REAL-TIME META ANNUAL-RING DATA
175: LTC DATA
181: NON-REAL-TIME METADATA
182: LTC CHANGE POINT TABLE

FIG. 23B
190-1: ANNUAL-RING DATA
191-1: AUDIO ANNUAL-RING DATA
192-1: VIDEO ANNUAL-RING DATA
193-1: LOW-RESOLUTION ANNUAL-RING DATA
194-1: REAL-TIME META ANNUAL-RING DATA
195-1: LTC DATA
190-2: ANNUAL-RING DATA
191-2: AUDIO ANNUAL-RING DATA
192-2: VIDEO ANNUAL-RING DATA
193-2: LOW-RESOLUTION ANNUAL-RING DATA
194-2: REAL-TIME META ANNUAL-RING DATA
195-2: LTC DATA
201-1: NON-REAL-TIME METADATA
201-2: NON-REAL-TIME METADATA
201-3: NON-REAL-TIME METADATA
202-1: LTC CHANGE POINT TABLE
202-2: LTC CHANGE POINT TABLE
202-3: LTC CHANGE POINT TABLE

FIG. 24
251: ROOT DIRECTORY (ROOT)
252: PROAV DIRECTORY
253: DISK METADATA FILE (DISCMETA.XML)
254: INDEX FILE (INDEX.XML)
255: INDEX FILE (INDEX.BUP)
256: DISC INFORMATION FILE (DISCINFO.XML)
257: DISK INFORMATION FILE (DISCINFO.BUP)
258: CLIP ROOT DIRECTORY (CLPR)
259: EDIT LIST ROOT DIRECTORY (EDTR)
261: CLIP DIRECTORY (C0001)
262: CLIP DIRECTORY (C0002)
263: CLIP DIRECTORY (C0003)
264: EDIT LIST DIRECTORY (E0001)
265: EDIT LIST DIRECTORY (E0002)
266: EDIT LIST DIRECTORY (E0003)
267: EDIT LIST DIRECTORY (E0004)
261: CLIP DIRECTORY (C0001)

FIG. 25
258: CLIP ROOT DIRECTORY (CLPR)
261: CLIP DIRECTORY (C0001)
271: CLIP INFORMATION FILE (C0001C01.SMI)
272: VIDEO DATA FILE (C0001V01.MXF)
273: AUDIO DATA FILE (C0001A01.MXF)
274: AUDIO DATA FILE (C0001A02.MXF)
275: AUDIO DATA FILE (C0001A03.MXF)
276: AUDIO DATA FILE (C0001A04.MXF)
277: AUDIO DATA FILE (C0001A05.MXF)
278: AUDIO DATA FILE (C0001A06.MXF)
279: AUDIO DATA FILE (C0001A07.MXF)
280: AUDIO DATA FILE (C0001A08.MXF)
281: LOW-RESOLUTION DATA FILE (C0001S01.MXF)
282: NON-REAL-TIME METADATA FILE (C0001M01.XML)
283: REAL-TIME METADATA FILE (C0001R01.BIM)
284: PICTURE POINTER FILE (C0001I01.PPF)

FIG. 26
291: LTC CHANGE POINT TABLE IN A NON-REAL-TIME METADATA FILE DESCRIBED IN XML
(NUMBERS 1-13 AT THE BEGINNINGS OF LINES ARE FOR CONVENIENCE IN DESCRIPTIONS AND ARE NOT PART OF THE XML DESCRIPTION)

FIG. 27
31: OPTICAL DISK
32: SPINDLE MOTOR
33: PICKUP UNIT
34: RF AMPLIFIER
35: SERVO CONTROL UNIT
36: SIGNAL PROCESSING UNIT
37: MEMORY CONTROLLER
38: MEMORY
39: DATA CONVERSION UNIT
40: CONTROL UNIT
41: OPERATION UNIT
300: CAMCORDER
301: DISK RECORDING UNIT
302: IMAGING UNIT

FIG. 28
310: EDITING SYSTEM
321: DISK RECORDING/PLAYBACK APPARATUS
321A: DRIVE
321B: MONITOR
322: NETWORK
323: DISK RECORDING/PLAYBACK APPARATUS
323A: DRIVE
323B: MONITOR
324: EDITING CONTROL APPARATUS
324A: LTC INPUTTING KEY
324B: DISPLAY UNIT

FIG. 29
324: EDITING CONTROL APPARATUS
331: CPU (CENTRAL PROCESSING UNIT)
332: ROM (READ ONLY MEMORY)
333: RAM (RANDOM ACCESS MEMORY)
334: PLAYBACK CONTROL UNIT
335: EDITING CONTROL UNIT
336: BUS
340: INPUT/OUTPUT INTERFACE
341: INPUT UNIT
342: OUTPUT UNIT
343: STORAGE UNIT
344: COMMUNICATION UNIT
345: DRIVE
346: REMOVABLE MEDIUM

FIG. 30
334: PLAYBACK CONTROL UNIT
351: CONTROL UNIT
352: INPUT ACCEPTANCE PROCESSING UNIT
353: INFORMATION ACQUISITION UNIT
354: HOLDING UNIT
355: CUE-UP PROCESSING UNIT
356: COMMAND PROCESSING UNIT
361: LTC CHANGE POINT TABLE
NRT (NON-REAL-TIME METADATA) LTC•FTC
COMMAND
USER INPUT

FIG. 31
371: FRAME IMAGE

Figure 32:
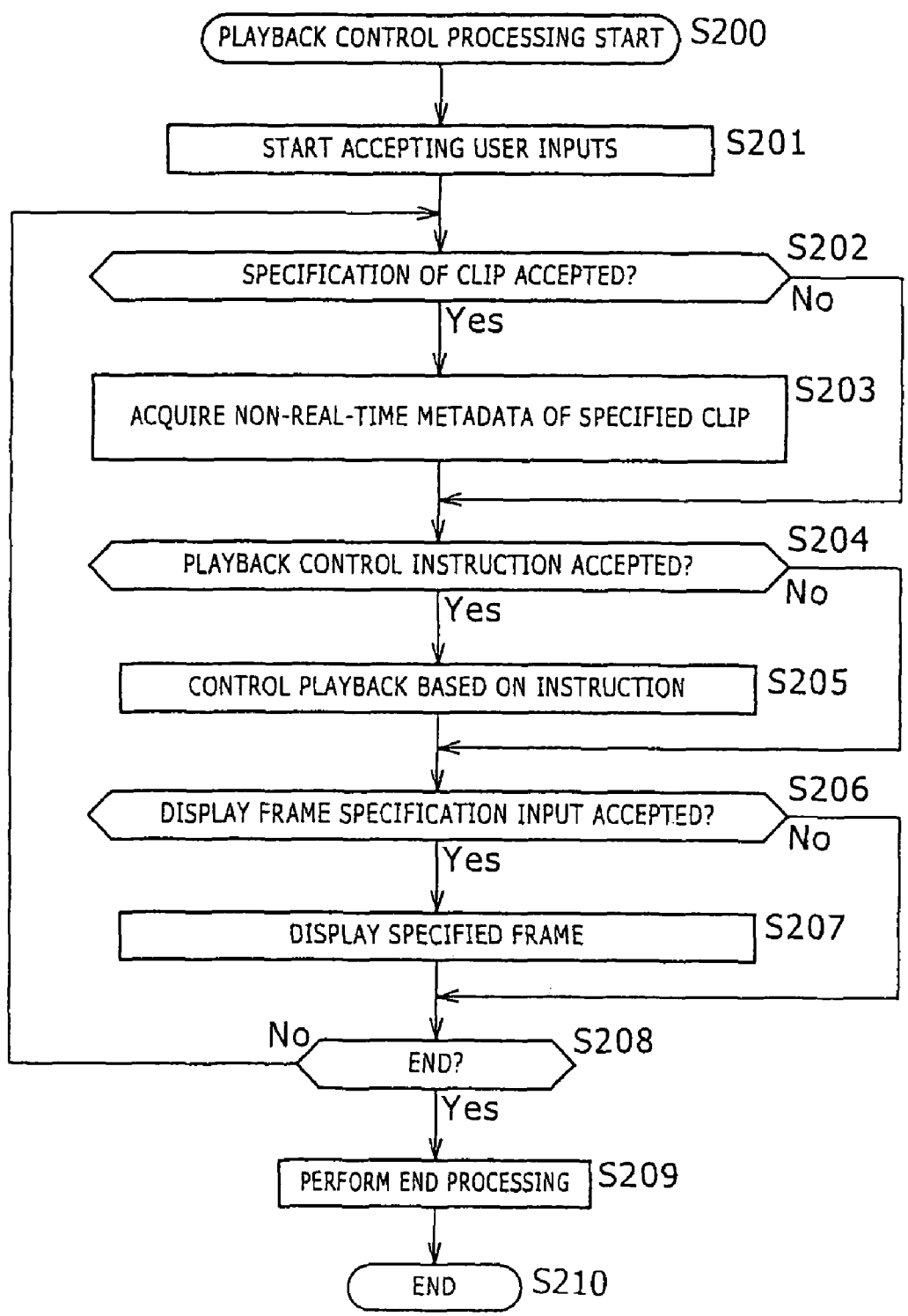
FIG. 32 is a flowchart of assistance in explaining playback control processing.

FIG. 32
S200: PLAYBACK CONTROL PROCESSING START
S201: START ACCEPTING USER INPUTS
S202: SPECIFICATION OF CLIP ACCEPTED?
S203: ACQUIRE NON-REAL-TIME METADATA OF SPECIFIED CLIP
S204: PLAYBACK CONTROL INSTRUCTION ACCEPTED?
S205: CONTROL PLAYBACK BASED ON INSTRUCTION
S206: DISPLAY FRAME SPECIFICATION INPUT ACCEPTED?
S207: DISPLAY SPECIFIED FRAME
S208: END?
S209: PERFORM END PROCESSING
S210: END

FIG. 33
S230: CUE-UP CONTROL PROCESSING START
S231: SET CURRENT STATUS SECTION BASED ON CURRENT FRAME
S232: ACQUIRE TARGET LTC
S233: IS STATUS SECTION OF TARGET LTC SAME AS CURRENT STATUS SECTION?
S234: INCREMENT SECTION?
S235: PERFORM CUE-UP COMMAND PROCESSING SO THAT FRAME OF TARGET LTC IS DISPLAYED
S236: END

FIG. 34
S241: CURRENT LTC<TARGET LTC?
S242: DECREASE SECTION?
S243: IS TARGET LTC INCLUDED IN NEXT STATUS SECTION?
S244: IS NEXT STATUS "END"?
S245: UPDATE CURRENT STATUS SECTION
S246: PERFORM CUE-UP COMMAND PROCESSING SO THAT FRAME OF END POINT IS DISPLAYED
S247: INCREMENT SECTION?
S248: PERFORM CUE-UP COMMAND PROCESSING SO THAT FRAME OF TARGET LTC IS DISPLAYED
S249: PERFORM CUE-UP COMMAND PROCESSING SO THAT FIRST FRAME OF NEXT STATUS SECTION IS DISPLAYED
S250: PERFORM CUE-UP COMMAND PROCESSING SO THAT FIRST FRAME OF DECREASE SECTION IS DISPLAYED

FIG. 35
S261: DECREASE SECTION?
S262: IS TARGET LTC INCLUDED IN IMMEDIATELY PRECEDING STATUS SECTION?
S263: IS FRAME NUMBER OF FIRST FRAME OF IMMEDIATELY PRECEDING STATUS SECTION "0"?
S264: UPDATE CURRENT STATUS SECTION
S265: PERFORM CUE-UP COMMAND PROCESSING SO THAT FRAME HAVING FRAME NUMBER 0 IS DISPLAYED
S266: INCREMENT SECTION?
S267: PERFORM CUE-UP COMMAND PROCESSING SO THAT FRAME OF TARGET LTC IS DISPLAYED
S268: PERFORM CUE-UP COMMAND PROCESSING SO THAT FIRST FRAME OF CURRENT STATUS SECTION IS DISPLAYED
S269: PERFORM CUE-UP COMMAND PROCESSING SO THAT FIRST FRAME OF INCREMENT SECTION THAT IS PRIOR TO AND CLOSEST TO DECREASE SECTION

FIG. 36
INCREMENT
INCREASE
STILL
DECREASE

FIG. 37
CLIP END
INCREMENT
END

FIG. 38
STILL
INCREMENT
INCREMENT
INCREASE

FIG. 39
INCREMENT 1
DECREASE
INCREMENT 2
INCREMENT 1
DECREASE
INCREASE
INCREMENT SECTION 2

FIG. 40
CLIP START
INCREMENT

The invention claimed is:

1. A playback apparatus for playing back video data, comprising:
    an input acceptance processing unit which accepts a playback instruction indicating a playback frame;
    a memory which stores table information including first position information, which is absolute position information as to each frame of the video data, second position information, which is associated with the first position information as to each frame of the video data and is relative position information of the video data, and status information indicating a type of change pattern of a value of the first position information as to each frame of the video data, so that a plurality of consecutive frames with matching status information indicating the type of change pattern of the value of the first position information in the table information can be identified;
    identifying means for identifying the second position information, by referring to the table information,
    wherein the identifying means performs determination whether the first position information of the playback frame which is specified by the playback instruction exists in each status section which is grouped by the plurality of consecutive frames with matching status information, and identifies the second position information corresponding to the first position information of the playback frame which is specified by the playback instruction based on a result of the determination; and
    playback means for playing back the playback frame corresponding to the second position information identified by the identifying means.

2. The playback apparatus according to claim 1, wherein the first position information is a time code indicating an absolute position of the frame, using a real time.

3. The playback apparatus according to claim 1, wherein the first position information is a time code indicating an absolute position of the frame, using time information relative to a predetermined time.

4. The playback apparatus according to claim 1, wherein the second position information is a time code indicating a relative position of the frame, using a frame number indicating the number of frames counted from the starting frame of the video data.

5. The playback apparatus according to claim 1, wherein each element of the table information includes status information indicating a type of change pattern of a value of the first position information as to a frame after the change point.

6. The playback apparatus according to claim 1, wherein the identifying means performs the determination in turn for consecutive status sections in a direction that increases the second position information if a value of the first position information of the playback instruction is larger than a value of the first position information as to a frame that is currently played back, and the identifying means performs the determination in turn for consecutive status sections in a direction that decreases the second position information if a value of the first position information of the playback instruction is smaller than a value of the first position information as to a frame that is currently played back.

7. The playback apparatus according to claim 1, wherein the identifying means performs the determination only when the status of the plurality of consecutive frames is increment.

8. A playback method for playing back video data, in which steps thereof are implemented by a computer system, comprising:
    accepting a playback instruction indicating a playback frame;
    storing table information including first position information, which is absolute position information as to each frame of the video data, second position information, which is associated with the first position information as to each frame of the video data and is relative position information of the video data, and status information indicating a type of change pattern of a value of the first position information as to each frame of the video data, so that a plurality of consecutive frames with matching status information indicating the type of change pattern of the value of the first position information in the table information can be identified;
    determining whether the first position information of the playback frame which is specified by the playback instruction exists in each status section which is grouped by the plurality of consecutive frames with matching status information;
    identifying the second position information corresponding to the first position information of the playback frame which is specified by the playback instruction based on a result of the determination, referring to the table information; and
    playing back the playback frame corresponding to the second position information identified.

9. A non-transitory computer readable medium, for playing back video data, including program instructions executable by a computer system for:
    accepting a playback instruction indicating a playback frame, using first position information which is absolute position information as to each frame of the video data;

determining whether the first position information of the playback instruction exists in each status section which is grouped by a plurality of consecutive frames with matching status information indicating a type of change pattern of a value of the first position information as to each frame of the video data in a table information;

identifying second position information which is associated with the first position information of the video data and is relative position information, relative to a starting frame of the video data, of the playback frame and which corresponds to the first position information of the playback frame which is specified by the playback instruction based on a result of the determination; and playing back the playback frame corresponding to the second position information identified.

* * * * *